US012572373B2

(12) United States Patent
Shen et al.

(10) Patent No.: US 12,572,373 B2
(45) Date of Patent: Mar. 10, 2026

(54) QUICK INTERFACE RETURN METHOD AND ELECTRONIC DEVICE

(71) Applicant: Huawei Technologies Co., Ltd., Shenzhen (CN)

(72) Inventors: Zeyang Shen, Wuhan (CN); Yintang Ni, Shenzhen (CN); Shaohua Zhao, Wuhan (CN); Huachang Deng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 18/573,896

(22) PCT Filed: Jun. 21, 2022

(86) PCT No.: PCT/CN2022/100212
§ 371 (c)(1),
(2) Date: Dec. 22, 2023

(87) PCT Pub. No.: WO2022/268085
PCT Pub. Date: Dec. 29, 2022

(65) Prior Publication Data
US 2024/0211280 A1 Jun. 27, 2024

(30) Foreign Application Priority Data

Jun. 26, 2021 (CN) .......................... 202110715180.1

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 3/0484* (2013.01); *G06F 3/04842* (2013.01); *G06F 3/0488* (2013.01)

(58) Field of Classification Search
CPC ...... G06F 9/451; G06F 3/0481; G06F 3/0482; G06F 3/0483; G06F 3/0484; G06F 3/04842; G06F 3/0488
See application file for complete search history.

(56) References Cited

U.S. PATENT DOCUMENTS 8,831,557 B2 * 9/2014 Jung ................... H04W 52/027
455/566
2009/0235194 A1 * 9/2009 Arndt ...................... G06F 9/451
715/772
(Continued)

FOREIGN PATENT DOCUMENTS

CN          201956001 U      8/2011
CN          104881212 A  *  9/2015
(Continued)

OTHER PUBLICATIONS

Greenberg S, Cockburn A. Getting back to back: Alternate behaviors for a Web browser's back button. InProceedings of the 5th Annual Human Factors and the Web Conference Jun. 3, 1999. (Year: 1999).*

(Continued)

*Primary Examiner* — Daniel Samwel
(74) *Attorney, Agent, or Firm* — Slater Matsil, LLP

(57) ABSTRACT

This application provides a quick interface return method and an electronic device. The method is applied to an electronic device. The method includes: displaying a first interface of a first application, where the first interface is associated with a first activity, the first activity is a stack top activity of a first activity stack, and the first activity stack includes the first activity, a second activity, and a third activity; receiving a first user operation; and in response to the first user operation, popping at least two activities of the first activity stack, and displaying a second interface of the first application, where the second interface is associated (Continued)

with the second activity; or in response to the first user operation, popping at least two activities of the first activity stack, and displaying a third interface of a second application, where the third interface is associated with the third activity.

20 Claims, 67 Drawing Sheets

(51) Int. Cl.
    *G06F 3/0484*         (2022.01)
    *G06F 3/04842*      (2022.01)
    *G06F 3/0488*        (2022.01)

(56)              References Cited

U.S. PATENT DOCUMENTS

| | | | | |
|---|---|---|---|---|
| 2011/0302556 A1* | 12/2011 | Drukman | ................... | G06F 8/33 |
| | | | | 717/113 |
| 2014/0267241 A1* | 9/2014 | Keondjian | ............ | G06F 3/0481 |
| | | | | 345/419 |
| 2015/0121267 A1* | 4/2015 | Wu | ..................... | G06F 3/04817 |
| | | | | 715/765 |
| 2017/0351387 A1* | 12/2017 | Li | ........................ | G06F 16/9574 |
| 2020/0326839 A1* | 10/2020 | Walkin | ................ | G06F 3/04817 |

FOREIGN PATENT DOCUMENTS

| | | | |
|---|---|---|---|
| CN | 105183302 | A | 12/2015 |
| CN | 105955748 | A | 9/2016 |
| CN | 107885571 | A | 4/2018 |
| CN | 110263273 | A | 9/2019 |
| WO | 2016146056 | A1 | 9/2016 |
| WO | 2021057343 | A1 | 4/2021 |

OTHER PUBLICATIONS

Cockburn A, McKenzie B, Jasonsmith M. Pushing back: evaluating a new behaviour for the back and forward buttons in web browsers. International Journal of Human-Computer Studies. Nov. 1, 2002;57(5):397-414. (Year: 2002).*

Folanwin, "The life cycle of Actiivty, one of the four major components of Android," Feb. 26, 2016, total 6 pages, [online] https://blog.csdn.net/folanwin/article/details/50748522.

\* cited by examiner

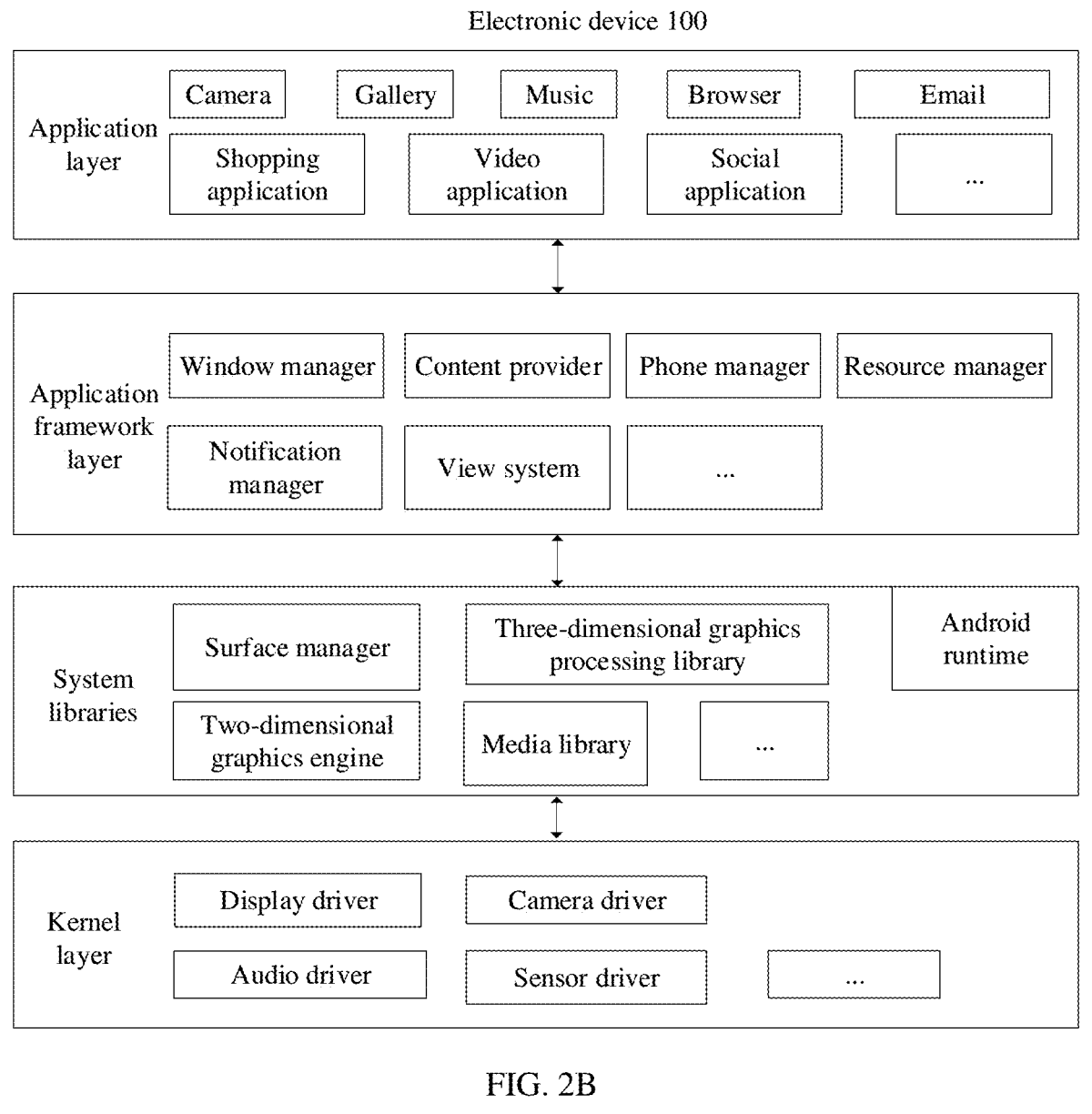

Electronic device 100

| Application layer | Camera | Gallery | Music | Browser | Email |
|---|---|---|---|---|---|
| | Shopping application | Video application | | Social application | ... |

| Application framework layer | Window manager | Content provider | Phone manager | Resource manager |
|---|---|---|---|---|
| | Notification manager | View system | ... | |

| System libraries | Surface manager | Three-dimensional graphics processing library | Android runtime |
|---|---|---|---|
| | Two-dimensional graphics engine | Media library | ... |

| Kernel layer | Display driver | Camera driver | |
|---|---|---|---|
| | Audio driver | Sensor driver | ... |

FIG. 2B

CONT.
FROM

TO

CONT.
FROM

Interface
switching ➔ TO

CONT.
FROM

510

CONT.
FROM

Perform a
return
operation

TO

¥444

Dress A

Express delivery: 10  Monthly sales: 25    City B

Service        Authenticity guarantee•Instant
               refund•Return and replacement      >
               within seven days Selection      Color Size                          >

Specifications Brand Article No....                >

Shop  Favorites    Add to cart    Buy now

300

310

CONT.
FROM

320

330

CONT.
FROM

Perform a
return
operation

TO

Perform a
quick return
operation

TO

510

CONT.
FROM

TO

CONT.
FROM

TO

520

521

TO

¥666

Dress B press delivery: 0 Monthly sales: 2 City C

Authenticity guarantee•Instant refund•Return and replacement within seven days >

Selection Color Size >

Specifications Brand Article No.... >

Shop Favorites Add to cart Buy now

CONT.
FROM

520

TO

CONT.
FROM

TO

520

CONT.
FROM

521

First quick return operation

Second quick return operation (A)

(B)

CONT.
FROM

520

Drag 522C → TO FIG. 17(B)

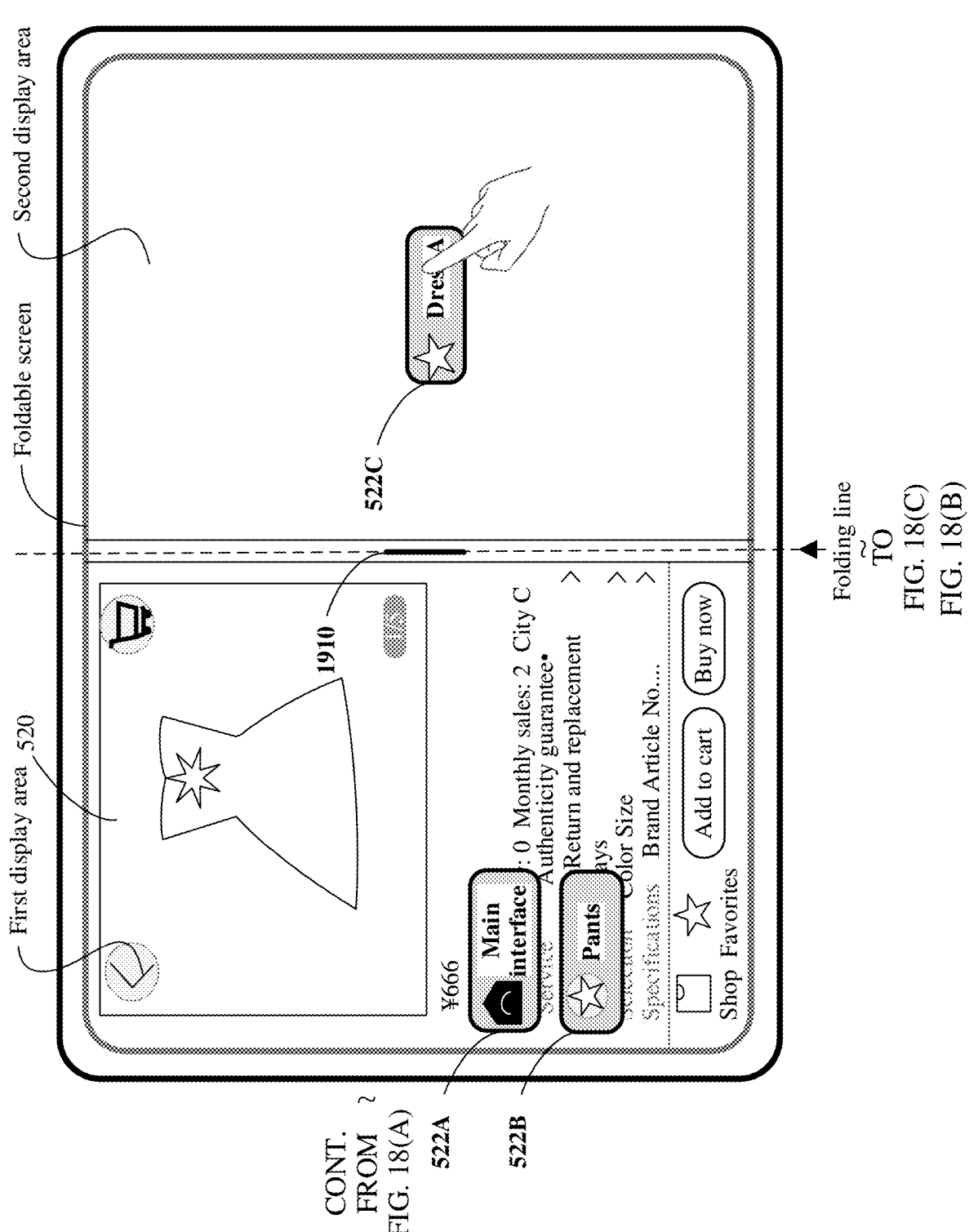

CONT. FROM FIG. 18(B)

CONT.
FROM

Tap
2521

TO

CONT.
FROM

TO

510

CONT.
FROM

Interface
switching    TO

CONT.
FROM

520

TO

Perform a quick return operation

QUICK INTERFACE RETURN METHOD AND ELECTRONIC DEVICE

CROSS-REFERENCE TO RELATED APPLICATIONS

This application is a national stage of International Application No. PCT/CN2022/100212, filed on Jun. 21, 2022, which claims priority to Chinese Patent Application No. 202110715180.1, filed on Jun. 26, 2021. Both of the aforementioned applications are hereby incorporated by reference in their entireties.

TECHNICAL FIELD

An application may include a plurality of application activities (Activity). When a user uses the application, the application generates a plurality of activities based on user operations, and the plurality of activities enter a stack sequentially based on an access sequence. When there are a large quantity of activities in the stack, if the user wants to return to a previously displayed interface (for example, a main interface of the application), the user needs to trigger a return button for a plurality of times to return level by level, and the activities are also popped from the stack based on a sequence reverse to the access sequence, resulting in complex user operations. Alternatively, the user may directly quit the application, and then restart the application. However, in this case, previous operation records are lost, and the user may need to perform the operations again. The operations are complex and violate normal perception, which compromises user experience.

BACKGROUND

An application may include a plurality of application activities (Activity). When a user uses the application, the application generates a plurality of activities based on user operations, and the plurality of activities enter a stack sequentially based on an access sequence. When there are a large quantity of activities in the stack, if the user wants to return to a previously displayed interface (for example, a main interface of the application), the user needs to trigger a return button for a plurality of times to return level by level, and the activities are also popped from the stack based on a sequence reverse to the access sequence, resulting in complex user operations. Alternatively, the user may directly quit the application, and then restart the application. However, in this case, previous operation records are lost, and the user may need to perform the operations again. The operations are complex and violate normal perception, which compromises user experience.

SUMMARY

Embodiments of this application disclose a quick interface return method and an electronic device, to quickly return to an interface displayed before a previous interface, so which is simple and convenient.

According to a first aspect, an embodiment of this application provides a quick interface return method. The method is applied to an electronic device. The method includes: displaying a first interface of a first application, where the first interface is associated with a first activity, the first activity is a stack top activity of a first activity stack, and the first activity stack includes the first activity, a second activity, and a third activity; receiving a first user operation; and in response to the first user operation, popping at least two activities of the first activity stack, and displaying a second interface of the first application, where the second interface is associated with the second activity; or in response to the first user operation, popping at least two activities of the first activity stack, and displaying a third interface of a second application, where the third interface is associated with the third activity.

In the foregoing method, one first user operation may be used for the electronic device to quickly return to an interface displayed before a previous interface. The interface may belong to a same application as the currently displayed first interface. For example, the interface is a user interface displayed by the first application for the first time. Alternatively, the interface and the currently displayed interface may belong to different applications. For example, the interface is a main interface of the second application. The user operations are simple and convenient, return interfaces are diversified, and interaction experience is more friendly.

In a possible implementation, before the displaying a first interface of a first application, the method further includes: displaying the third interface of the second application; and displaying the second interface of the first application, where the second activity enters the first activity stack before the first activity, and the third activity enters the first activity stack before the second activity.

In a possible implementation, before the receiving a first user operation, the method further includes: receiving a first quantity of second user operations, where the second user operations are used to return to an interface previous to a currently displayed interface; and the in response to the first user operation, popping at least two activities of the first activity stack includes: when the first quantity of second user operations and the first user operation meet a first preset condition, popping the at least two activities of the first activity stack in response to the first user operation, where the preset condition is that a difference between a first receiving time and a receiving time of the first user operation is less than or equal to first duration, and the first receiving time is a receiving time of an earliest received second user operation among the first quantity of second user operations.

In some embodiments, when a plurality of user operations (the first quantity of second user operations and one first user operation) are continuously received in a short period of time, an interface displayed before a previous interface may be quickly returned to. For example, the electronic device may continuously receive three return operations (for example, sliding inward from a left edge of a screen) within two seconds, and in response to the third return operation, the electronic device may pop at least two activities of the first activity stack, and display the interface displayed before the previous interface.

In a possible implementation, before the receiving a first user operation, the method further includes: receiving a second quantity of second user operations, where the second user operations are used to return to an interface previous to a currently displayed interface; and displaying a first control when the second quantity of second user operations meet a second preset condition, where the second preset condition is that a difference between a second receiving time and a third receiving time is less than or equal to second duration, the second receiving time is a receiving time of an earliest received second user operation among the second quantity of second user operations, and the third receiving time is a receiving time of a latest received second user operation among the second quantity of second user operations; and the receiving a first user operation includes: receiving the first user operation that is for the first control.

In some embodiments, when a plurality of user operations (the second quantity of second user operations) are continuously received in a short period of time, the electronic device may display the first control, where the first control is used to indicate a user interface displayed after a user performs a quick return operation, and the quick return operation is the first user operation that is for the first control. Then in response to the quick return operation, the electronic device may pop at least two activities of the first activity stack, and display an interface displayed before a previous interface, that is, the user interface indicated by the first control. In some embodiments, the first control indicates the user interface by using an included text. In some other embodiments, the first control is an application icon of the indicated user interface.

In a possible implementation, the receiving a first user operation includes: receiving the first user operation that is for a first area, where the first area is different from a second area, the second area is an area which a second user operation is for, and the second user operation is used to return to an interface previous to a currently displayed interface.

In some embodiments, both the first area and the second area are located on a left side of the screen, and the second area is located on an upper side of the first area.

In a possible implementation, the first user operation and a second user operation are for a same area, but operation directions thereof are different, and the second user operation is used to return to an interface previous to a currently displayed interface. In some embodiments, the second user operation is an operation of sliding inward horizontally from the left edge of the screen, and the first user operation is an operation of sliding inward from the left edge of the screen with a sliding direction being diagonally upward.

In a possible implementation, the first interface includes a second control and a third control, the second control is used to indicate the first application, and the third control is used to indicate the second application; and the in response to the first user operation, popping at least two activities of the first activity stack, and displaying a second interface of the first application includes: in response to the first user operation that is for the second control, popping at least two activities that enter the first activity stack after the second activity, and displaying the second interface; or the in response to the first user operation, popping at least two activities of the first activity stack, and displaying a third interface of a second application includes: in response to the first user operation that is for the third control, popping at least two activities that enter the first activity stack after the third activity, and displaying the third interface.

In some embodiments, the second control is an icon of the first application, and the third control is an icon of the second application.

In some embodiments, the method further includes: when displaying the first interface, displaying the second control and the third control in response to a sliding operation that is for a first area. In some other embodiments, the method further includes: when displaying the first interface, displaying the second control and the third control in response to a sliding operation that is for a first area and whose sliding distance is a preset distance. The first area is different from a second area, the second area is an area which a second user operation is for, and the second user operation is used to return to an interface previous to a currently displayed interface.

In a possible implementation, the in response to the first user operation, popping at least two activities of the first activity stack, and displaying a second interface of the first application includes: in response to a first type of first user operation, popping at least two activities that enter the first activity stack after the second activity, and displaying the second interface; or the in response to the first user operation, popping at least two activities of the first activity stack, and displaying a third interface of a second application includes: in response to a second type of first user operation, popping at least two activities that enter the first activity stack after the third activity, and displaying the third interface.

In some embodiments, the first type of first user operation and the second type of first user operation are for a same area, but operation directions thereof are different. In some embodiments, the first type of first user operation is an operation of sliding inward from the left edge of the screen with a sliding direction being diagonally upward, and the second type of first user operation is an operation of sliding inward from the left edge of the screen with a sliding direction being diagonally downward.

In this application, the user may perform different types of first user operations based on interface prompt information, to quickly return to different user interfaces. In this way, usage scenarios are diversified, and user experience is better.

In a possible implementation, a name of the first activity and a name of the second activity include a name of the first application, and before the displaying the second interface of the first application, the method further includes: displaying a fourth interface of the second application, where the fourth interface is associated with a fourth activity, a name of the fourth activity includes a name of the second application, and the fourth activity enters the first activity stack before the second activity enters the first activity stack and after the third activity enters the first activity stack; and the displaying the second interface of the first application includes: when switching from the fourth interface to the second interface, determining that the second activity is an activity associated with a user interface displayed in response to the first user operation that is for the second control, where during the switching from the fourth interface to the second interface, the stack top activity of the first activity stack changes from the fourth activity to the second activity, and the application name included in the name of the fourth activity is different from the application name included in the name of the second activity.

In some embodiments, the fourth interface is displayed after the third interface and is an interface last displayed among user interfaces of the second application. When the electronic device switches from the displayed fourth interface of the second application to display the second interface of the first application, the electronic device may record a first activity after a package name (that is, the name of the application) changes, that is, the second activity associated with the second interface of the first application. The recorded second activity may be the stack top activity of the first activity stack after the quick return method is performed. To be specific, in response to the first user operation, the electronic device may pop at least two activities that enter the first activity stack after the second activity, and display the second interface.

In this application, the electronic device can quickly return to a first displayed user interface among switched user interfaces of the first application. This conforms to a usage habit of the user, and user experience is better.

In a possible implementation, the displaying the second interface of the first application includes: when switching from the fourth interface to the second interface, determining that the third activity is an activity associated with a user interface displayed in response to the first user operation that is for the third control, where the third activity is an activity that earliest enters the first activity stack among a plurality of activities whose names include the name of the second application.

In some embodiments, the fourth interface is displayed after the third interface and is the interface last displayed among the user interfaces of the second application. When the electronic device switches from the displayed fourth interface of the second application to display the second interface of the first application, the electronic device may record a first activity that enters the first activity stack before the package name changes, that is, the third activity associated with the third interface of the second application. The recorded third activity may be the stack top activity of the first activity stack after the quick return method is performed. To be specific, in response to the first user operation, the electronic device may pop at least two activities that enter the first activity stack after the third activity, and display the third interface.

In some embodiments, the third interface is the main interface of the second application. The electronic device can quickly return to the main interface of the second application. This conforms to the usage habit of the user, and user experience is better.

In a possible implementation, the method further includes: displaying the first interface and the second interface in split screen in response to a third user operation that is for the second control; or the method further includes: displaying the first interface and the third interface in split screen in response to a fourth user operation that is for the third control.

In this application, the electronic device may display, in split screen in response to a user operation, the currently displayed first interface and a user interface displayed before the first interface, so that usage is more flexible.

In a possible implementation, the in response to the first user operation, popping at least two activities of the first activity stack includes: in response to the first user operation, popping at least two activities that enter the first activity stack after a fifth activity and before the first activity, where the fifth activity is associated with a fifth interface, and the fifth interface is the second interface or the third interface; and popping the first activity, and displaying the fifth interface.

In this application, when popping the at least two activities of the first activity stack, the electronic device may first pop an activity between the stack top activity (that is, the first activity) of the first activity stack and the target fifth activity. In this case, the stack top activity remains unchanged, and the displayed user interface also remains the first interface. Then the electronic device pops the first activity. In this case, the stack top activity is the fifth activity, and the electronic device displays the fifth interface. In other words, the fifth interface, as a user interface visible to the user, is directly returned to from the first interface. This avoids problems such as flickering, a blank screen, and frame freezing caused by switching of the displayed user interface for a plurality of times when a large quantity of activities, for example, at least two are popped. Therefore, performance is smooth, and user experience is better.

In a possible implementation, the in response to the first user operation, popping at least two activities that enter the first activity stack after a fifth activity and before the first activity includes: in response to the first user operation, separately performing a destruction method on the at least two activities that enter the first activity stack after the fifth activity and before the first activity, where the at least two activities that enter the first activity stack after the fifth activity and before the first activity are in a destroyed state, the first activity is in a resumed state, and the fifth activity is in a stopped state; and the popping the first activity, and displaying the fifth interface includes: performing a pause method on the first activity, so that the first activity is in a paused state; performing a start method and a restart method on the fifth activity, so that the fifth activity is in a started state; performing a resumption method on the fifth activity, so that the fifth activity is in the resumed state; performing a stop method on the first activity, so that the first activity is in the stopped state; and performing the destruction method on the first activity, so that the first activity is in the destroyed state.

In this application, the electronic device only needs to separately perform the destruction method on the at least two activities that enter the first activity stack after the fifth activity and before the first activity, instead of performing the following methods each time when a stack top activity is popped and a previous interface is displayed: performing the pause method on the stack top activity, performing the start method, the restart method, and the resumption method on an activity associated with the previous interface, and performing the stop method and the destruction method on the stack top activity, thereby greatly reducing a processing amount and device power consumption.

In a possible implementation, the method further includes: enabling a first function in response to a fifth user operation, where the first function is to display different user interfaces in response to the first user operation when the first user operation is for different areas, or the first function is to display different user interfaces in response to the first user operation when operation directions of the first user operation are different.

In this application, the user may autonomously select an implementation of a quick return function. For example, when the user selects, based on the usage habit, different areas which the first user operation is for, different user interfaces are quickly returned to, or when the user selects different operation directions of the first user operation based on the usage habit, different user interfaces are quickly returned to. Therefore, usage is more flexible.

In a possible implementation, before the in response to the first user operation, popping at least two activities of the first activity stack, the method further includes: determining that a quantity of activities included in the first activity stack is greater than or equal to a preset quantity threshold.

In a possible implementation, before the in response to the first user operation, popping at least two activities of the first activity stack, the method further includes: determining that an application of a user interface associated with an activity included in the first activity stack is a preset application.

In a possible implementation, the method further includes: determining, in response to a sixth user operation, that the first application and the second application are preset applications.

In this application, the user may autonomously select a preset application to which the quick return function is applied, so that usage is more flexible.

According to a second aspect, an embodiment of this application provides another quick interface return method. The method is applied to an electronic device. The method includes: displaying a first interface of a first application, where the first interface is associated with a first activity, the first activity is a stack top activity of a first activity stack, and the first activity stack includes the first activity and a second activity; receiving a first user operation; and in response to the first user operation, popping at least two activities of the first activity stack, and displaying a second interface of the first application, where the second interface is associated with the second activity.

In the foregoing method, one first user operation may be used for the electronic device to quickly return to an interface displayed before a previous interface. This is simple and convenient with better user experience.

In a possible implementation, before the displaying a first interface of a first application, the method further includes: displaying the second interface of the first application, where the second activity enters the first activity stack before the first activity.

In a possible implementation, when the first interface of the first application is displayed, the second activity is a stack bottom activity of the first activity stack.

In some embodiments, the second interface is a main interface of the first application. The electronic device can quickly return to the main interface of the first application. This conforms to a usage habit of the user, and user experience is better.

In a possible implementation, before the receiving a first user operation, the method further includes: receiving a first quantity of second user operations, where the second user operations are used to return to an interface previous to a currently displayed interface; and the in response to the first user operation, popping at least two activities of the first activity stack includes: when the first quantity of second user operations and the first user operation meet a first preset condition, popping the at least two activities of the first activity stack in response to the first user operation, where the preset condition is that a difference between a first receiving time and a receiving time of the first user operation is less than or equal to first duration, and the first receiving time is a receiving time of an earliest received second user operation among the first quantity of second user operations.

In some embodiments, when a plurality of user operations (the first quantity of second user operations and one first user operation) are continuously received in a short period of time, an interface displayed before a previous interface may be quickly returned to. For example, the electronic device may continuously receive three return operations (for example, sliding inward from a left edge of a screen) within two seconds, and in response to the third return operation, the electronic device may pop at least two activities of the first activity stack, and display the interface displayed before the previous interface.

In a possible implementation, before the receiving a first user operation, the method further includes: receiving a second quantity of second user operations, where the second user operations are used to return to an interface previous to a currently displayed interface; and displaying a first control when the second quantity of second user operations meet a second preset condition, where the second preset condition is that a difference between a first receiving time and a second receiving time is less than or equal to second duration, the first receiving time is a receiving time of an earliest received second user operation among the second quantity of second user operations, and the second receiving time is a receiving time of a latest received second user operation among the second quantity of second user operations; and the receiving a first user operation includes: receiving the first user operation that is for the first control.

In some embodiments, when a plurality of user operations (the second quantity of second user operations) are continuously received in a short period of time, the electronic device may display the first control, where the first control is used to indicate a user interface displayed after a user performs a quick return operation, and the quick return operation is the first user operation that is for the first control. Then in response to the quick return operation, the electronic device may pop at least two activities of the first activity stack, and display an interface displayed before a previous interface, that is, the user interface indicated by the first control. In some embodiments, the first control indicates the user interface by using an included text. In some other embodiments, the first control is an application icon of the indicated user interface.

In a possible implementation, the receiving a first user operation includes: receiving the first user operation that is for a first area, where the first area is different from a second area, the second area is an area which a second user operation is for, and the second user operation is used to return to an interface previous to a currently displayed interface.

In some embodiments, both the first area and the second area are located on a left side of the screen, and the second area is located on an upper side of the first area.

In a possible implementation, the first user operation and a second user operation are for a same area, but operation directions thereof are different, and the second user operation is used to return to an interface previous to a currently displayed interface. In some embodiments, the second user operation is an operation of sliding inward horizontally from the left edge of the screen, and the first user operation is an operation of sliding inward from the left edge of the screen with a sliding direction being diagonally upward.

In a possible implementation, the first interface includes a second control, and the second control is used to indicate the first application; and the in response to the first user operation, popping at least two activities of the first activity stack, and displaying a second interface of the first application includes: in response to the first user operation that is for the second control, popping at least two activities that enter the first activity stack after the second activity, and displaying the second interface.

In some embodiments, the second control is an icon of the first application.

In some embodiments, the method further includes: when displaying the first interface, displaying the second control in response to a sliding operation that is for a first area. In some other embodiments, the method further includes: when displaying the first interface, displaying some content of the second control in response to a sliding operation that is for a first area and whose sliding distance is a first distance; and displaying all content of the second control in response to a sliding operation that is for the first area and whose sliding distance is a second distance, where the second distance is longer than the first distance. Optionally, an amount of content displayed on the second control is determined based on a sliding distance of a sliding operation. In some other embodiments, the method further includes: when displaying the first interface, displaying the second control in response to a sliding operation that is for a first area and whose sliding distance is a preset distance. The first area is different from a second area, the second area is an area which a second user operation is for, and the second user operation is used to return to an interface previous to a currently displayed interface.

In a possible implementation, the second interface includes a fourth control, and the method further includes: determining, in response to a seventh user operation that is for the fourth control, that the second interface is a user interface displayed in response to the first user operation, where the first activity stack further includes at least one activity that enters the first activity stack before the second activity.

In some embodiments, the fourth control is a control newly added to the second interface. In some other embodiments, the fourth control is an existing control in the first application.

In this application, the user may select a viewed user interface as the user interface displayed in response to the first user operation, so that the operation is more flexible.

In a possible implementation, the method further includes: displaying the first interface and the second interface in split screen in response to an eighth user operation.

In this application, the electronic device may display, in split screen in response to a user operation, the currently displayed first interface and a user interface displayed before a previous interface, so that usage is more flexible.

In a possible implementation, the in response to the first user operation, popping at least two activities of the first activity stack, and displaying a second interface of the first application includes: in response to the first user operation, popping at least two activities that enter the first activity stack after the second activity and before the first activity; and popping the first activity, and displaying the second interface.

In this application, when popping the at least two activities of the first activity stack, the electronic device may first pop an activity between the stack top activity (that is, the first activity) of the first activity stack and the target second activity. In this case, the stack top activity remains unchanged, and the displayed user interface also remains the first interface. Then the electronic device pops the first activity. In this case, the stack top activity is the second activity, and the electronic device displays the second interface. In other words, the second interface, as a user interface visible to the user, is directly returned to from the first interface. This avoids problems such as flickering, a blank screen, and frame freezing caused by switching of the displayed user interface for a plurality of times when a large quantity of activities, for example, at least two are popped. Therefore, performance is smooth, and user experience is better.

In a possible implementation, the in response to the first user operation, popping at least two activities that enter the first activity stack after the second activity and before the first activity includes: in response to the first user operation, separately performing a destruction method on the at least two activities that enter the first activity stack after the second activity and before the first activity, where the at least two activities that enter the first activity stack after the second activity and before the first activity are in a destroyed state, the first activity is in a resumed state, and the second activity is in a stopped state; and the popping the first activity, and displaying the second interface includes: performing a pause method on the first activity, so that the first activity is in a paused state; performing a start method and a restart method on the second activity, so that the second activity is in a started state; performing a resumption method on the second activity, so that the second activity is in the resumed state; performing a stop method on the first activity, so that the first activity is in the stopped state; and performing the destruction method on the first activity, so that the first activity is in the destroyed state.

In this application, the electronic device only needs to separately perform the destruction method on the at least two activities that enter the first activity stack after the second activity and before the first activity, instead of performing the following methods each time when a stack top activity is popped and a previous interface is displayed: performing the pause method on the stack top activity, performing the start method, the restart method, and the resumption method on an activity associated with the previous interface, and performing the stop method and the destruction method on the stack top activity, thereby greatly reducing a processing amount and device power consumption.

In a possible implementation, the method further includes: enabling a first function in response to a fifth user operation, where the first function is to display different user interfaces in response to the first user operation when the first user operation is for different areas, or the first function is to display different user interfaces in response to the first user operation when operation directions of the first user operation are different.

In this application, the user may autonomously select an implementation of a quick return function. For example, when the user selects, based on the usage habit, different areas which the first user operation is for, different user interfaces are quickly returned to, or when the user selects different operation directions of the first user operation based on the usage habit, different user interfaces are quickly returned to. Therefore, usage is more flexible.

In a possible implementation, before the in response to the first user operation, popping at least two activities of the first activity stack, and displaying a second interface of the first application, the method further includes: determining that a quantity of activities included in the first activity stack is greater than or equal to a preset quantity threshold.

In a possible implementation, before the in response to the first user operation, popping at least two activities of the first activity stack, and displaying a second interface of the first application, the method further includes: determining that an application of a user interface associated with an activity included in the first activity stack is a preset application.

In a possible implementation, the method further includes: determining, in response to a ninth user operation, that the first application is a preset application.

In this application, the user may autonomously select a preset application to which the quick return function is applied, so that usage is more flexible.

According to a third aspect, an embodiment of this application provides an electronic device, including a transceiver, a processor, and a memory. The memory is configured to store a computer program. The processor invokes the computer program to perform the quick interface return method according to any one of the first aspect and the second aspect of the embodiments of this application and the implementations of the first aspect and the second aspect.

According to a fourth aspect, an embodiment of this application provides a computer storage medium. The computer storage medium stores a computer program. When the computer program is executed by a processor, the quick interface return method according to any one of the first aspect and the second aspect of the embodiments of this application and the implementations of the first aspect and the second aspect is implemented.

According to a fifth aspect, an embodiment of this application provides a computer program product. When the computer program product runs on an electronic device, the electronic device is enabled to perform the quick interface return method according to any one of the first aspect and the second aspect of the embodiments of this application and the implementations of the first aspect and the second aspect.

According to a sixth aspect, an embodiment of this application provides an electronic device. The electronic device includes the apparatus for performing the method described in any embodiment of this application. For example, the electronic device is a chip.

It should be understood that descriptions of technical features, technical solutions, beneficial effects, or similar words in this application do not imply that all features and advantages can be implemented in any individual embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features, technical solutions, or beneficial effects in a specific embodiment. In other embodiments, additional technical features and beneficial effects may be identified in a specific embodiment that does not reflect all embodiments.

BRIEF DESCRIPTION OF THE DRAWINGS

The following describes accompanying drawings used in embodiments of this application.

FIG. 2B is a schematic diagram of a software architecture of an electronic device according to an embodiment of this application;

DETAILED DESCRIPTION OF ILLUSTRATIVE EMBODIMENTS

Figure 1:
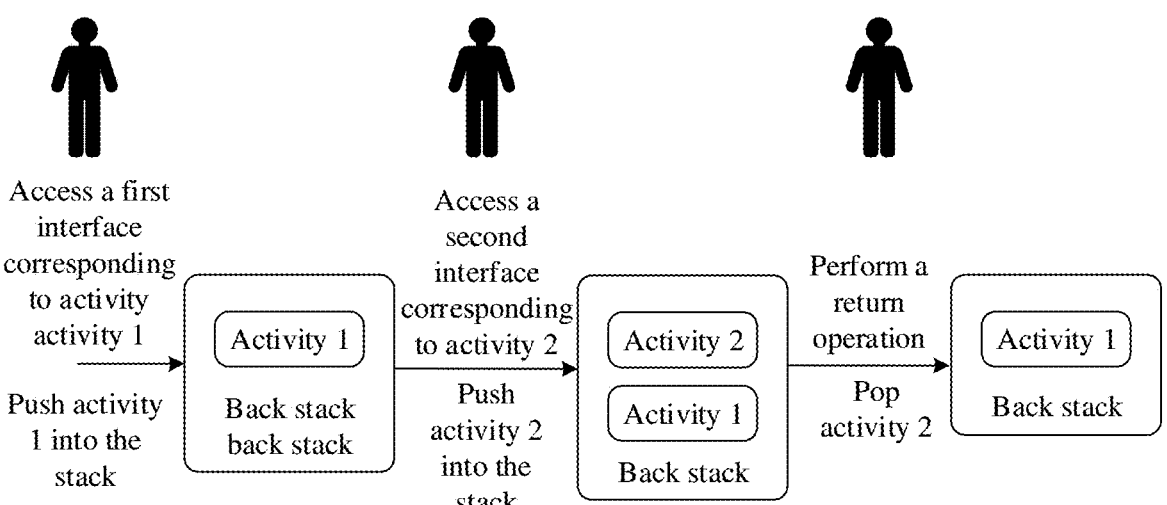
FIG. 1 is a schematic diagram for pushing an activity into a stack and popping the activity from the stack according to an embodiment of this application.

The following describes embodiments of this application with reference to the accompanying drawings in the embodiments of this application. Terms used in implementations of embodiments of this application are merely used to explain specific embodiments of this application, and are not intended to limit this application.

An embodiment of this application provides a quick interface return method. The method is applied to an electronic device. The electronic device may pop a plurality of activities (Activities) from an activity task stack (Activity Stack) in response to one return operation, to perform an operation of returning to a plurality of user interfaces, that is, achieve effect of quickly returning to the interfaces. In this way, a user does not need to perform a plurality of return operations, which is more convenient with better user experience.

In this application, the return operation is, for example, but is not limited to, an operation that is for a built-in return button of an application, an operation that is for a return button in three-button navigation, a return operation in gesture navigation (for example, sliding inward from a left edge or a right edge of a screen), a speech (for example, making a sound "back"), and a gesture (for example, stretching a finger and waving from left to right). The return button may be a virtual button, or may be a physical button.

In this application, the electronic device may run at least one application, and one application may include at least one application activity. Optionally, one application activity may correspond to one user interface. For ease of description, the application activity is referred to as an activity or an application activity for short in embodiments of this application. The application activity may be an activity in an Android system, or may be an application activity in another operating system like iOS. This is not limited in this application.

The following embodiment is described by using an example in which an application activity is an activity in an Android system.

The activity in the Android system is an interface for interaction between a user and an application. The activity is used by the application to draw a user interface. The activity usually fills the screen, but may be smaller than the screen and floats on another activity. The activity is an object that the user can visually interact with. The activity may be represented as a user interface. It may be understood that one activity corresponds to one user interface. One application may include a plurality of user interfaces, or it may be understood that one application may include a plurality of activities. During running of an application, a plurality of activities need to be invoked occasionally to fulfill requirements. Each activity may start another activity to perform different operations. For example, after starting an email application, the user may first enter a main interface of the application, and an activity corresponding to the main interface may start another activity to provide a user interface for executing tasks such as writing an email and reading an email.

During running of the application, the Android system may manage an activity by using a stack. The stack may be referred to as an activity task stack (Activity Stack), or may be referred to as a task. The task facilitates linear recording of the activity. In an Android open source project, the task is actually a dynamic array list (array list). A feature of the stack is push-in (which may also be referred to as entry) and popping, and a first-in-last-out principle is used, that is, an activity first pushed into the stack (which may also be referred to as entering the stack) is popped from the stack later than an activity subsequently pushed into the stack. One task may include at least one activity. A plurality of activities in one task may be activities included in a same application, or may be activities included in different applications. The activity first pushed into the task and last popped from the task may be understood as an activity located at a bottom layer of the task, and may be referred to as a root activity. An activity last pushed into the task and first popped from the task may be understood as an activity located at a top layer of the task, and may be referred to as a top activity.

In some embodiments, the root activity usually corresponds to a main interface of an application. The top activity is usually a running activity that the user is interacting with, and may also be referred to as a foreground activity. A user interface corresponding to the foreground activity is visible to the user.

In this application, each time a new activity is started, the activity may be pushed into the task, and become a top activity of the task. The user may trigger a return operation to return to an activity pushed into the task before the top activity, until the root activity of the task is popped. Therefore, the task may also be referred to as a back stack. A specific example is shown in FIG. 1.

FIG. 1 is an example of a schematic diagram for pushing an activity into a stack and popping the activity from the stack.

As shown in FIG. 1, the user may access, based on the electronic device, a first interface corresponding to activity 1. For example, when the user taps an application icon on a desktop of the electronic device, the electronic device displays a main interface of an application corresponding to the application icon. In this case, activity 1 is pushed into the back stack, and becomes a top activity of the back stack. The first interface is visible to and interactive with the user, and activity 1 is a foreground activity. The user may continue to access, based on the electronic device, a second interface corresponding to activity 2. For example, when the user taps a classification option on the main interface, the electronic device displays an application interface corresponding to the classification option. In this case, activity 2 is pushed into the back stack, and becomes a top activity of the back stack. The first interface is non-interactive with the user, the second interface is visible to and interactive with the user, and activity 2 is a foreground activity.

As shown in FIG. 1, the user may perform a return operation based on the electronic device. For example, when the user taps a virtual return button on the second interface, the electronic device returns to display the first interface. In this case, activity 2 is popped from the back stack, and activity 1 becomes a top activity of the back stack again. The first interface becomes visible to and interactive with the user again, and activity 1 becomes a foreground activity again.

The electronic device in an embodiment of this application may be a user terminal device like a mobile phone, a tablet computer, a handheld computer, or a personal digital assistant (PDA), a smart home device like a smart television or a smart camera, a wearable device like a smart band, a smartwatch, or smart glasses, or another device like a desktop, a laptop, a notebook computer, an ultra-mobile personal computer (UMPC), a netbook, or a smart screen.

The following describes an example of an electronic device 100 in an embodiment of this application.

Figure 2A:
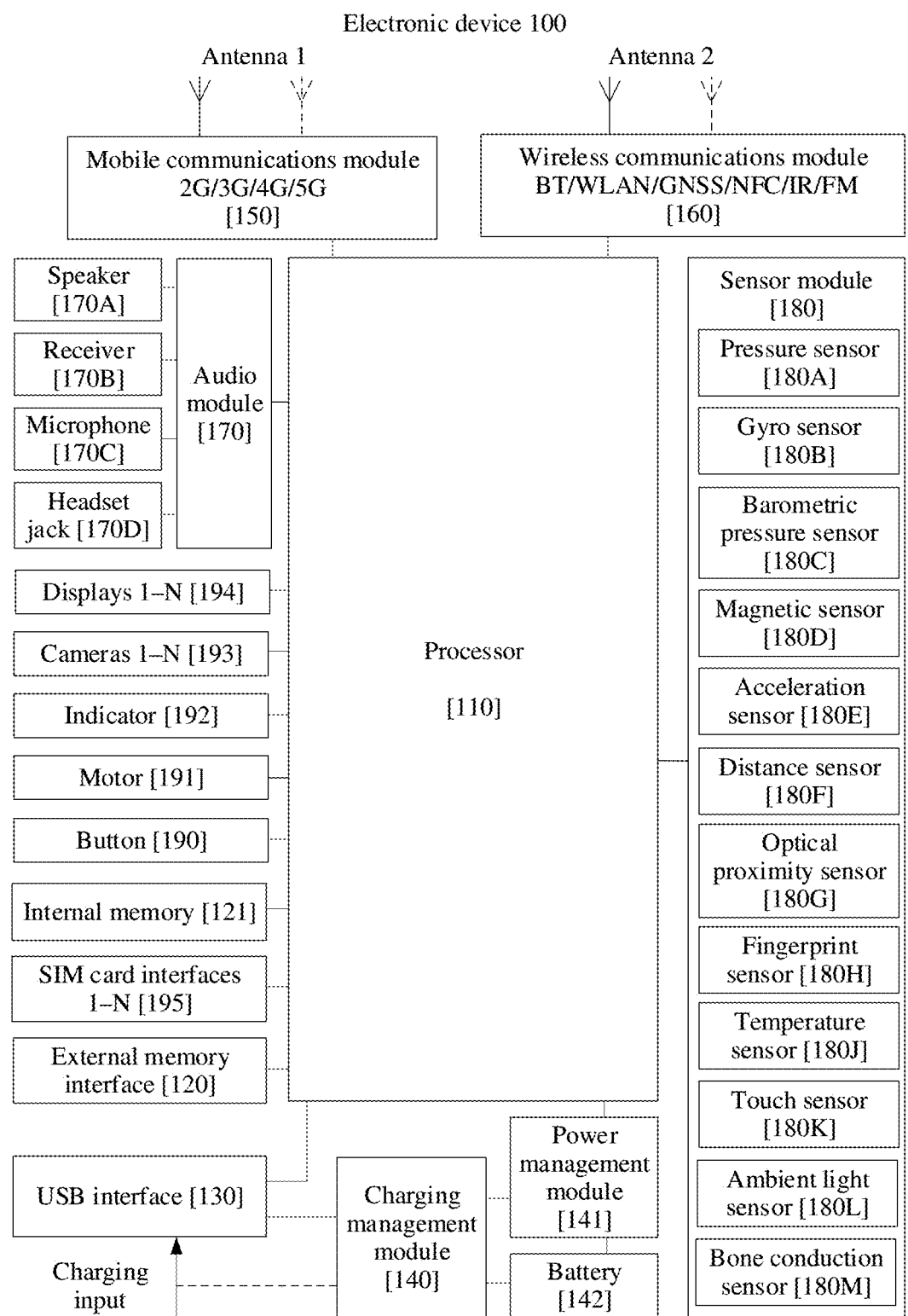
FIG. 2A is a schematic diagram of a hardware structure of an electronic device according to an embodiment of this application.

FIG. 2A is an example of a schematic diagram of a hardware structure of an electronic device 100.

As shown in FIG. 2A, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache memory. The memory may store an instruction or data that has just been used or cyclically used by the processor 110. If the processor 110 needs to use the instruction or data again, the processor 110 may invoke the instruction or data directly from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The USB interface 130 is an interface complying with a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing an audio through the headset. Alternatively, the interface may be configured to connect to another electronic device, for example, an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection mode different from that in the foregoing embodiment, or use a combination of a plurality of interface connection modes.

The electronic device 100 implements a display function by using the GPU, the display 194, the application processor, and the like. The GPU is a microprocessor for image processing, and is connected to the display 194 and the application processor. The GPU is configured to perform mathematical and geometric computation for graphic rendering. The processor 110 may include one or more GPUs, and the GPUs execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The NPU is a neural-network (NN) computing processor. With reference to a structure of a biological neural network, for example, with reference to a transmission mode between human brain neurons, the NPU quickly processes input information, and can continuously perform self-learning. Applications such as intelligent cognition of the electronic device 100, for example, image recognition, facial recognition, speech recognition, and text understanding, can be implemented by using the NPU.

The external memory interface 120 may be configured to connect an external storage card, for example, a micro SD card, to extend a storage capacity of the electronic device 100. The external storage card communicates with the processor 110 by using the external memory interface 120, to implement a data storage function. For example, files such as music and videos are stored in the external storage card.

The internal memory 121 may be configured to store computer-executable program code, where the executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created during use of the electronic device 100. In addition, the internal memory 121 may include a high-speed random access memory, and may further include a nonvolatile memory, for example, at least one magnetic disk storage device, a flash memory, or a universal flash storage (UFS). The processor 110 executes various functional applications of the electronic device 100 and data processing by executing instructions stored in the internal memory 121 and/or instructions stored in the memory disposed in the processor.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for outputting, and is also configured to convert an analog audio input into a digital audio signal. The audio module 170 may be further configured to encode and decode audio signals. In some embodiments, the audio module 170 may be disposed in the processor 110, or some functional modules in the audio module 170 are disposed in the processor 110.

The speaker 170A, also referred to as a "loudspeaker", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or speech information is received by using the electronic device 100, the receiver 170B may be put close to a human ear to listen to a speech.

The microphone 170C, also referred to as a "mike" or a "microphone", is configured to convert a sound signal into an electrical signal. When making a call or sending speech information, the user may make a sound near the microphone 170C by using the mouth of the user, to input a sound signal to the microphone 170C. At least one microphone 170C may be disposed in the electronic device 100. In some other embodiments, two microphones 170C may be disposed in the electronic device 100, to collect sound signals and further implement a noise reduction function. In some other embodiments, three, four, or more microphones 170C may alternatively be disposed in the electronic device 100, to collect sound signals, reduce noise, further identify a sound source, implement a directional recording function, and the like.

The pressure sensor 180A is configured to sense a pressure signal and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is for the display 194, the electronic device 100 detects intensity of the touch operation by using the pressure sensor 180A. The electronic device 100 may also calculate a touch location based on a detection signal of the pressure sensor 180A. In some embodiments, touch operations that are for a same touch location but have different touch operation intensity may correspond to different operation instructions. For example, when a touch operation whose touch operation intensity is less than a first pressure threshold is for an SMS message application icon, an instruction for viewing an SMS message is executed. When a touch operation whose touch operation intensity is greater than or equal to the first pressure threshold is for the SMS message application icon, an instruction for creating an SMS message is executed.

The touch sensor 180K is also known as a "touch device". The touch sensor 180K may be disposed on the display 194. The touch sensor 180K and the display 194 form a touch-screen, which is also referred to as a "touch screen". The touch sensor 180K is configured to detect a touch operation that is for or near the touch sensor 180K. The touch sensor may transfer the detected touch operation to the application processor to determine a type of a touch event. A visual output related to the touch operation may be provided on the display 194. In some other embodiments, the touch sensor 180K may be alternatively disposed on a surface of the electronic device 100, at a location different from that of the display 194.

The button 190 includes a power button, a volume button, and the like. The button 190 may be a mechanical button, or may be a touch button. The electronic device 100 may receive a button input, and generate a button signal input related to a user setting and function control of the electronic device 100.

A software system of the electronic device 100 may use a layered architecture, an event-driven architecture, a micro-kernel architecture, a micro service architecture, or a cloud architecture. For example, the software system of the layered architecture may be an Android system, or may be an HMS system. In embodiments of this application, an Android system with a layered architecture is used as an example to describe a software structure of the electronic device.

FIG. 2B is a block diagram of a software structure of an electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, Android runtime and system libraries, and a kernel layer from top to bottom.

The application layer may include a series of application packages.

As shown in FIG. 2B, the application packages may include applications such as camera, gallery, music, browser, email, shopping application, video application, social application, and messaging.

The application framework layer provides an application programming interface (API) and a programming framework for the applications at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a display size, determine whether there is a status bar, lock a screen, capture a screen, and the like.

The content provider is configured to store and obtain data, and make the data accessible to an application. The data may include a video, an image, an audio, calls made and answered, a browse history and bookmark, a phone book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function for the electronic device 100, for example, call status management (including answering, declining, or the like).

The resource manager provides various resources such as a localized character string, an icon, a picture, a layout file, and a video file for an application.

The notification manager enables an application to display notification information in the status bar, and may be configured to convey a notification message. The notification manager may automatically disappear after a short stay without requiring user interaction. For example, the notification manager is configured to give notifications of download completion, messages, and the like. A notification managed by the notification manager may alternatively be a notification that appears in the top status bar of the system in a form of a chart or a scroll bar text, for example, a notification of an application running in the background, or may be a notification that appears on the screen in a form of a dialog box. For example, text information is displayed in the status bar, an alert tone is issued, the electronic device vibrates, or an indicator blinks.

The application framework layer may further include an activity manager service (AMS). The AMS is a system service of the Android system and is used to control proper scheduling and running of different applications in the system. The AMS is mainly responsible for scheduling activities of various applications in a unified manner, managing processes of the applications, managing memory, scheduling tasks, querying a current running status of the system, and the like. The AMS may be further configured to perform a quick interface return method provided in this application, for example, perform procedures shown in FIG. 26 to FIG. 28.

The Android runtime includes core libraries and a virtual machine. The Android runtime is responsible for scheduling and management of the Android system.

The core libraries include two parts: functional functions that need to be invoked by a Java language, and core libraries of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system libraries may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, still image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario of returning from a main interface of the shopping application to the desktop, the following describes a work procedure of software and hardware of the electronic device 100 by using an example.

When the display 194 displays the main interface of the shopping application, if the pressure sensor 180A and/or the touch sensor 180K receive/receives an operation of sliding inward from a left edge of the screen (that is, a return operation in gesture navigation), a corresponding hardware interrupt is sent to the kernel layer. The kernel layer processes the sliding operation into an original input event (including information such as a sliding track, sliding coordinates, and a timestamp). The original input event is stored at the kernel layer. The application framework layer obtains the original input event from the kernel layer, and identifies a control corresponding to the input event. The shopping application may invoke an interface of the application framework layer, and further invoke the display driver at the kernel layer to display the desktop of the electronic device 100 by using the display 194.

The following describes an application scenario in an embodiment of this application and an embodiment of a user interface in the scenario.

Figure 3:
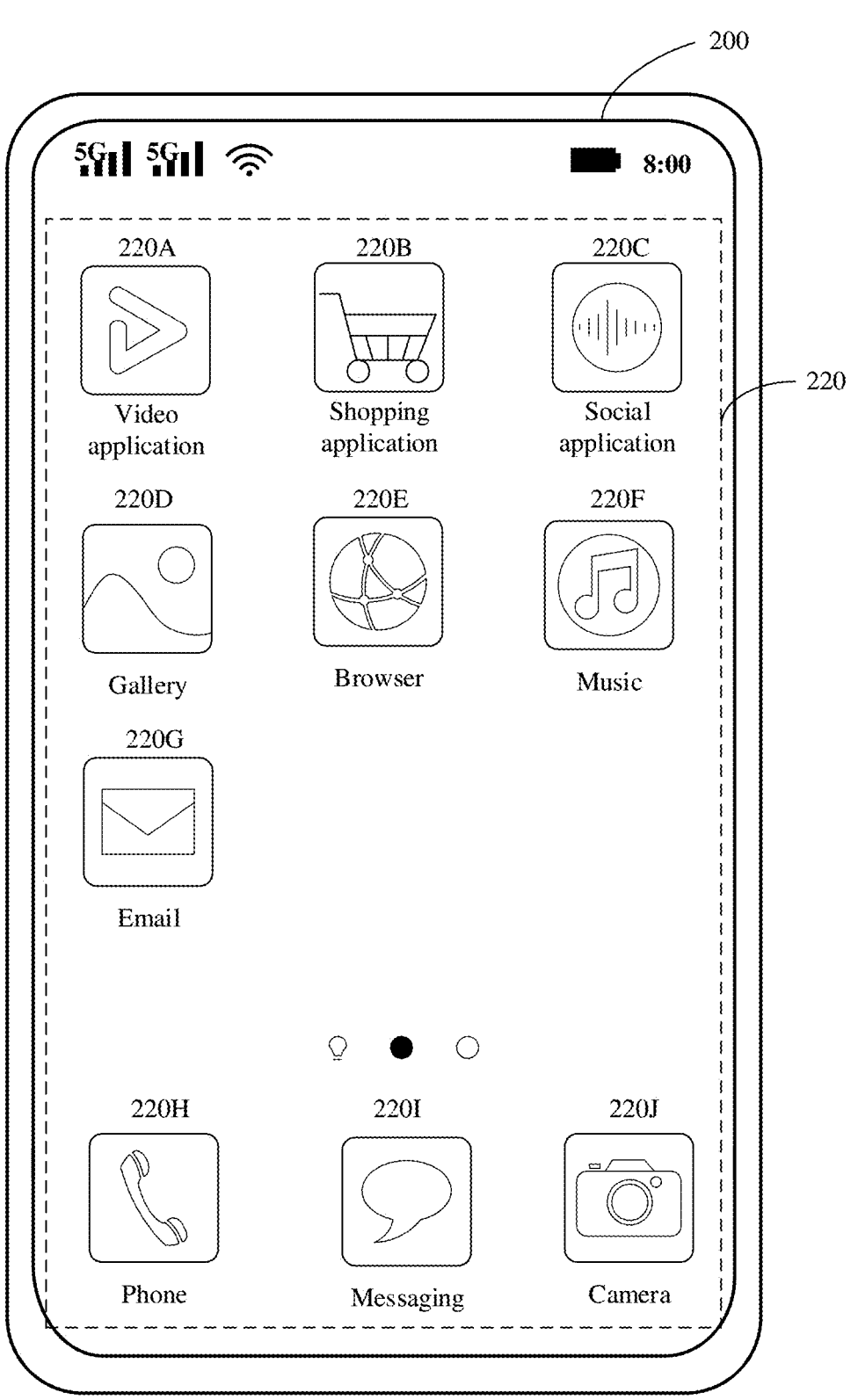
FIG. 3 to FIG. 25 are schematic diagrams of some user interface embodiments according to embodiments of this application.

FIG. 3 is an example of a schematic diagram of a user interface.

As shown in FIG. 3, an electronic device may display a user interface 200, and the user interface 200 may be a desktop of the electronic device. The user interface 200 may include application icons 220. The application icons 220 may include, for example, video application 220A, shopping application 220B, social application 220C, gallery 220D, browser 220E, music 220F, email 220G, phone 220H, messaging 2201, and camera 220J, and may further include an icon of another application. This is not limited in this application. In response to a user operation (for example, a touch operation) on an icon of any application, the electronic device may start the application corresponding to the icon, and display a main interface of the application corresponding to the icon.

Figure 4A:
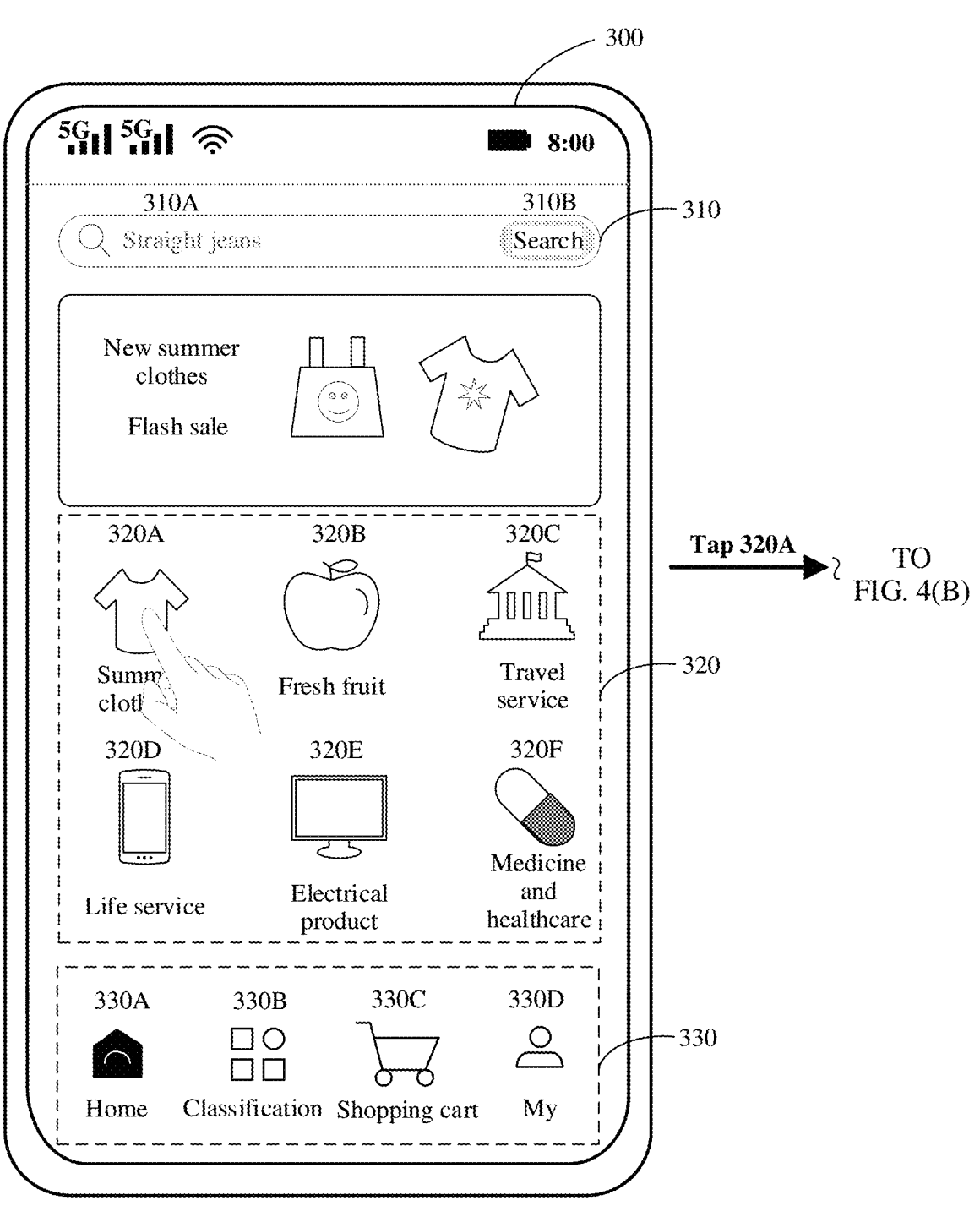

In some embodiments, assuming that a user wants to use the shopping application, the electronic device may receive a user operation (for example, a touch operation) that is for the shopping application 220B, and in response to the user operation, start the shopping application, and display a user interface 300 shown in FIG. 4(A).

FIG. 4(A) to FIG. 4(F) are an example of schematic diagrams of user interfaces in interface switching.

As shown in FIG. 4(A), the electronic device may display the user interface 300. The user interface 300 may include a search bar 310, shopping options 320, and page options 330.

The search bar 310 may be used to search, in the shopping application, for a product that the user wants to view. The search bar 310 may include an input box 310A and a search control 310B. The input box 310A may be used by the user to enter a name of a product that the user wants to view. In response to a user operation (for example, a touch operation) on the search control 310B, the electronic device may search for the product name entered by the user among products in the shopping application, and display a corresponding search result. For example, when content entered in the input box 310A is "pants", the electronic device may display a product whose product information includes "pants" in the shopping application, for example, display a user interface 420 shown in FIG. 4(C).

The shopping options 320 may include, for example, summer clothing 320A, fresh fruit 320B, travel service 320C, life service 320D, electrical product 320E, and medicine and healthcare 320F. This is not limited in this application. In response to a user operation (for example, a touch operation) on an icon of any shopping option, the electronic device may display a user interface of the shopping option corresponding to the icon.

The page options 330 may include, for example, a home page option 330A, a classification option 330B, a shopping cart option 330C, and my option 330D. This is not limited in this application. The home page option 330A on the user interface 300 is in a selected state, indicating that the user interface 300 is a home page of the shopping application, that is, a main interface of the shopping application. In response to a user operation (for example, a touch operation) on an icon of any one of the page options 330, the electronic device may display a shopping interface of the option corresponding to the icon.

Figure 4B:
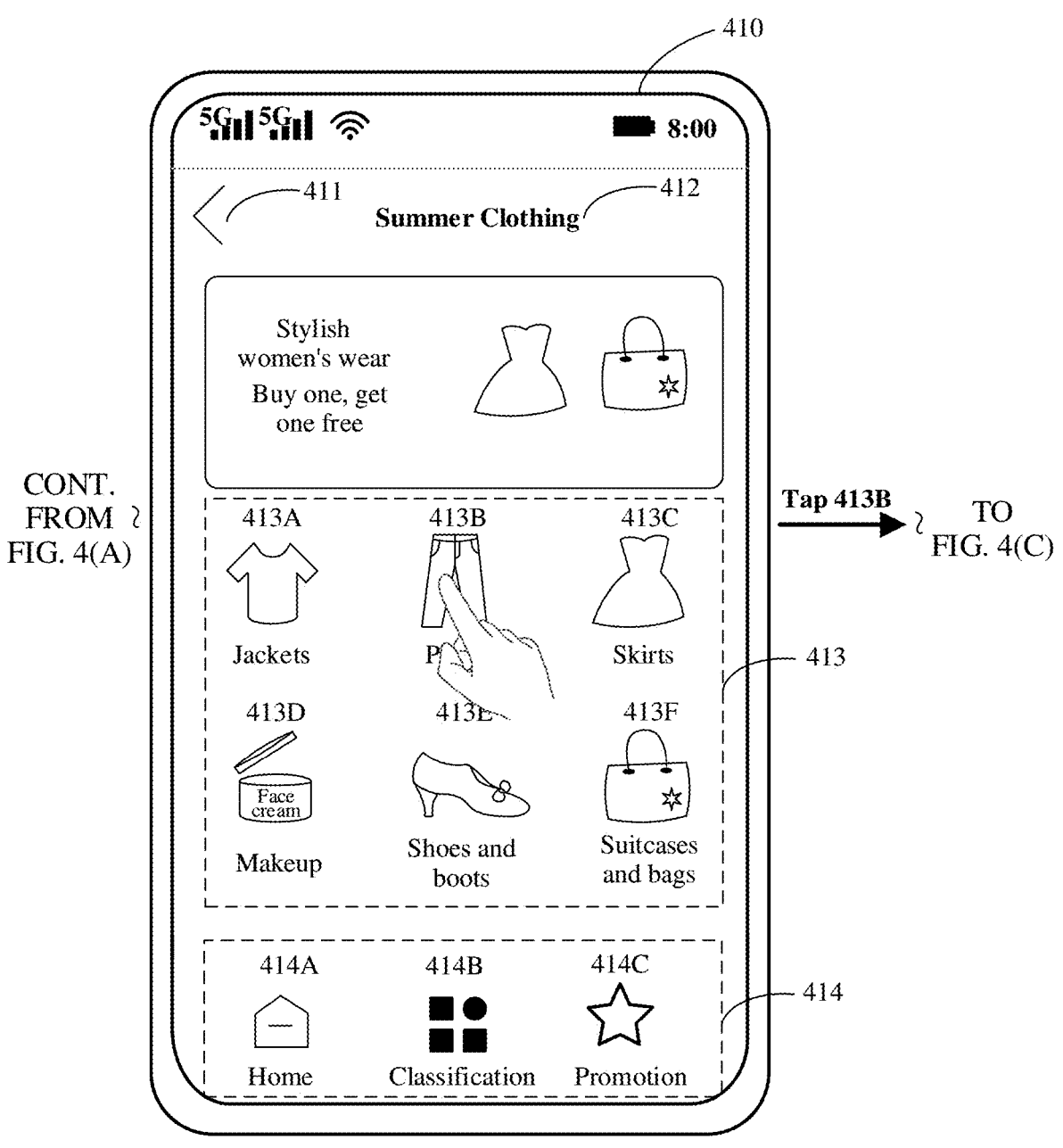

In some embodiments, assuming that the user wants to view "summer clothing", the electronic device may receive a user operation (for example, a touch operation) that is for the summer clothing 320A, and display, in response to the user operation, a shopping interface corresponding to "summer clothing", for example, a user interface 410 shown in FIG. 4(B).

As shown in FIG. 4(B), the electronic device may display the user interface 410. The user interface 410 may include a return button 411, a page heading 412 (that is, "summer clothing"), shopping options 413, and page options 414.

The return button 411 may be used to return to an interface previous to the current interface. The electronic device may receive a user operation (for example, a touch operation) that is for the return button 411, and display, in response to the user operation, the interface previous to the user interface 410.

The shopping options 413 may include, for example, jackets 413A, pants 413B, skirts 413C, makeup 413D, shoes and boots 413E, and suitcases and bags 413F. This is not limited in this application. In response to a user operation (for example, a touch operation) on an icon of any option, the electronic device may display a user interface of the shopping option corresponding to the icon.

The page options 414 may include, for example, a home page option 414A, a classification option 414B, and an activity option 414C. This is not limited in this application. The classification option 414B on the user interface 410 is in a selected state, indicating that the user interface 410 is a classification interface of summer clothing. In response to a user operation (for example, a touch operation) on an icon of any one of the page options 414, the electronic device may display a shopping interface of the option corresponding to the icon.

Figures 4B, 4C, 4D:
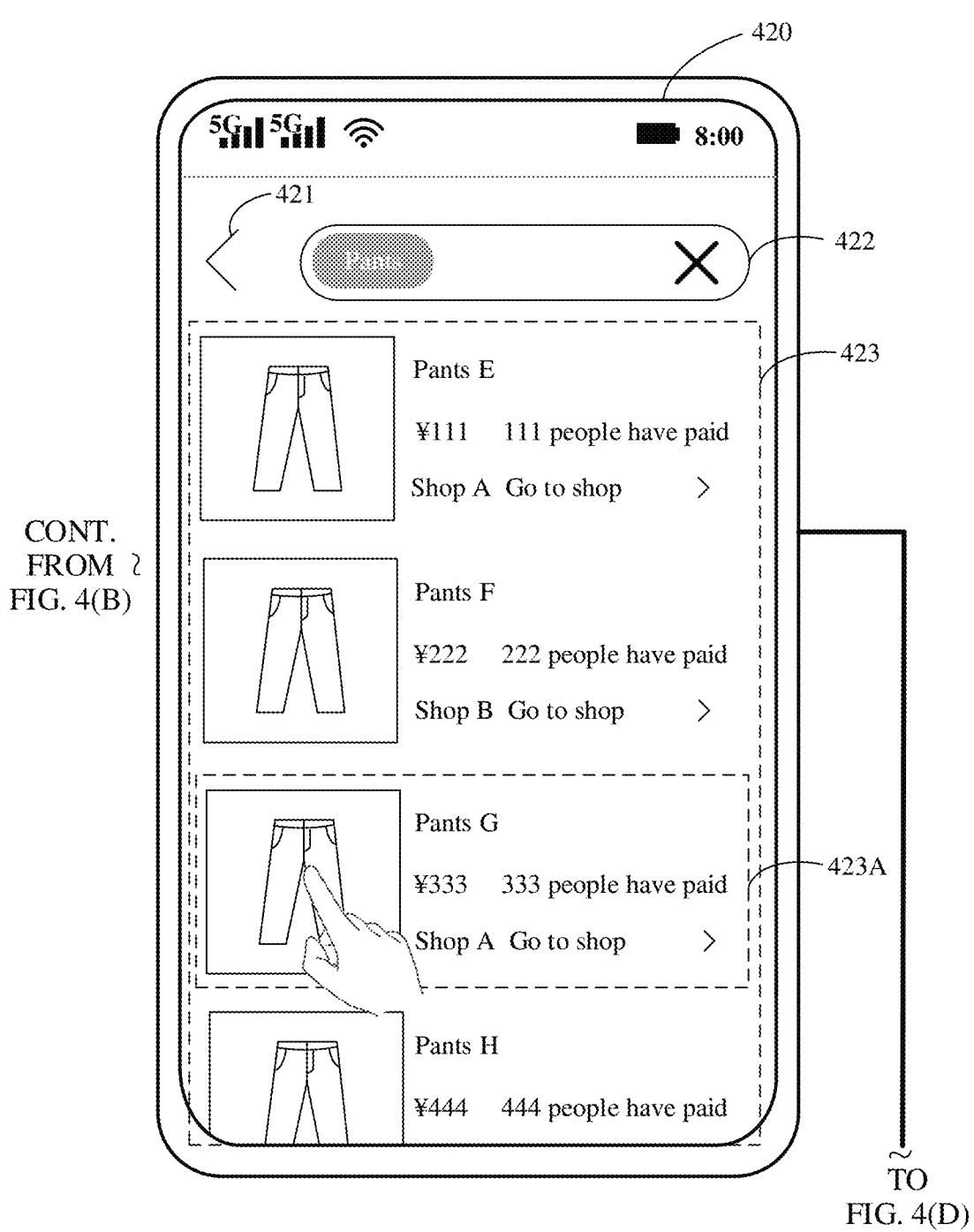
Figure 4D:
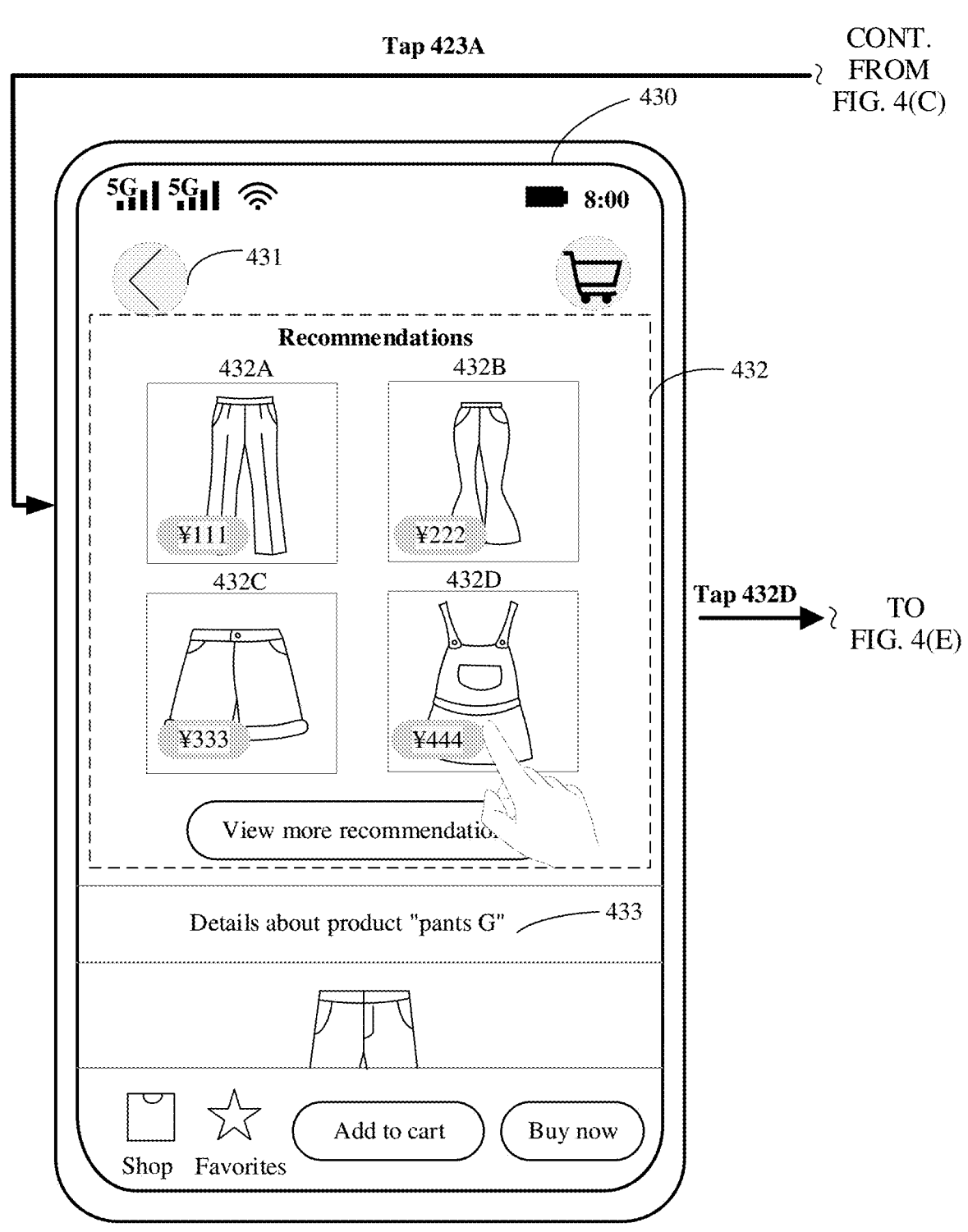

In some embodiments, assuming that the user wants to view "pants", the electronic device may receive a user operation (for example, a touch operation) that is for the pants 413B, and display, in response to the user operation, a shopping interface corresponding to "pants", for example, the user interface 420 shown in FIG. 4(C).

As shown in FIG. 4(C), the electronic device may display the user interface 420. The user interface 420 may include a return button 421, a search bar 422, and a product list 423, where the return button 421 is similar to the return button 411 shown on the user interface 410, and details are not described again.

The search bar 422 may be used to search, in the shopping application, for a product that the user wants to view. "Pants" has been entered in the search bar 422 on the user interface 420, indicating that the user interface 420 includes a list of products whose product information includes "pants" in the shopping application, that is, the product list 423.

The product list 423 may include information about a plurality of products, for example, product names: pants A (not shown), pants B (not shown), pants C (not shown), pants D (not shown), pants E, pants F, pants G, and pants H. The electronic device may receive a user operation (for example, a touch operation) that is for an option of any product, and display, in response to the user operation, detailed information about the product corresponding to the option.

In some embodiments, assuming that the user wants to view "pants G", the electronic device may receive a user operation (for example, a touch operation) that is for an option 423A of "pants G", and display detailed information about "pants G" in response to the user operation, for example, a user interface 430 shown in FIG. 4(D).

As shown in FIG. 4(D), the electronic device may display the user interface 430. The user interface 430 may include a return button 431, recommended products 432, detailed information 433 about the product "pants G", and shopping options. The return button 431 is similar to the return button 411 shown on the user interface 410, and details are not described again.

The recommended products 432 are used to display pictures and prices of other products recommended based on "pants G", and may include options of the plurality of other products, for example, a product option 432A, a product option 432B, a product option 432C, and a product option 432D. In response to a user operation (for example, a touch operation) on any option, the electronic device may display detailed information about a product corresponding to the option.

Specific content of the detailed information 433 about the product "pants G" is not shown on the user interface 430. For example, the detailed information includes but is not limited to: price information, an express delivery fee, a monthly sales volume, a shipping city, a product service, a product size and color, product specifications, pictures from a plurality of angles, size information, and the like.

The shipping options may include but are not limited to options such as a shop, favorites, add to cart, and buy now.

Figures 4D, 4E, 4F:
Figures 4E, 4F:

In some embodiments, assuming that the user wants to view a product corresponding to the product option 432D, the electronic device may receive a user operation (for example, a touch operation) that is for the product option 432D, and display, in response to the user operation, detailed information about the product corresponding to the option, for example, a user interface 510 shown in FIG. 4(E).

As shown in FIG. 4(E), the electronic device may display the user interface 510. Similar to the user interface 430, the user interface 510 may include a return button, detailed information about a product "dress A", shopping options, recommended products (not shown), and the like. Details are not described again.

The user interface displayed by the electronic device may be switched from the user interface 430 shown in FIG. 4(D) to the user interface 510 shown in FIG. 4(E). This process may be understood as switching from a user interface of one product to a user interface of another product. In a process of using the shopping application, the user may implement switching between user interfaces of products for a plurality of times, for example, switching from the user interface 510 of "dress A" shown in FIG. 4(E) to a user interface 520 of "dress B" shown in FIG. 4(F). The user interface 520 is similar to the user interface 510 and the user interface 430, and details are not described again.

In some embodiments, after viewing a plurality of user interfaces, the user wants to return to a user interface that has been viewed previously. For example, when the electronic device displays the user interface 520 shown in FIG. 4(F), the user wants to return to the main interface of the shopping application, that is, the user interface 300 shown in FIG. 4(A). The user usually needs to perform a plurality of return operations to return to each viewed user interface. For example, the user taps a return button on a user interface of the shopping application for a plurality of times, for example, performs a plurality of return operations in gesture navigation. A specific example is shown in FIG. 5(A) to FIG. 5(F).

The following embodiment is described by using an example in which a return operation is a return operation in gesture navigation (assuming that the return operation is an operation of sliding inward from a left edge of a screen).

FIG. 5(A) to FIG. 5(F) are an example of schematic diagrams of user interfaces in a returning process.

Figure 5A:
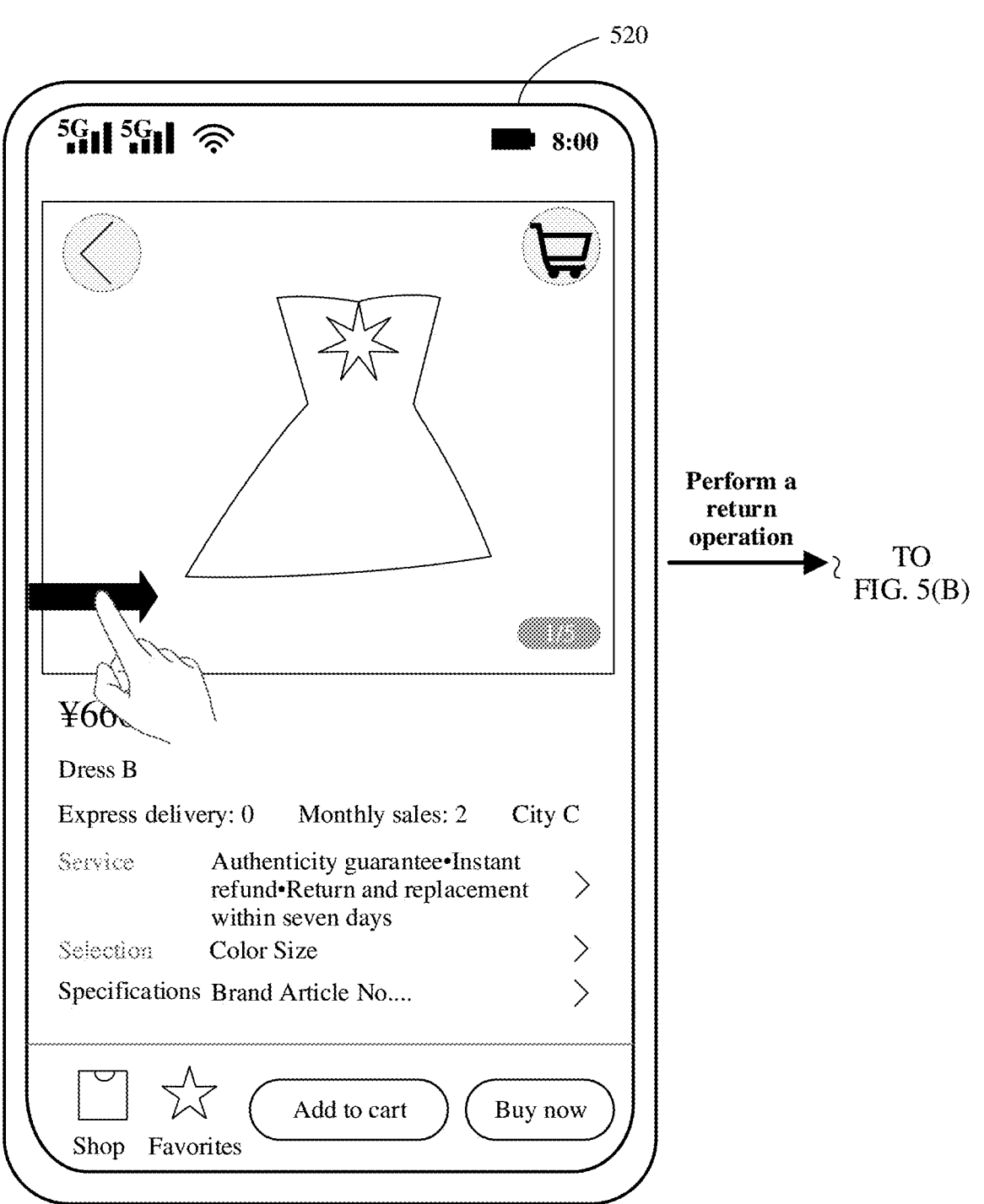
Figures 5A, 5B, 5C:
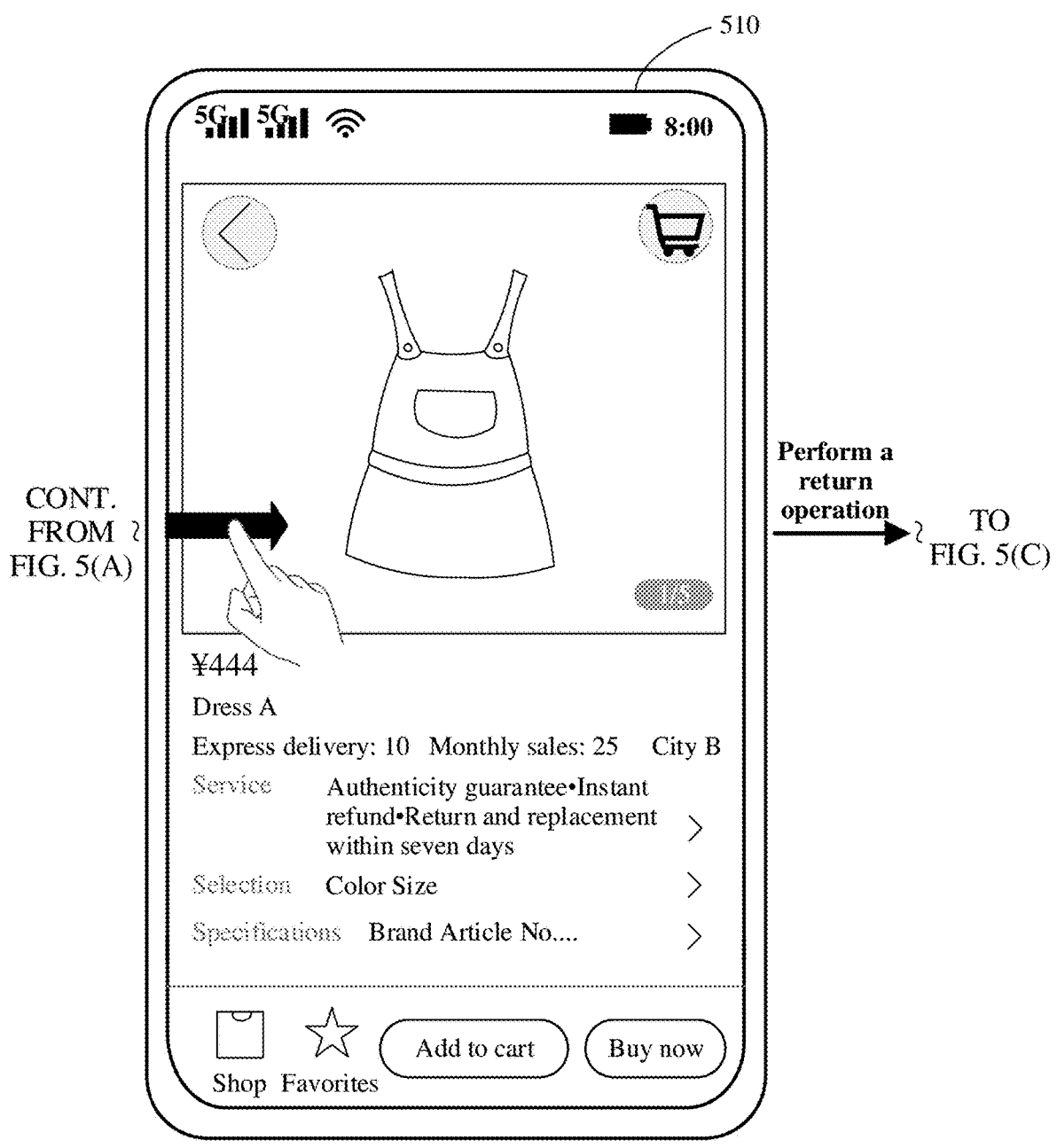
Figure 5C:
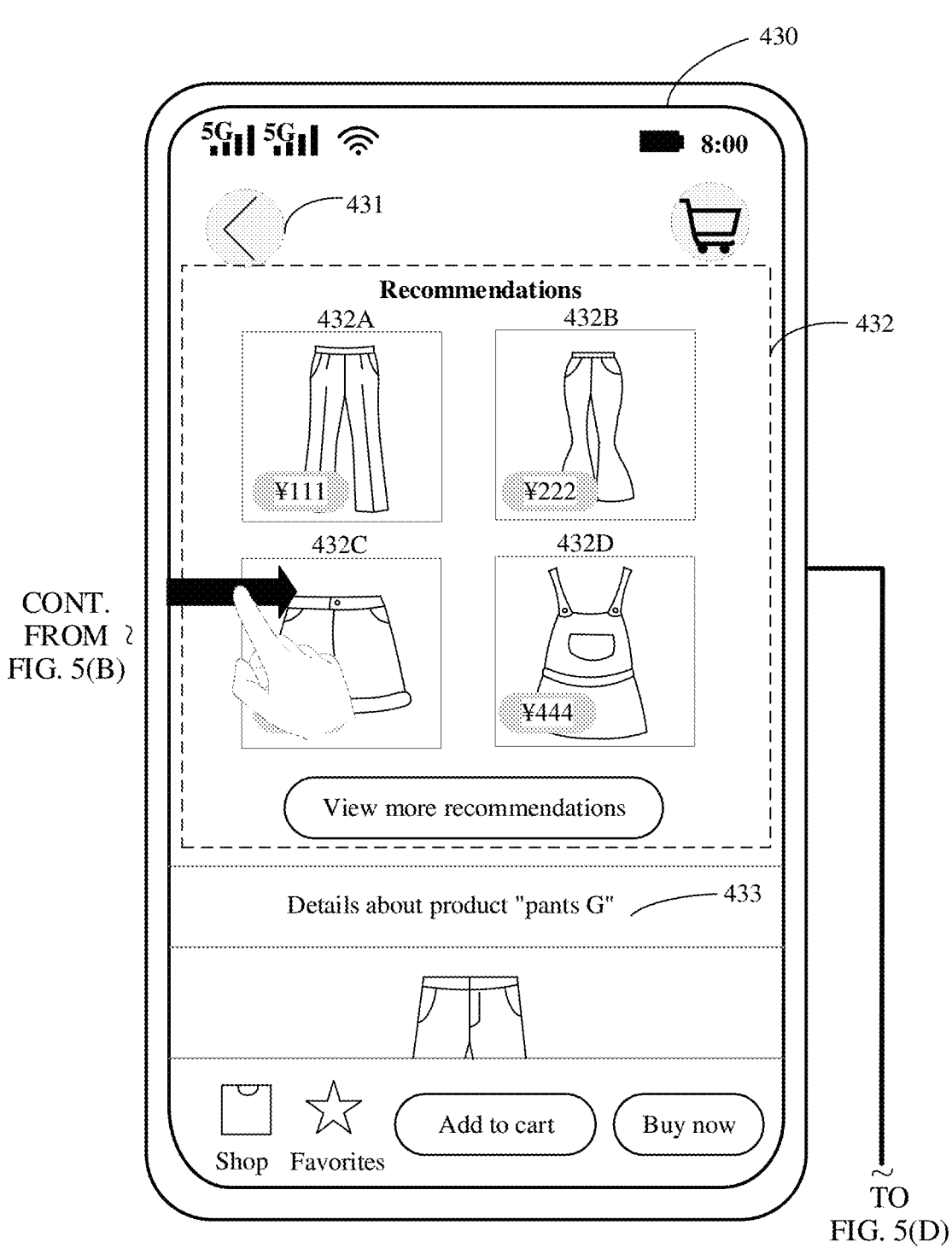
Figure 5D:
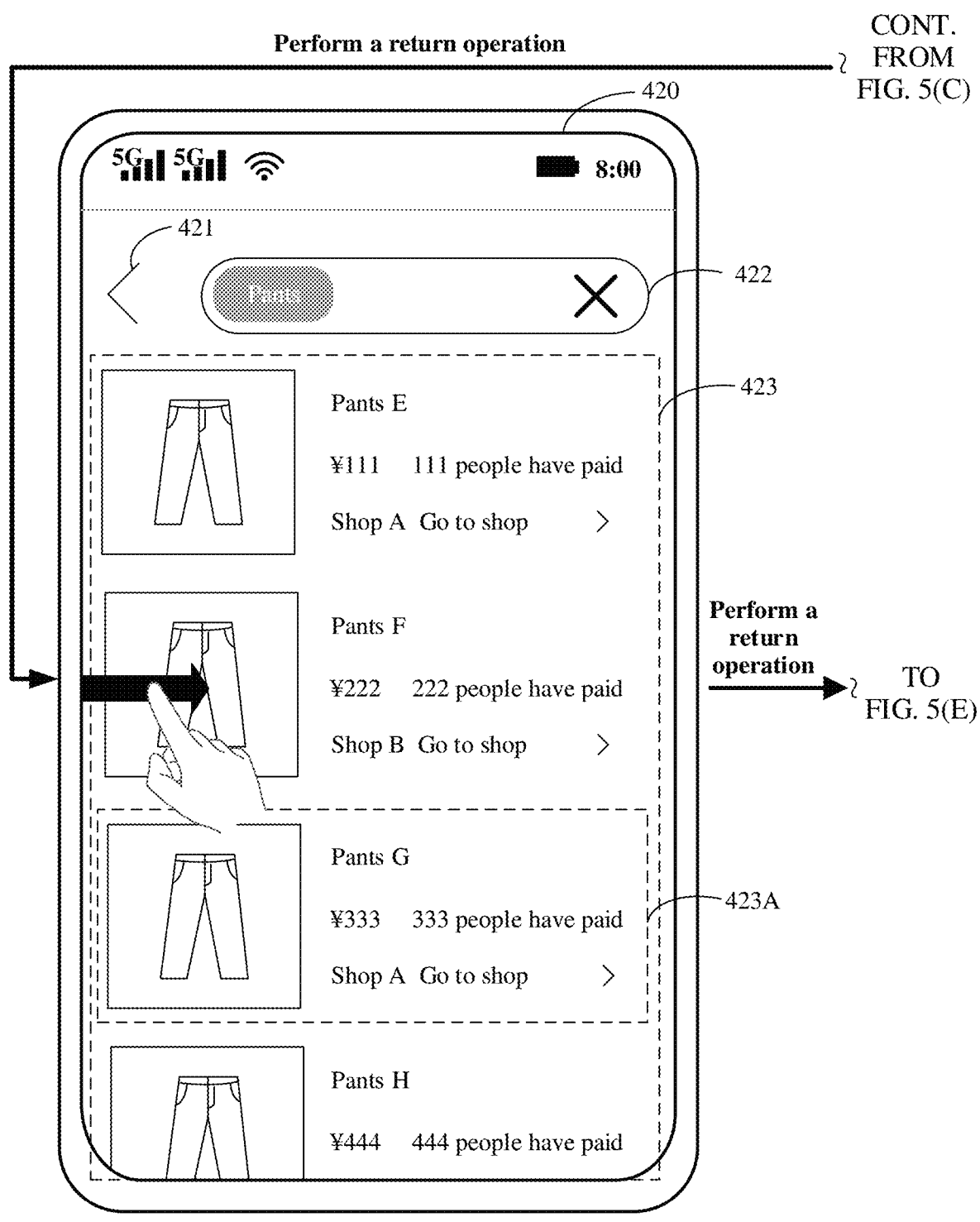
Figure 5E:
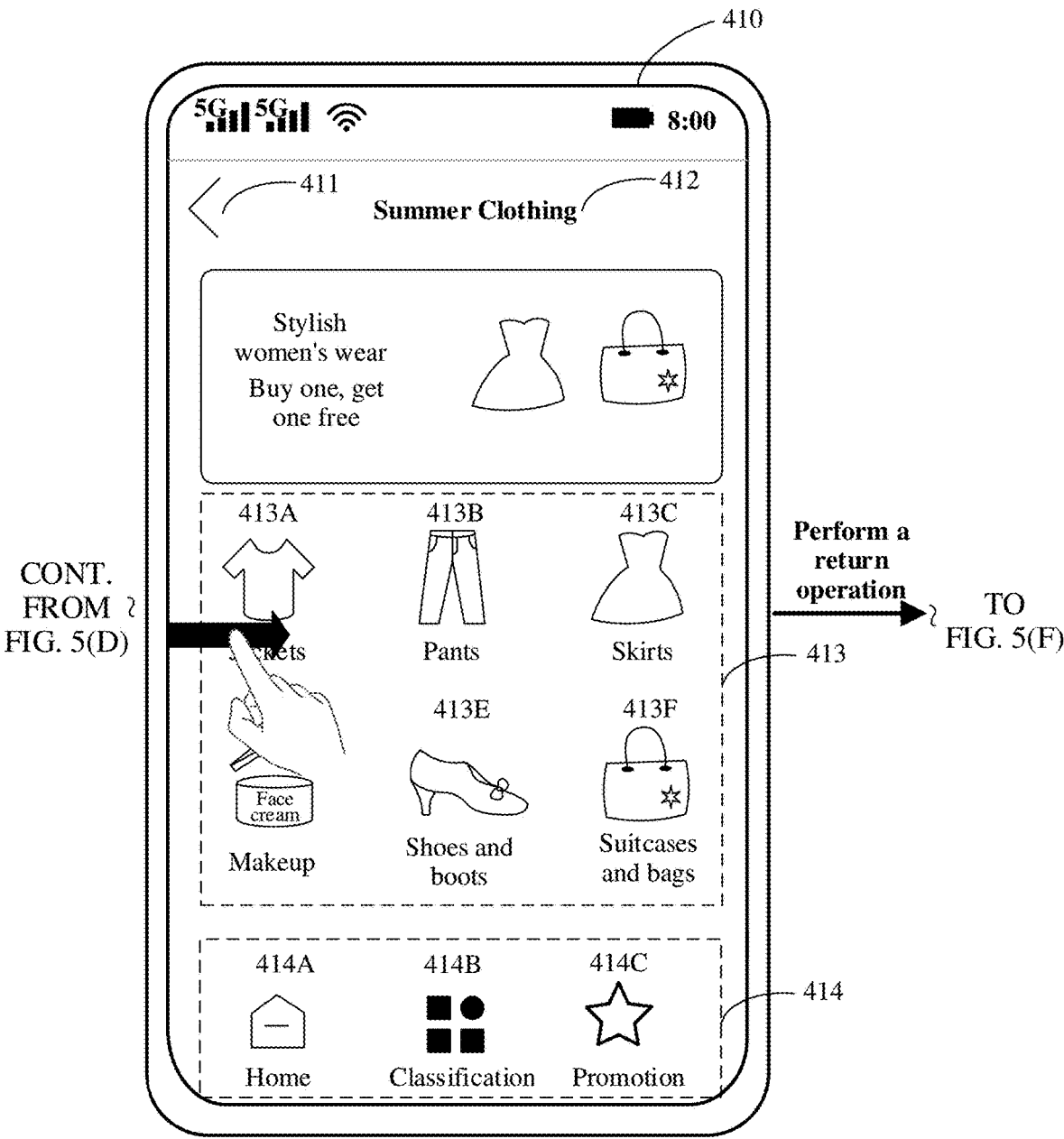
Figures 5E, 5F:
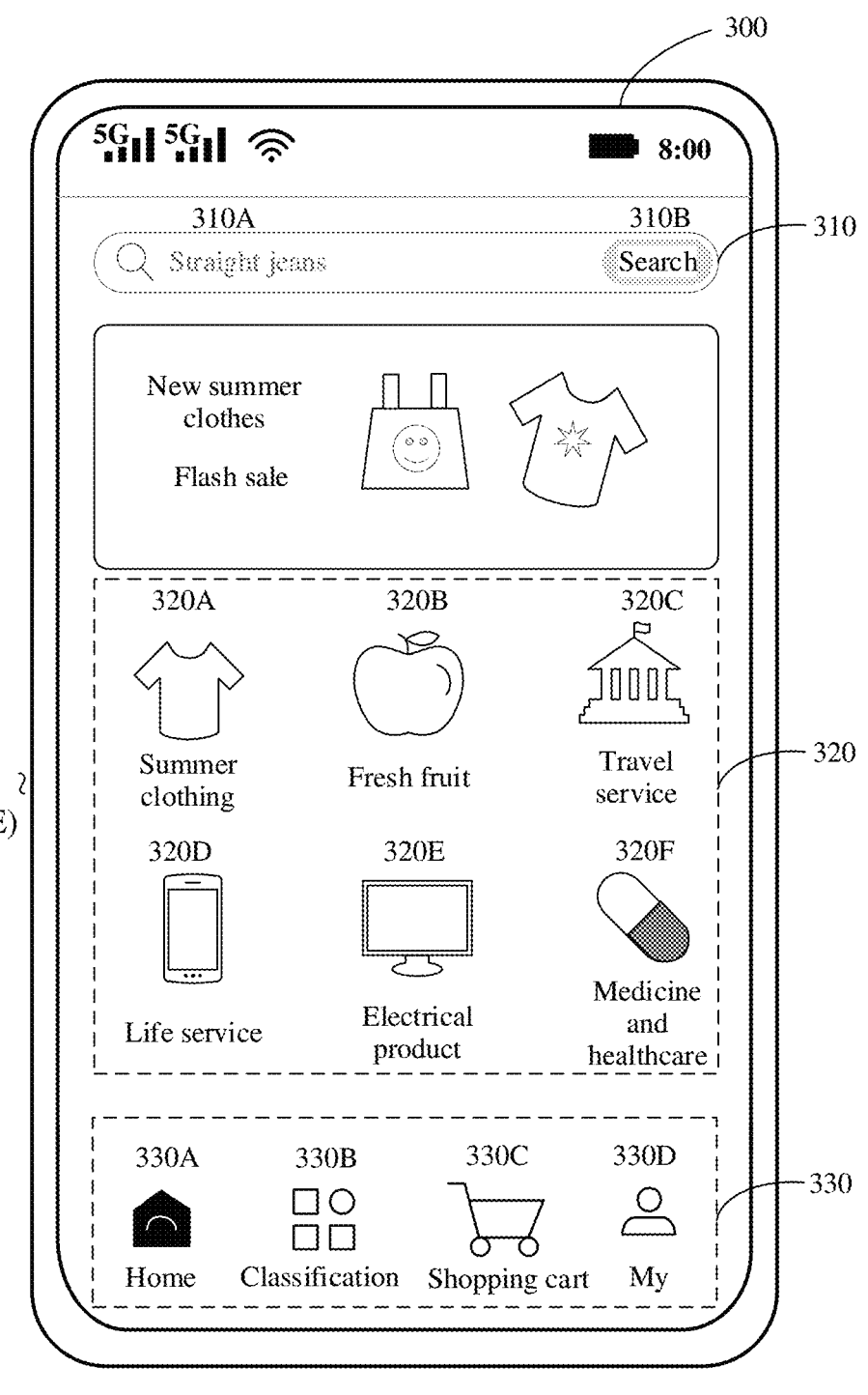

As shown in FIG. 5(A), when displaying the user interface 520, the electronic device may receive a return operation (for example, a sliding operation of sliding inward from the left edge of the screen), and display, in response to the return operation, an interface previous to the user interface 520, that is, the user interface 510 shown in FIG. 5(B). The foregoing process may be understood as "the electronic device returns to one user interface after the user performs one return operation". When the electronic device displays the user interface 520, the user may continuously perform five return operations. In response to the five return operations, the electronic device may sequentially return to display the user interface 510 shown in FIG. 5(B), the user interface 430 shown in FIG. 5(C), the user interface 420 shown in FIG. 5(D), the user interface 410 shown in FIG. 5(E), and the user interface 300 shown in FIG. 5(F). In other words, the user needs to perform five return operations and the electronic device returns to display four user interfaces midway before the user can return from the user interface 520 to the main interface of the shopping application, that is, the user interface 300. The user operations are complex, and experience is poor.

In this application, the electronic device may return to a plurality of user interfaces in response to one return operation, so that a quantity of return operations performed by the user is reduced, which is more convenient.

In some embodiments, when duration of receiving a first preset quantity of return operations is less than or equal to first preset duration, the electronic device may return to a plurality of user interfaces.

For example, when the electronic device displays the user interface 520 shown in FIG. 5(A), the user may continuously perform two return operations within one second, and in response to the two return operations, the electronic device may sequentially return to display the user interface 510 shown in FIG. 5(B) and the user interface 430 shown in FIG. 5(C). When the electronic device displays the user interface 430, the user may perform a return operation again within one second, and in response to the return operation, the electronic device may directly return to display the main interface of the shopping application, that is, the user interface 300 shown in FIG. 5(F). In other words, in response to the return operation, the electronic device may return to three user interfaces: the user interface 420 shown in FIG. 5(D), the user interface 410 shown in FIG. 5(E), and the user interface 300 shown in FIG. 5(F), but the electronic device displays only the user interface 300.

The foregoing example is described by using an example in which the first preset quantity is three and the first preset duration is two seconds. The electronic device may return to a plurality of user interfaces in response to the third return operation performed within the two seconds. In the foregoing example, the user needs to perform only three return operations to reach an interface that is in FIG. 5(A) to FIG. 5(F) and that can be returned to only after five return operations are performed: the user interface 300. Therefore, steps of user operations are reduced. In addition, in the foregoing example, the electronic device actually returns to five user interfaces, but returns to display only three user interfaces. This avoids problems such as flickering, a blank screen, and frame freezing caused by a plurality of quick return operations, and improves user experience.

Without being limited to the foregoing example, the electronic device may alternatively return to a plurality of user interfaces when a quantity of return operations received in a period of first preset duration is greater than or equal to the first preset quantity.

Without being limited to the foregoing example, values of the first preset duration and the first preset quantity may alternatively be other values. This is not limited in this application.

In some embodiments, when duration of receiving a second preset quantity of common return operations is less than or equal to second preset duration, the electronic device may display prompt information, and the user may perform a quick return operation based on the prompt information. A common return operation is used to return to an interface previous to a current interface (which may also be referred to as returning to a user interface), and the quick return operation is used to return to a plurality of user interfaces. A specific example is shown in FIG. 6(A) to FIG. 6(F).

FIG. 6(A) to FIG. 6(F) are another example of schematic diagrams of user interfaces in a returning process.

Figure 6A:
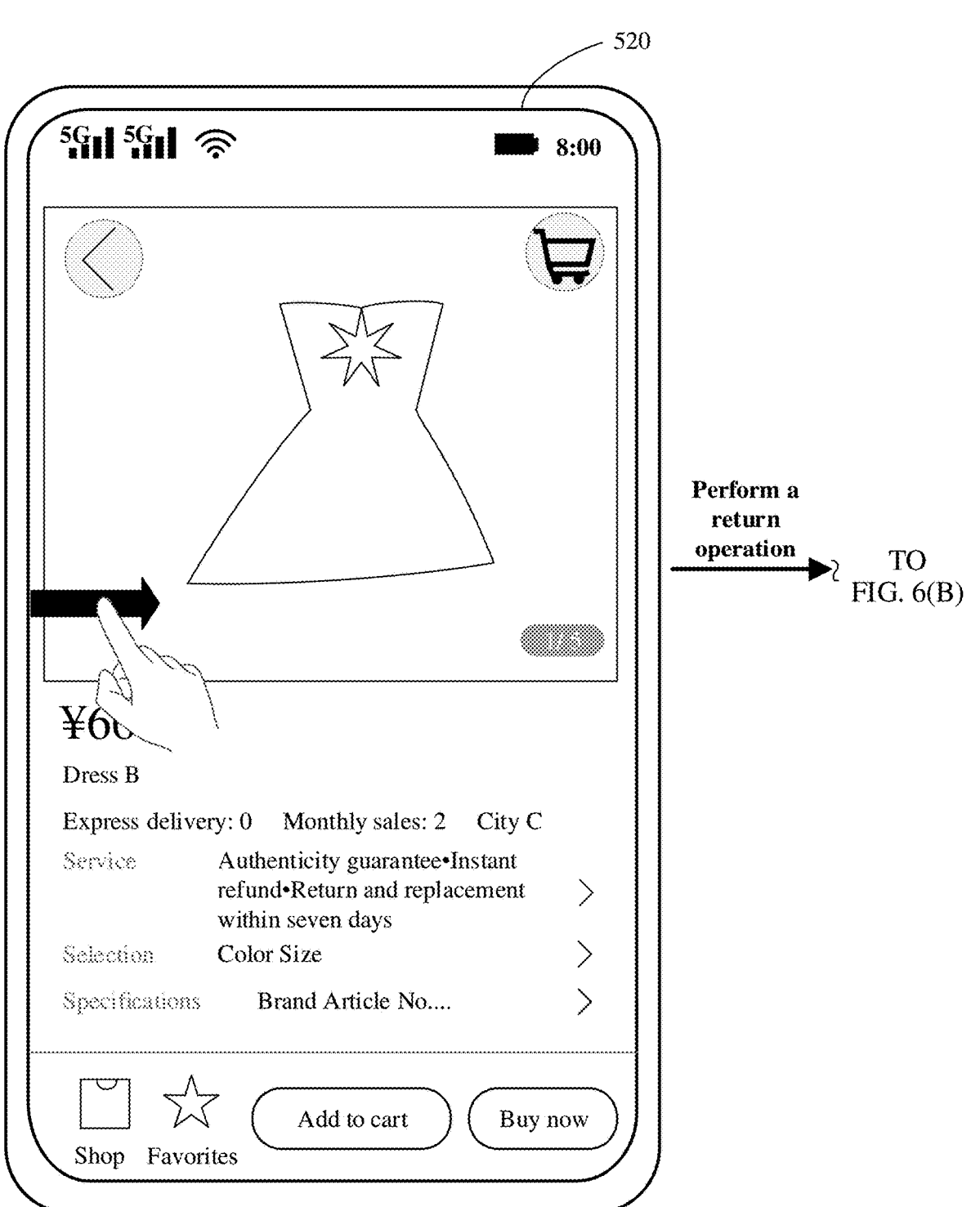
Figures 6A, 6B, 6C:
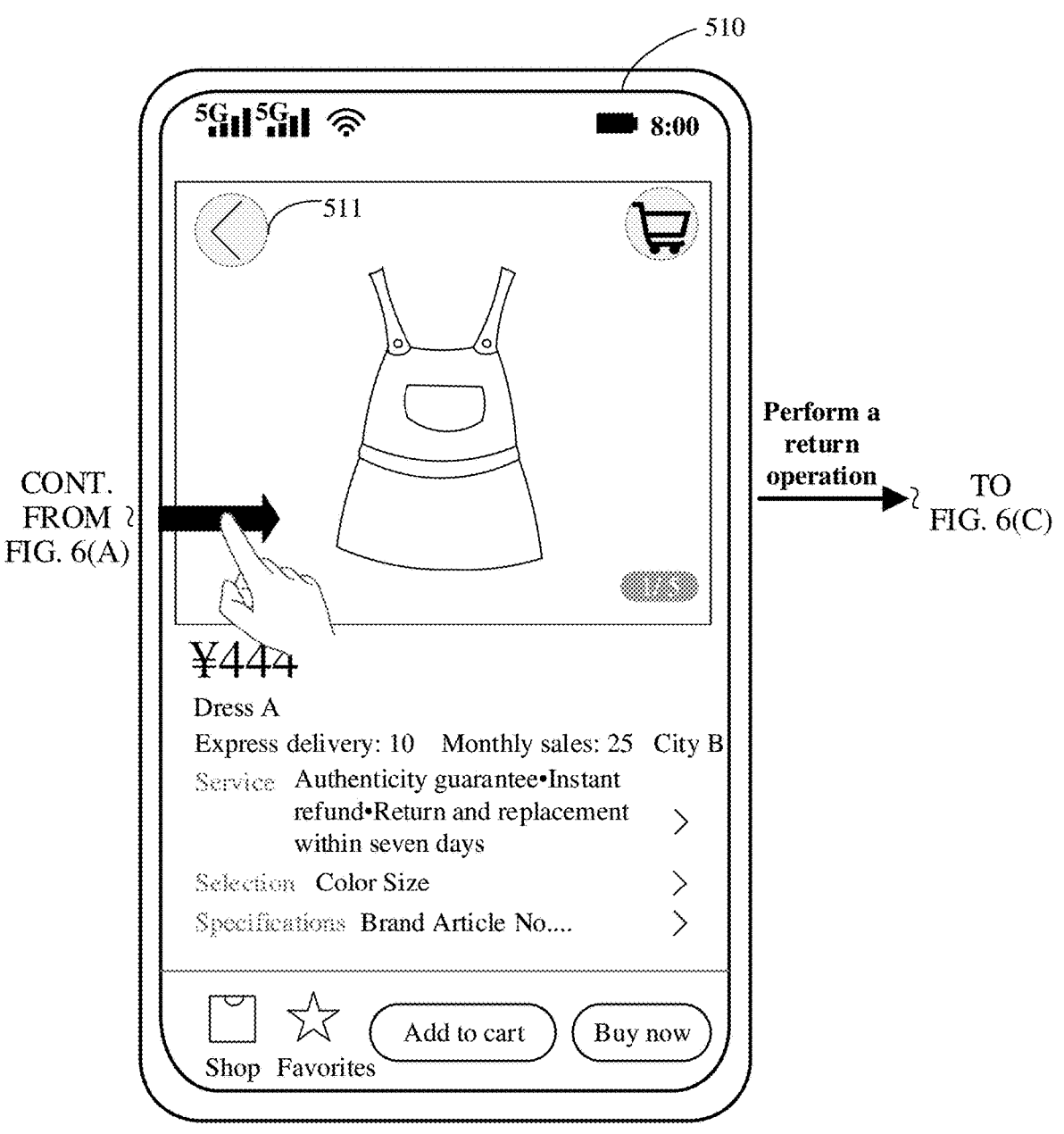
Figure 6C:
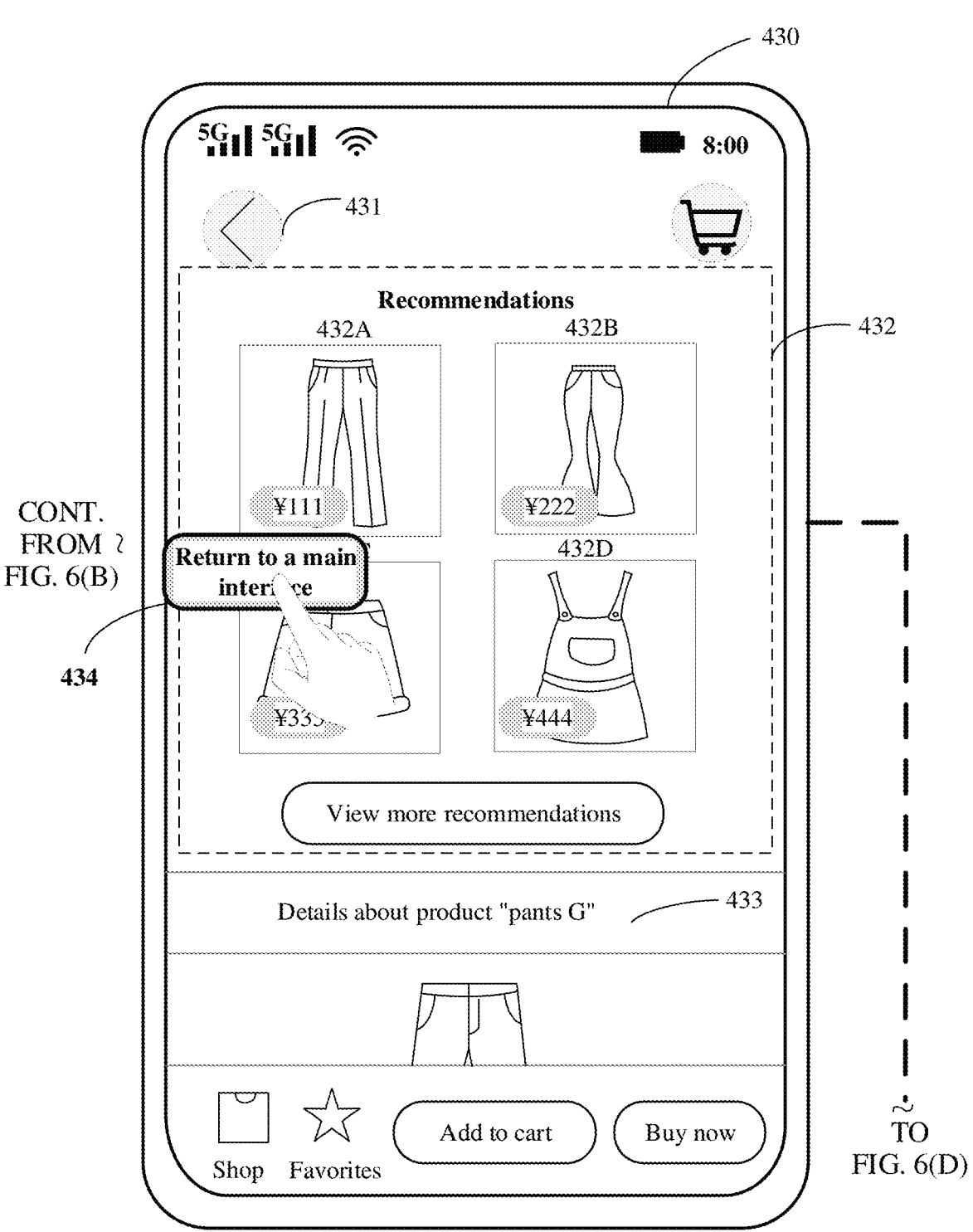
Figure 6D:
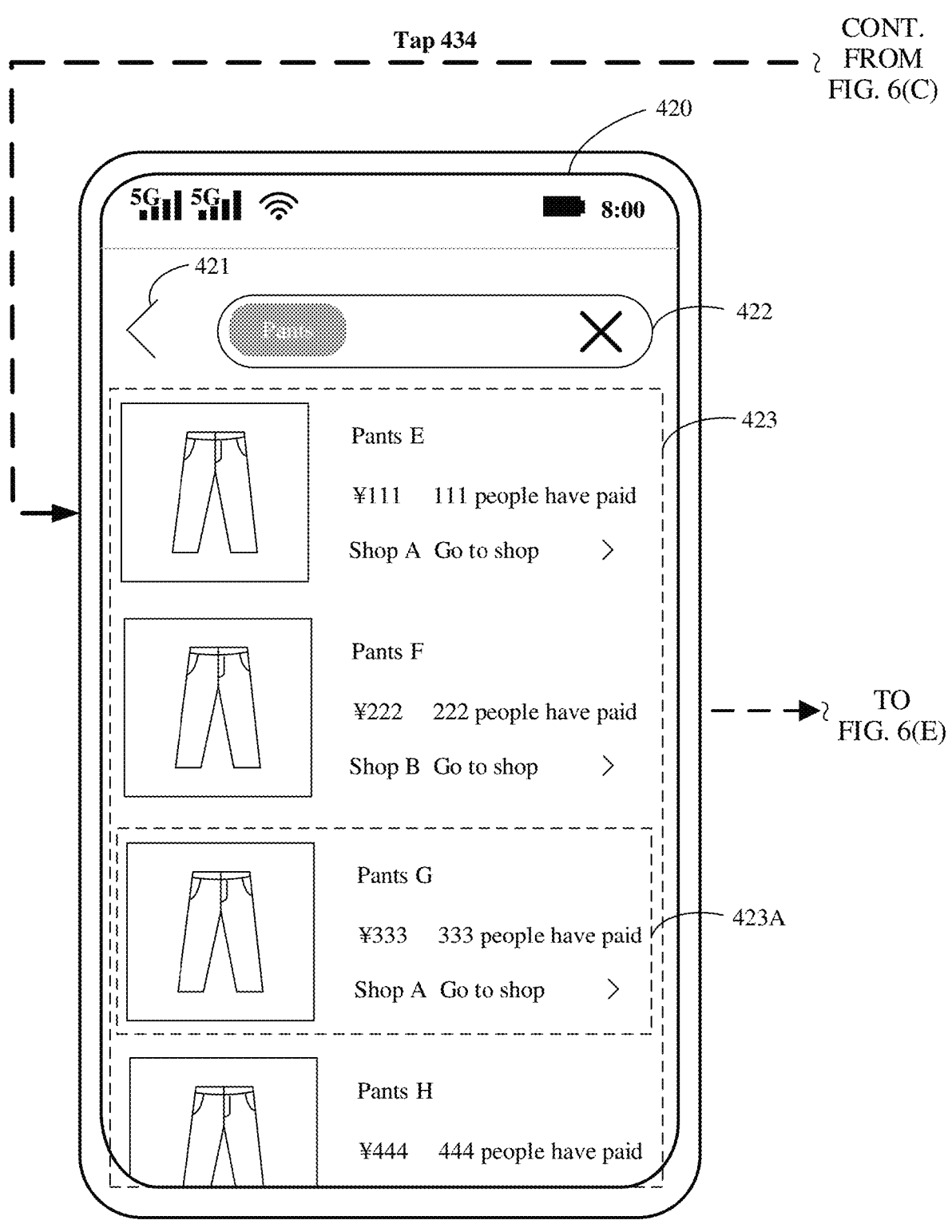
Figure 6E:
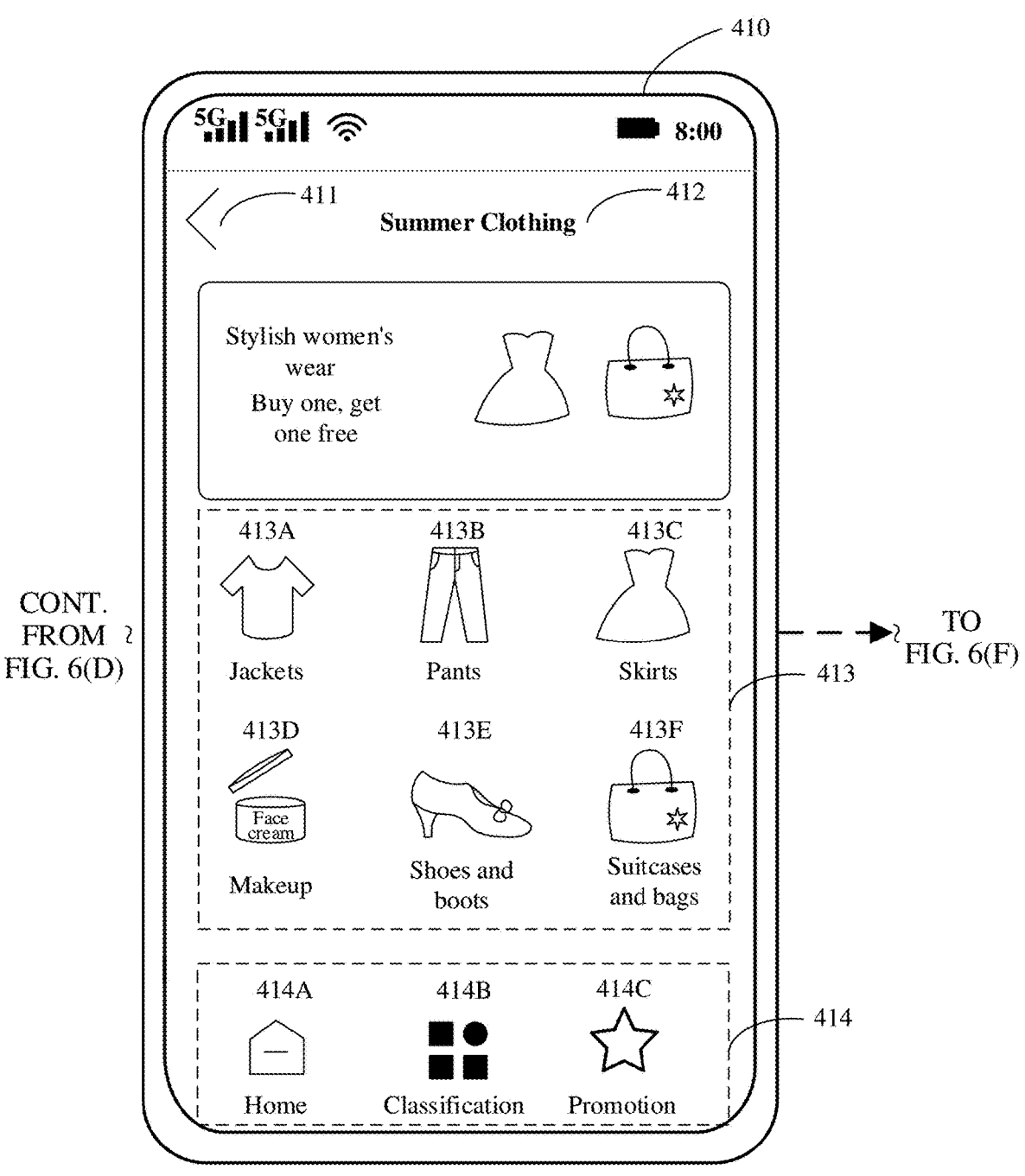
Figure 6F:
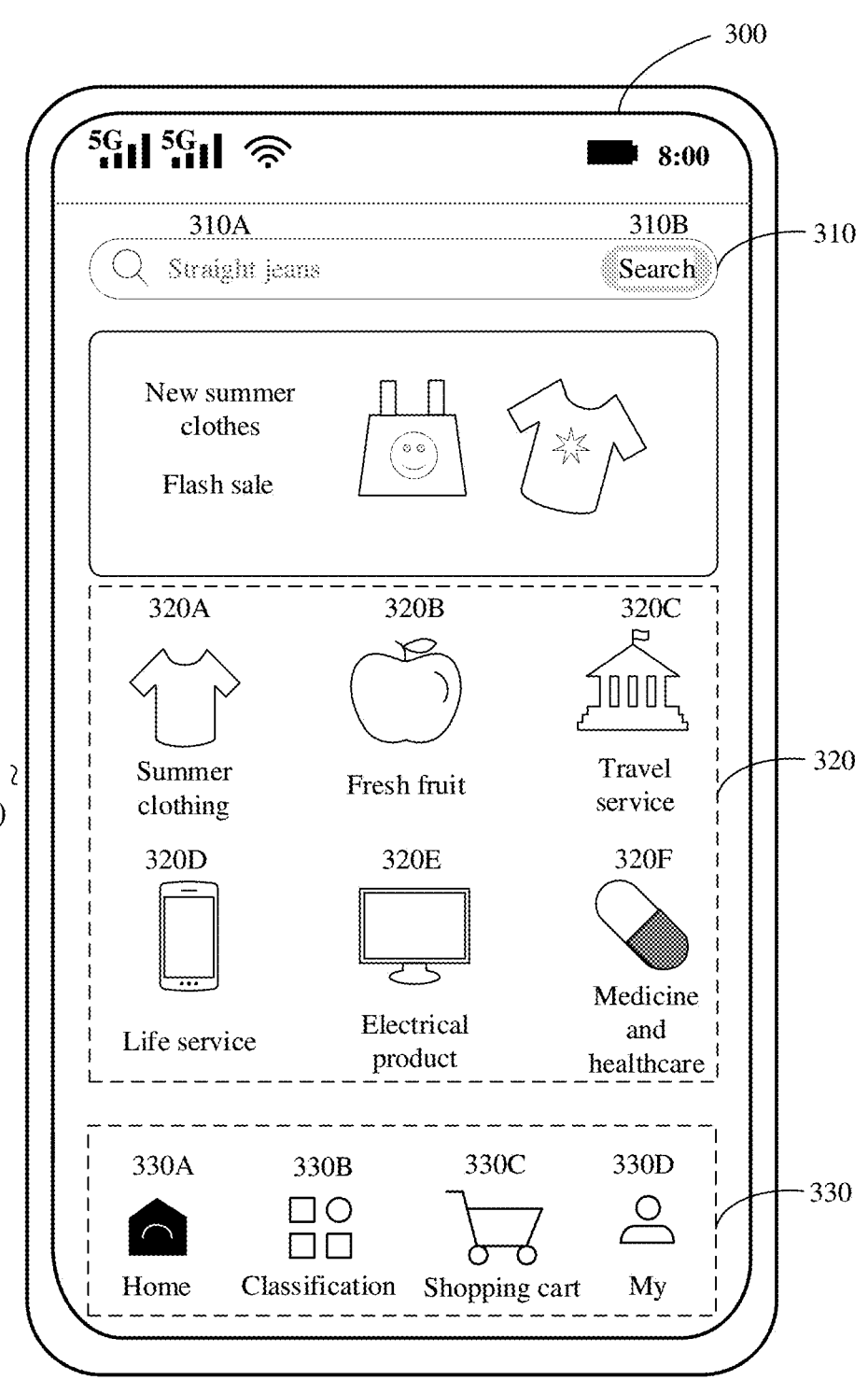

As shown in FIG. 6(A), when the electronic device displays the user interface 520, the user may continuously perform two return operations within one second, and in response to the two return operations, the electronic device may sequentially return to display the user interface 510 shown in FIG. 6(B) and the user interface 430 shown in FIG. 6(C). In addition, in response to the second return operation performed within one second, the electronic device may display first prompt information 434 on the user interface 430 returned to for displaying. The first prompt information 434 may include a text "return to the main interface". In some embodiments, the first prompt information 434 is used to indicate a user interface displayed after the user performs a quick return operation: a main interface of a current application (that is, the shopping application). The electronic device may receive a tap operation that is for the first prompt information 434, that is, may receive a quick return operation, and in response to the quick return operation, directly return to the main interface of the shopping application, that is, the user interface 300 shown in FIG. 6(F). In other words, in response to the quick return operation, the electronic device may return to three user interfaces: the user interface 420 shown in FIG. 6(D), the user interface 410 shown in FIG. 6(E), and the user interface 300 shown in FIG. 6(F), but the electronic device displays only the user interface 300.

As shown in FIG. 6(A) to FIG. 6(F), the user needs to perform only two common return operations and one quick return operation to reach an interface that is in FIG. 5(A) to FIG. 5(F) and that can be returned to only after five common return operations are performed: the user interface 300. Therefore, steps of user operations are reduced. In addition, in the foregoing example, the electronic device actually returns to five user interfaces, but returns to display only three user interfaces. This avoids problems such as flickering, a blank screen, and frame freezing caused by a plurality of quick return operations, and improves user experience.

Without being limited to the foregoing example, the electronic device may alternatively display prompt information about the quick return operation when a quantity of return operations received in a period of second preset duration is greater than or equal to the second preset quantity.

In FIG. 6(A) to FIG. 6(F), an example in which the second preset quantity is two and the second preset duration is one second is used for description. During specific implementation, values of the second preset duration and the second preset quantity may alternatively be other values. This is not limited in this application.

Figure 9:
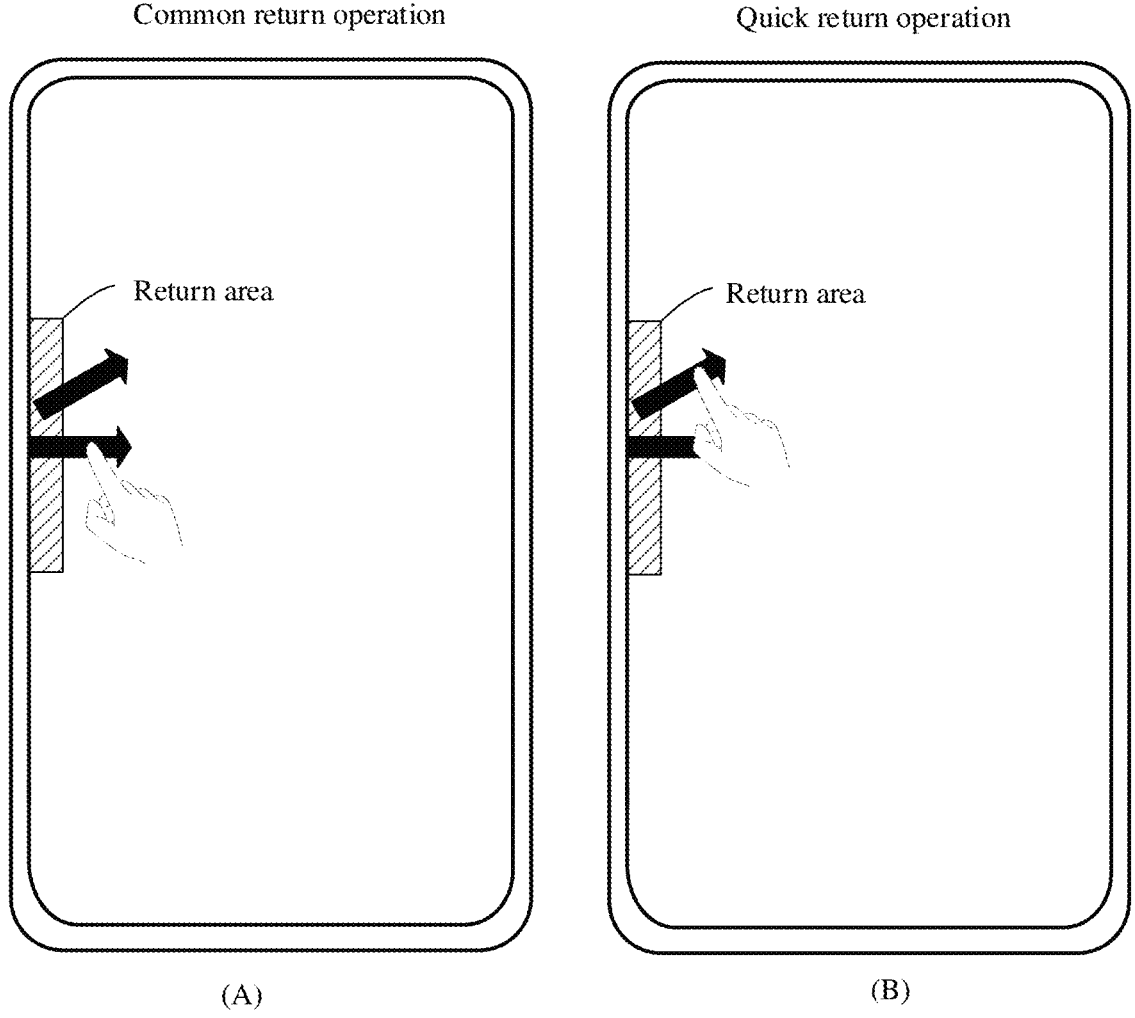

Without being limited to the foregoing listed quick return operations, the quick return operation may alternatively be another user operation different from a common return operation. The quick return operation and the common return operation are, for example, without limitation, for different areas, on different controls, or in different manners. Specific examples are shown in FIG. 7 and FIG. 9.

Figure 7:
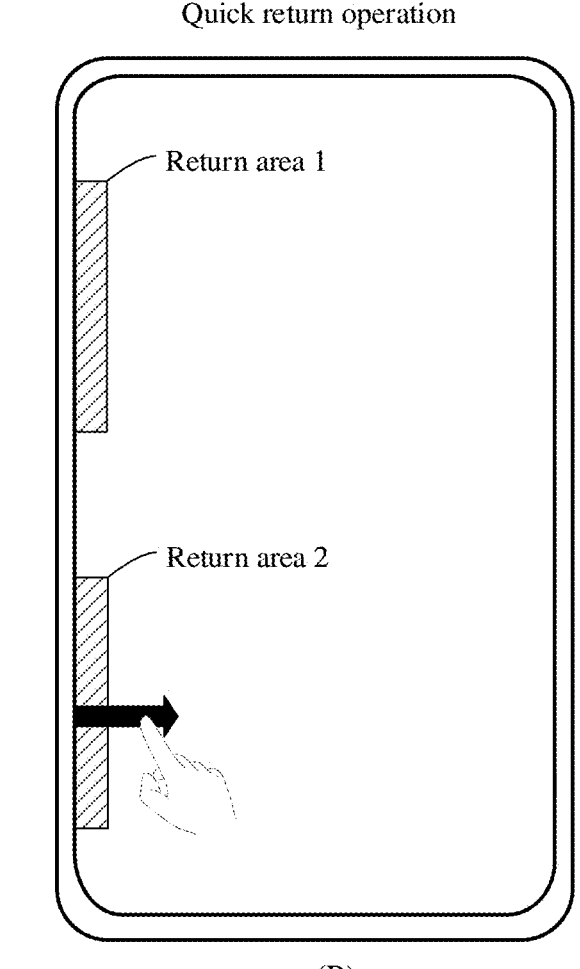

FIG. 7 is an example of schematic diagrams of return operations. (A) in FIG. 7 is a schematic diagram of a common return operation. (B) in FIG. 7 is a schematic diagram of a quick return operation.

As shown in FIG. 7, the quick return operation and the common return operation may be for different areas. An area which the common return operation is for may be a return area 1, and an area which the quick return operation is for may be a return area 2. Both the return area 1 and the return area 2 are located on a left side of the screen, and the return area 1 is located on an upper side of the return area 2. This is not limited. During specific implementation, the return area 1 may be located on the left side of the screen, and the return area 2 may be located on a right side of the screen. A specific location of the area which the return operation is for is not limited in this application. An example of a quick return operation is shown in FIG. 8(A) to FIG. 8(F).

FIG. 8(A) to FIG. 8(F) are another example of schematic diagrams of user interfaces in a returning process.

Figures 8A, 8B:
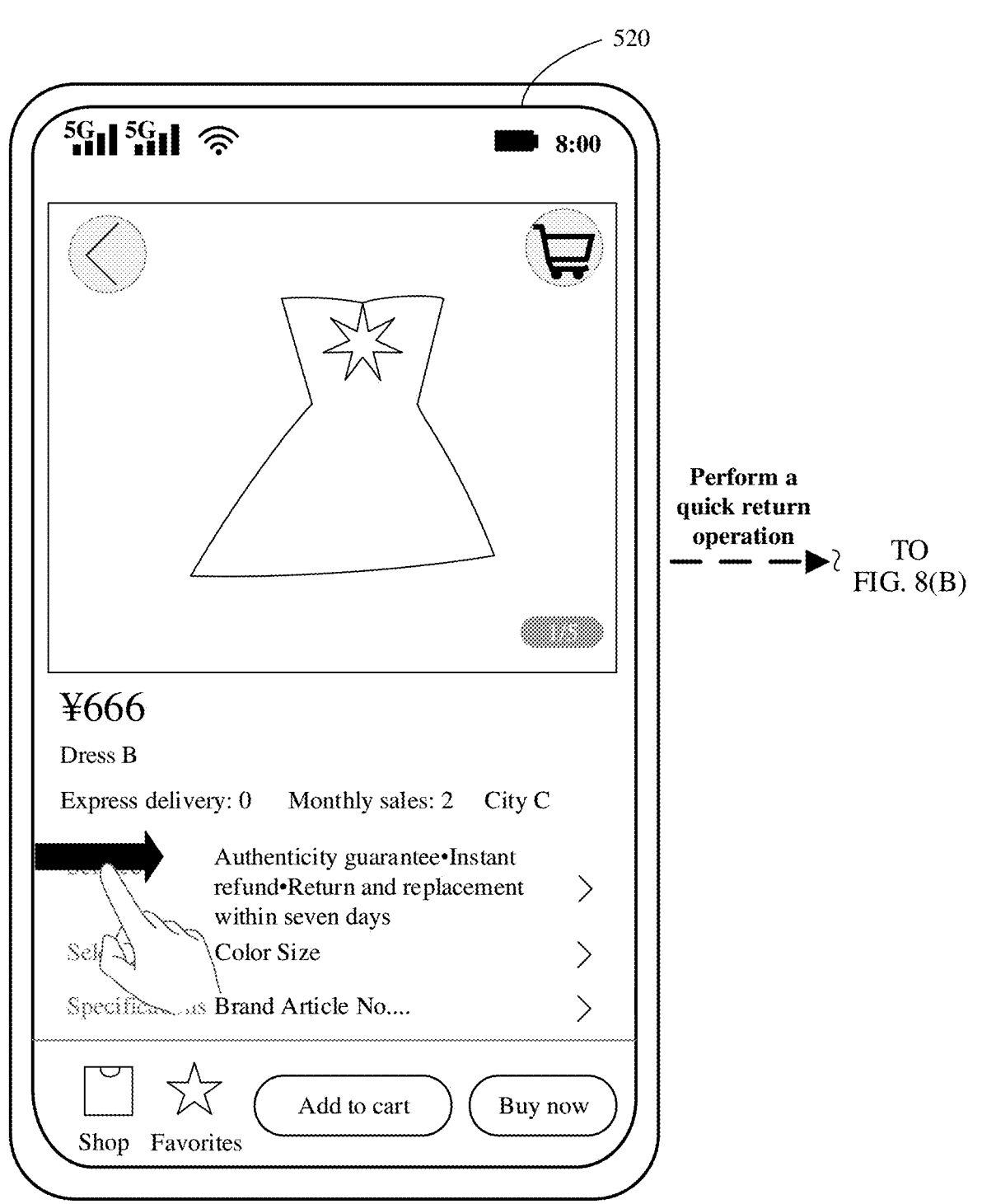
Figures 8A, 8B, 8C:
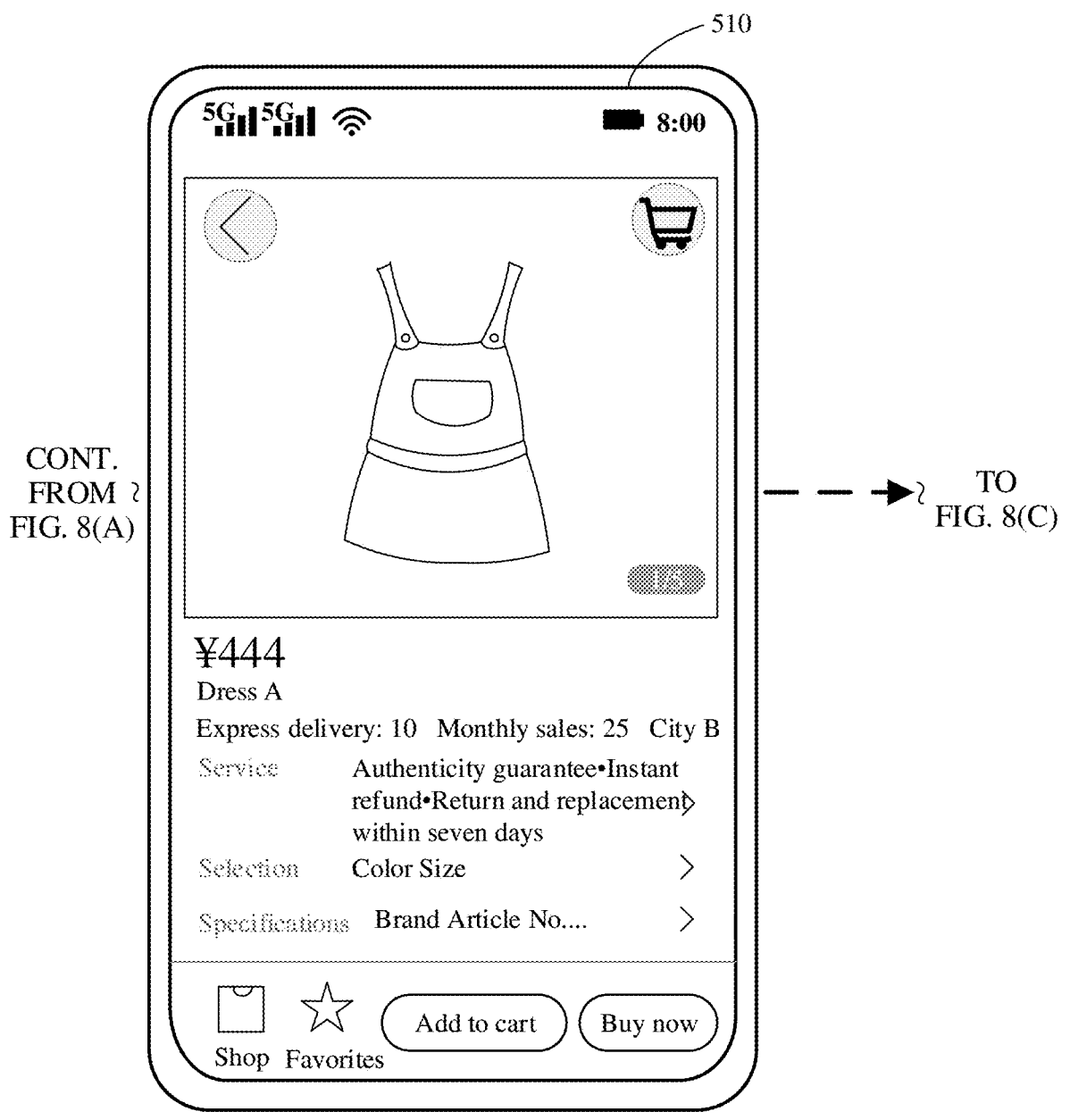
Figure 8C:
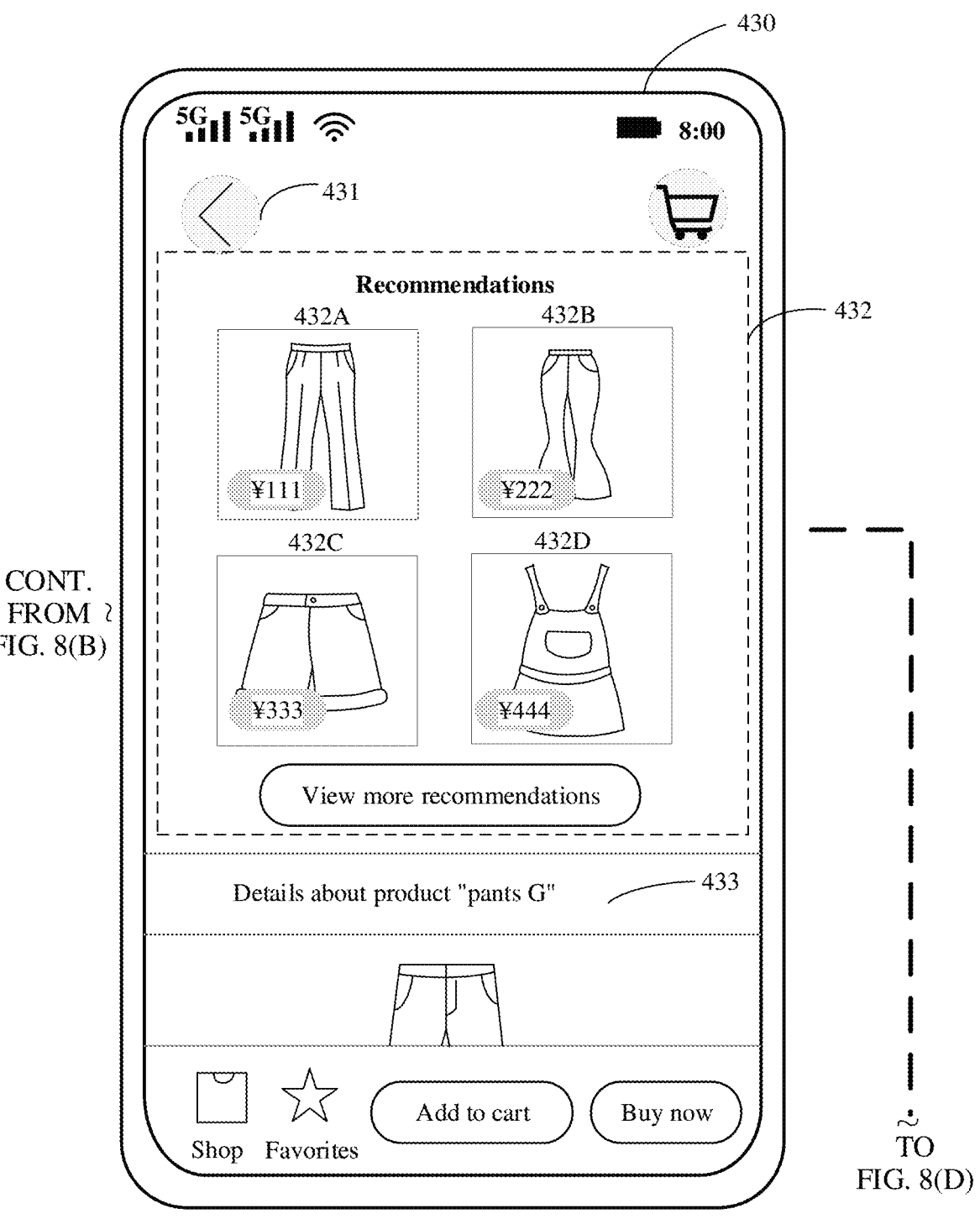
Figure 8D:
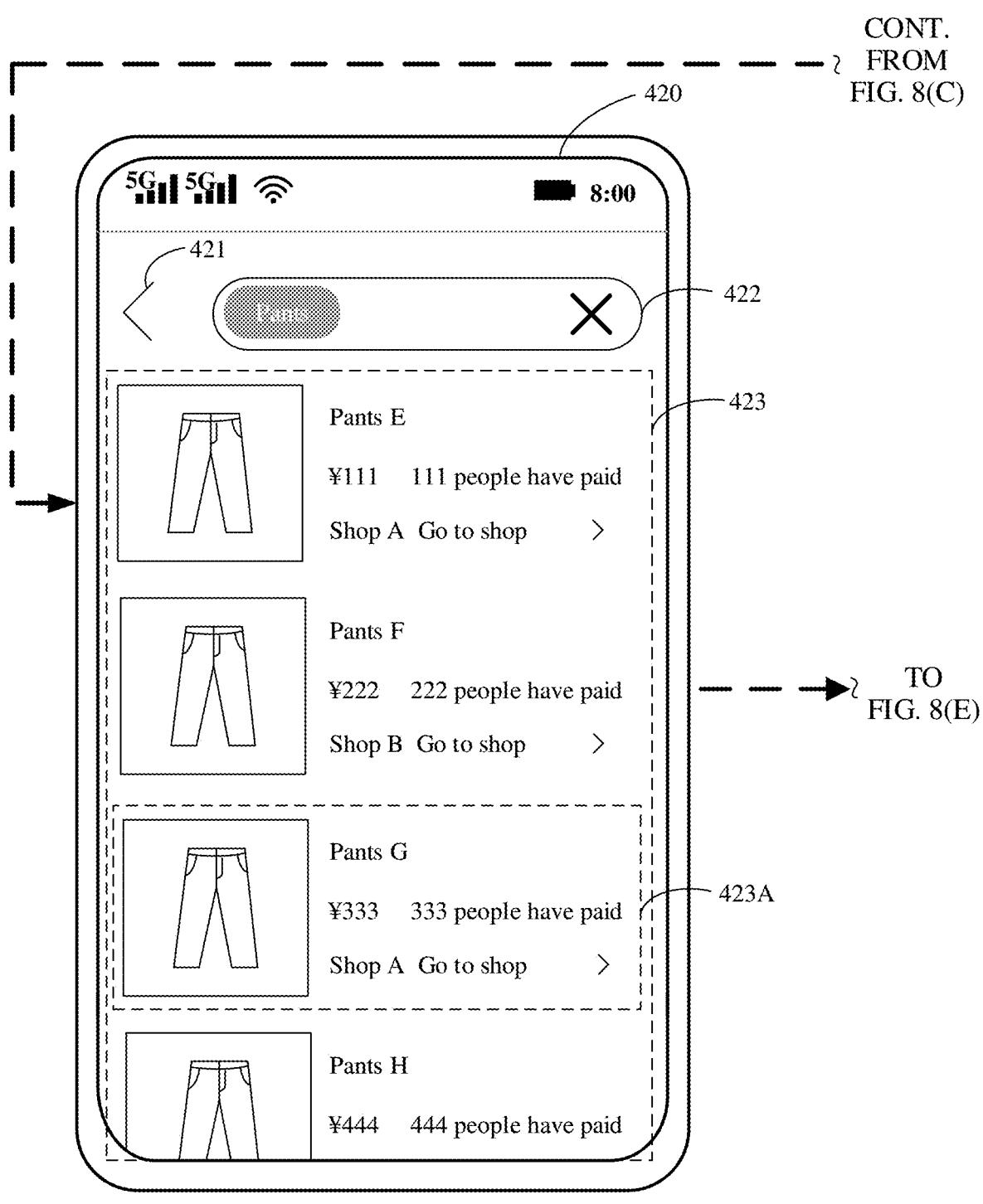
Figures 8D, 8E, 8F:
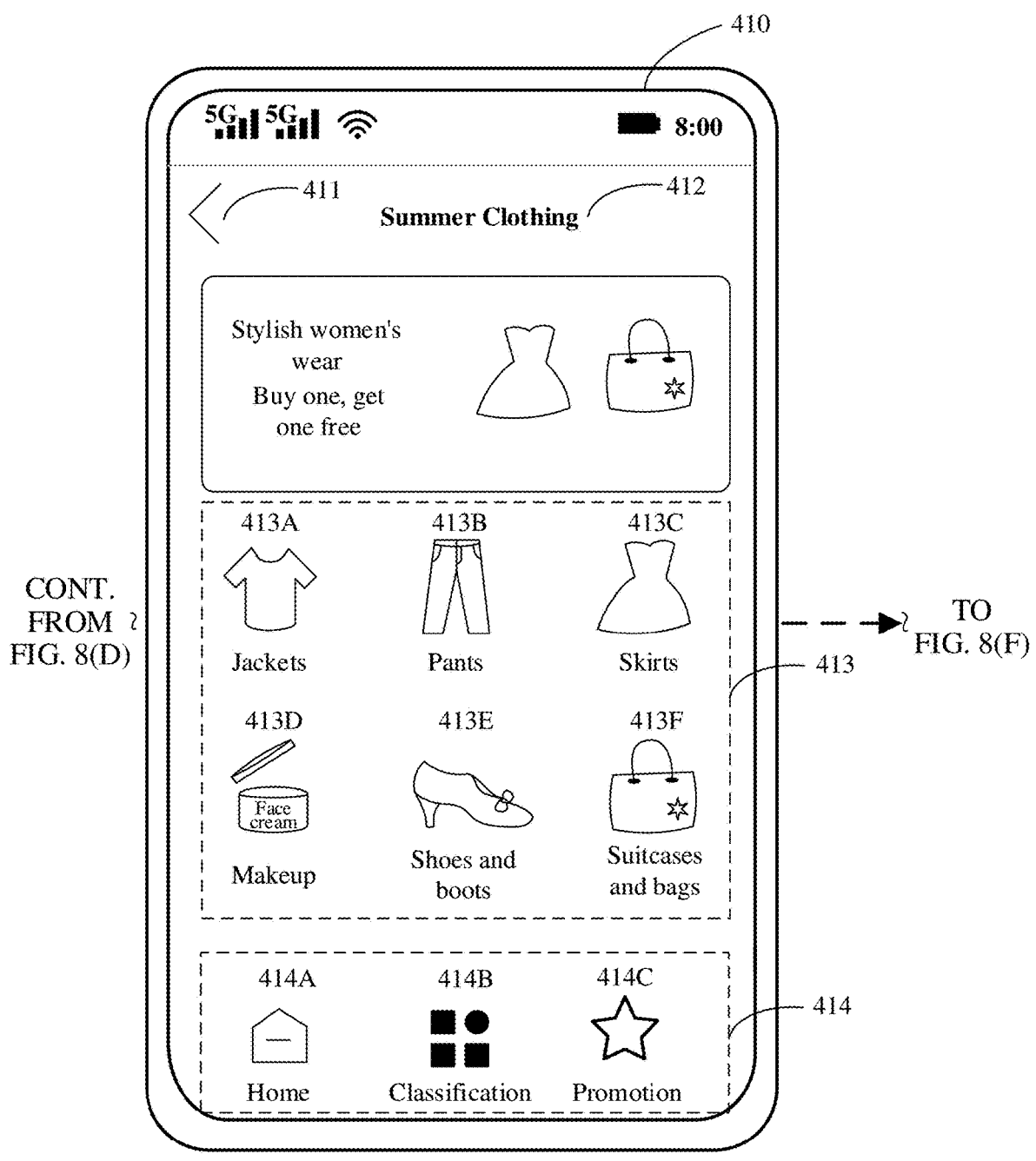
Figure 8F:
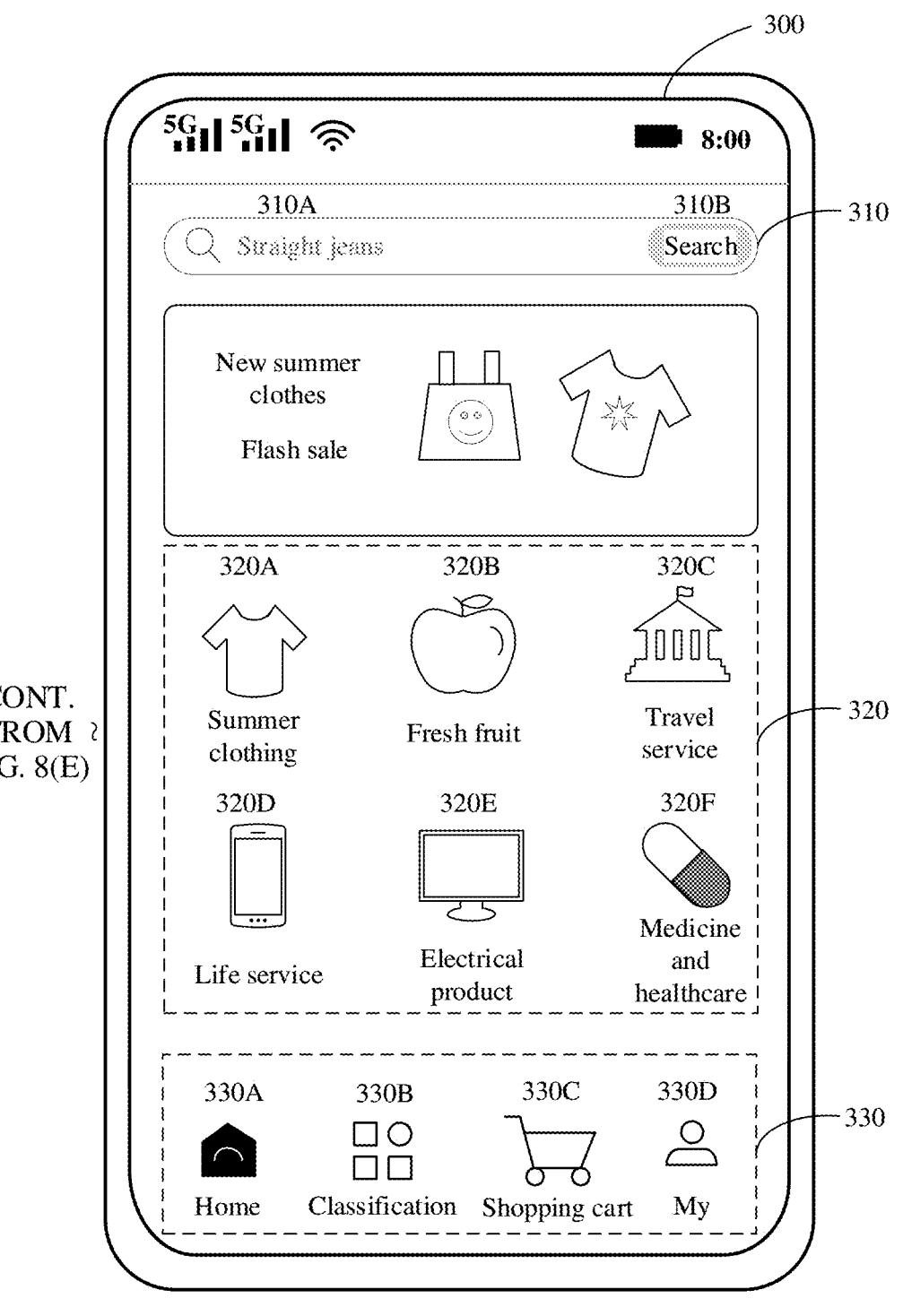

As shown in FIG. 8(A), when displaying the user interface 520, the electronic device may receive a quick return operation (a sliding operation that is for a return area 2), and in response to the quick return operation, directly return to the main interface of the shopping application, that is, the user interface 300 shown in FIG. 8(F). In other words, in response to the quick return operation, the electronic device may return to five user interfaces: the user interface 510 shown in FIG. 8(B), the user interface 430 shown in FIG. 8(C), the user interface 420 shown in FIG. 8(D), the user interface 410 shown in FIG. 8(E), and the user interface 300 shown in FIG. 8(F), but the electronic device displays only the user interface 300.

As shown in FIG. 8(A) to FIG. 8(F), the user needs to perform only one quick return operation to reach an interface that is in FIG. 5(A) to FIG. 5(F) and that can be returned to only after five common return operations are performed: the user interface 300. Therefore, steps of user operations are reduced. In addition, in the foregoing example, the electronic device actually returns to five user interfaces, but returns to display only one user interface. This avoids problems such as flickering, a blank screen, and frame freezing caused by a plurality of quick return operations, and improves user experience.

FIG. 9 is another example of schematic diagrams of return operations. (A) in FIG. 9 is a schematic diagram of a common return operation. (B) in FIG. 9 is a schematic diagram of a quick return operation.

As shown in FIG. 9, the quick return operation and the common return operation may be for a same area (both for a return area), but operation manners may be different. The common return operation may be an operation of sliding inward horizontally from the left edge of the screen, and the quick return operation may be an operation of sliding inward from the left edge of the screen with a sliding direction being diagonally upward. This is not limited. Alternatively, a sliding distance of the common return operation may be different from that of the quick return operation. A specific operation manner is not limited in this application. An example of the quick return operation is similar to that in FIG. 8(A) to FIG. 8(F), except that the quick return operation is replaced with an operation of sliding inward from the left edge of the screen with a sliding direction being diagonally upward.

In some embodiments, the electronic device may display prompt information, and the user may perform the quick return operation based on the prompt information. For example, the prompt information indicates at least one of the following: an area which the quick return operation is for, a control which the quick return operation is for, an operation manner, a return interface, and an application corresponding to the return interface. Specific examples are shown in FIG. 10(A) to FIG. 11(C) and FIG. 15(A) to FIG. 16(B).

Figures 10A, 10B:
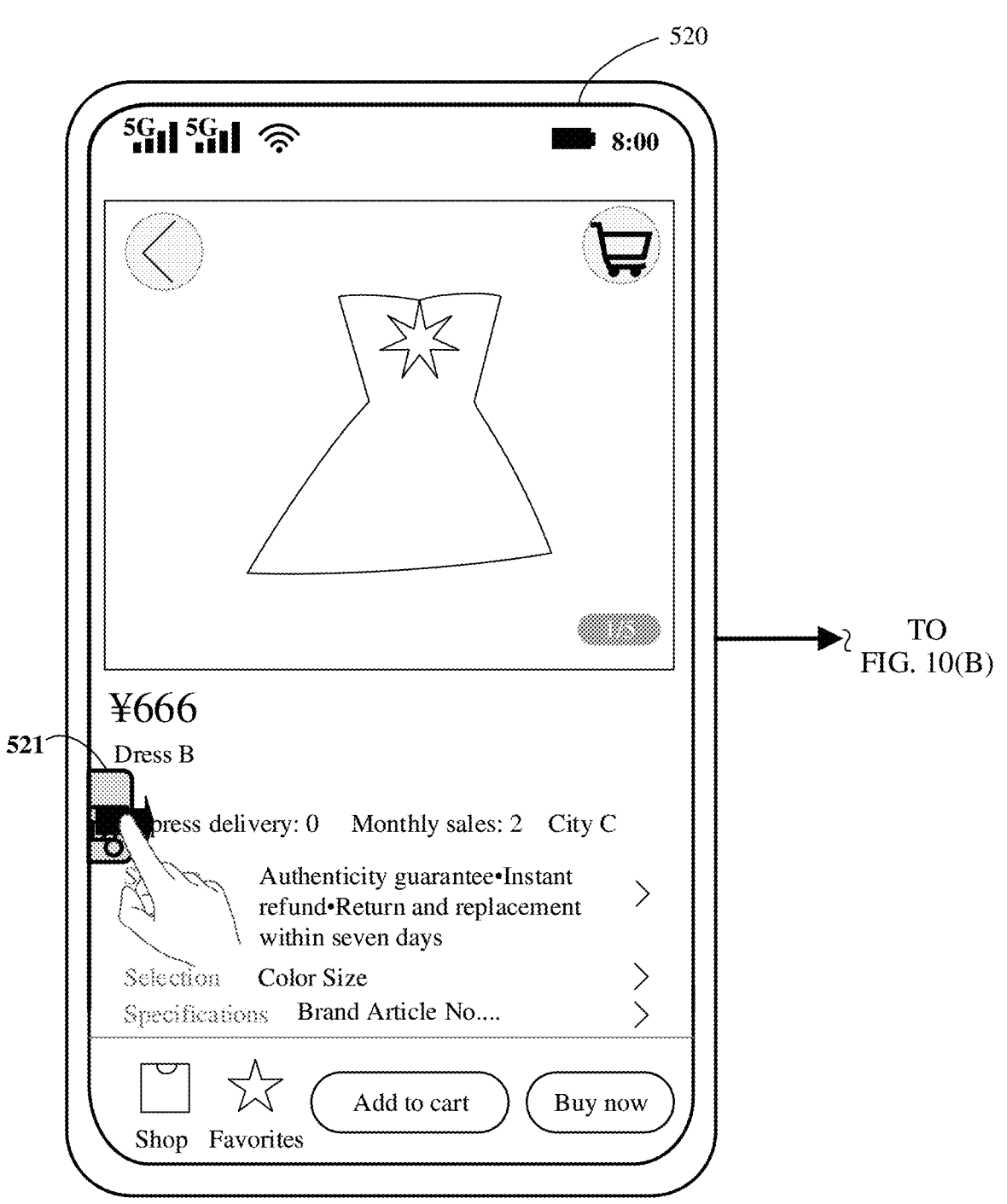
Figure 10B:
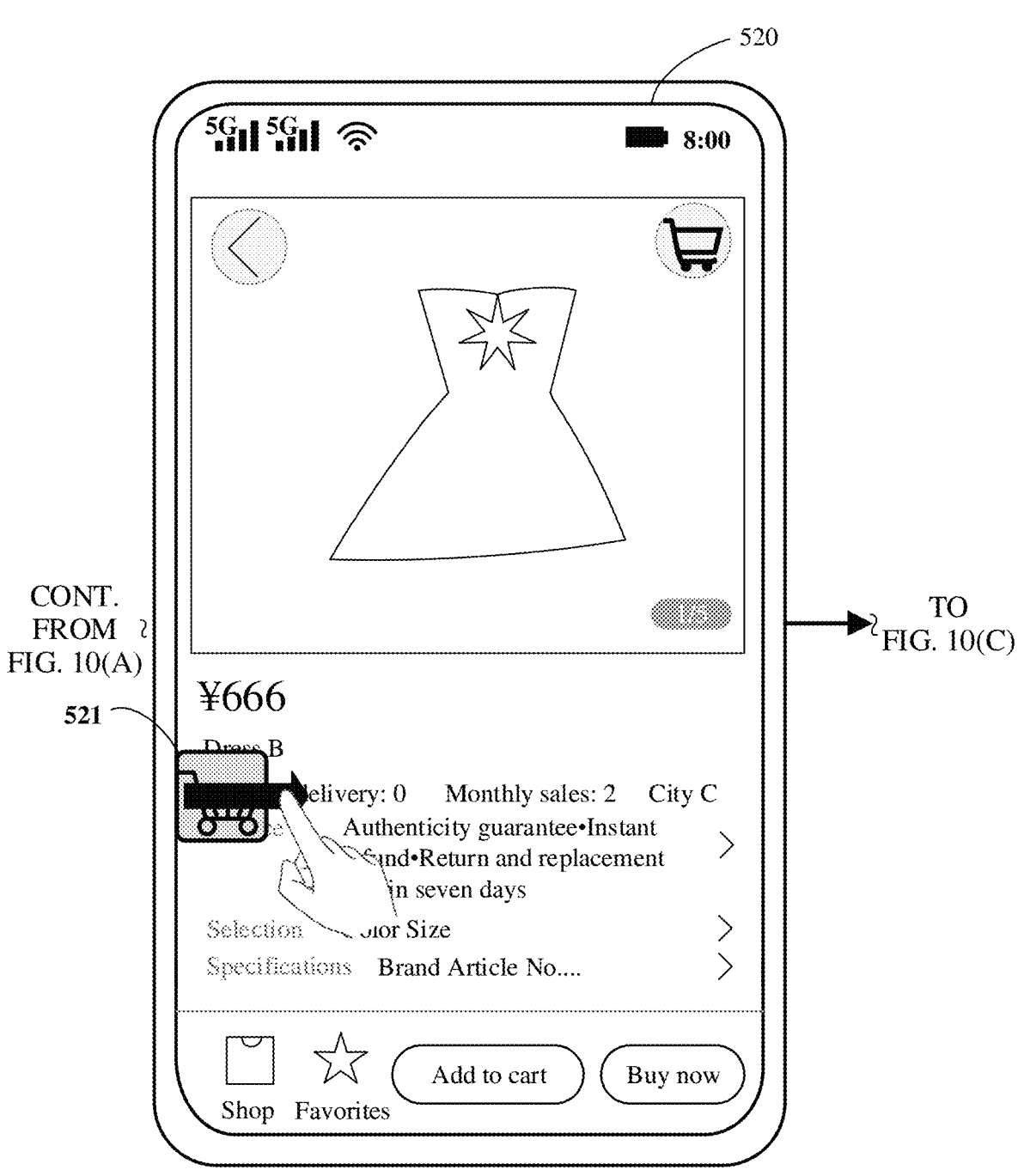
Figures 10B, 10C:
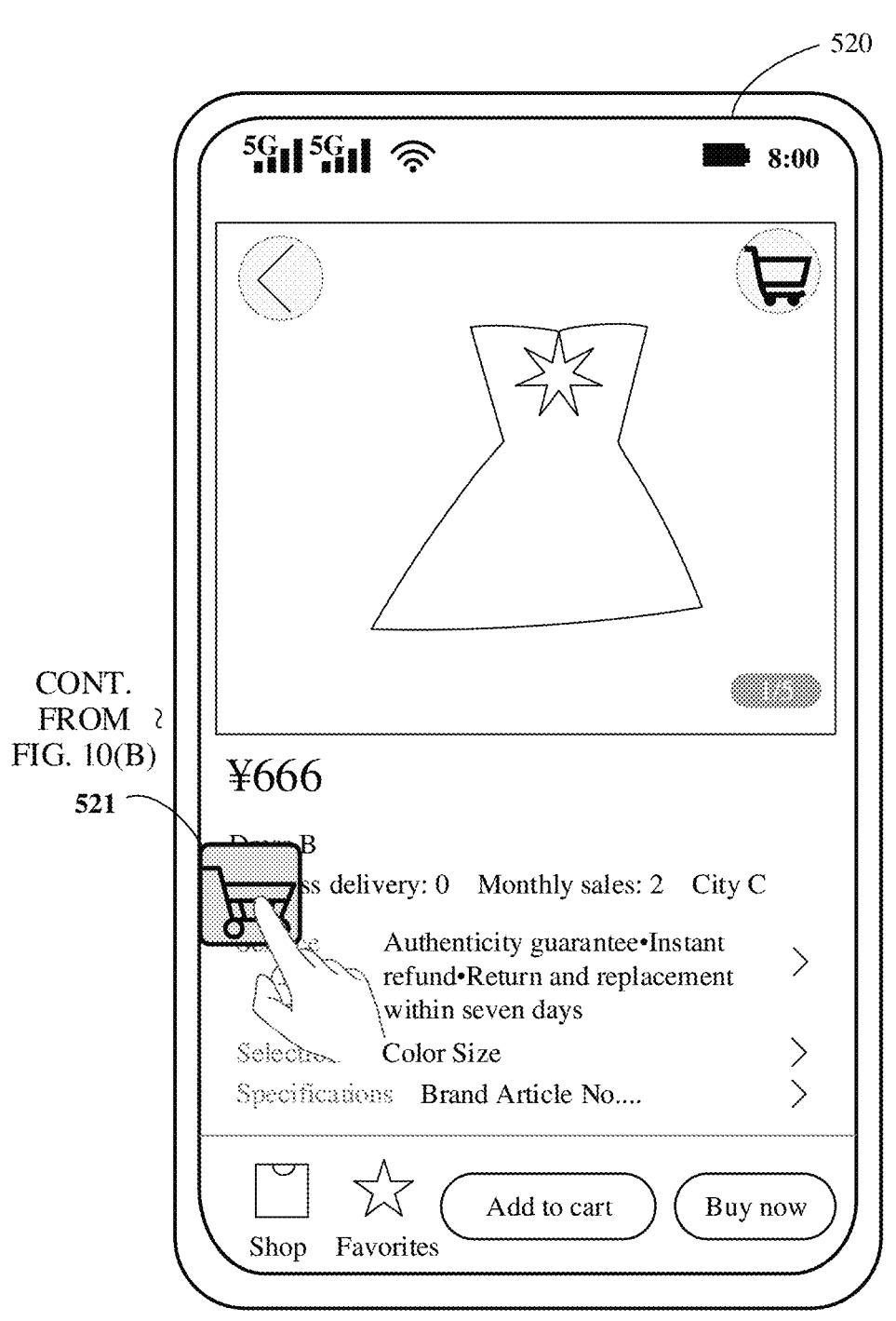

FIG. 10(A) to FIG. 10(C) are another example of schematic diagrams of return operations.

As shown in FIG. 10(A), when displaying the user interface 520, the electronic device may receive a sliding operation that is for a return area 2 and whose sliding distance is a first distance, and in response to the sliding operation, the electronic device may display some content of second prompt information 521 on the user interface 520. In some embodiments, the second prompt information 521 is used to indicate a user interface returned to for displaying after the user performs a quick return operation: the main interface of the shopping application. For example, the second prompt information 521 is an icon of the shopping application. An amount of displayed content of the second prompt information 521 is determined based on a sliding distance of a sliding operation. The electronic device may continue to receive the sliding operation that is for the return area 2, but in this case, the sliding distance is changed to a second distance, and the second distance is longer than the first distance. In response to the sliding operation, the electronic device may display all content of the second prompt information 521 on the user interface 520. For details, refer to the user interface 520 shown in FIG. 10(B).

As shown in FIG. 10(C), the electronic device may receive a user operation (for example, a touch operation or a sliding operation) that is for the second prompt information 521, that is, may receive a quick return operation, and in response to the quick return operation, directly return to display the main interface of the shopping application, that is, the user interface 300 shown in FIG. 8(F).

Figures 11A, 11B:
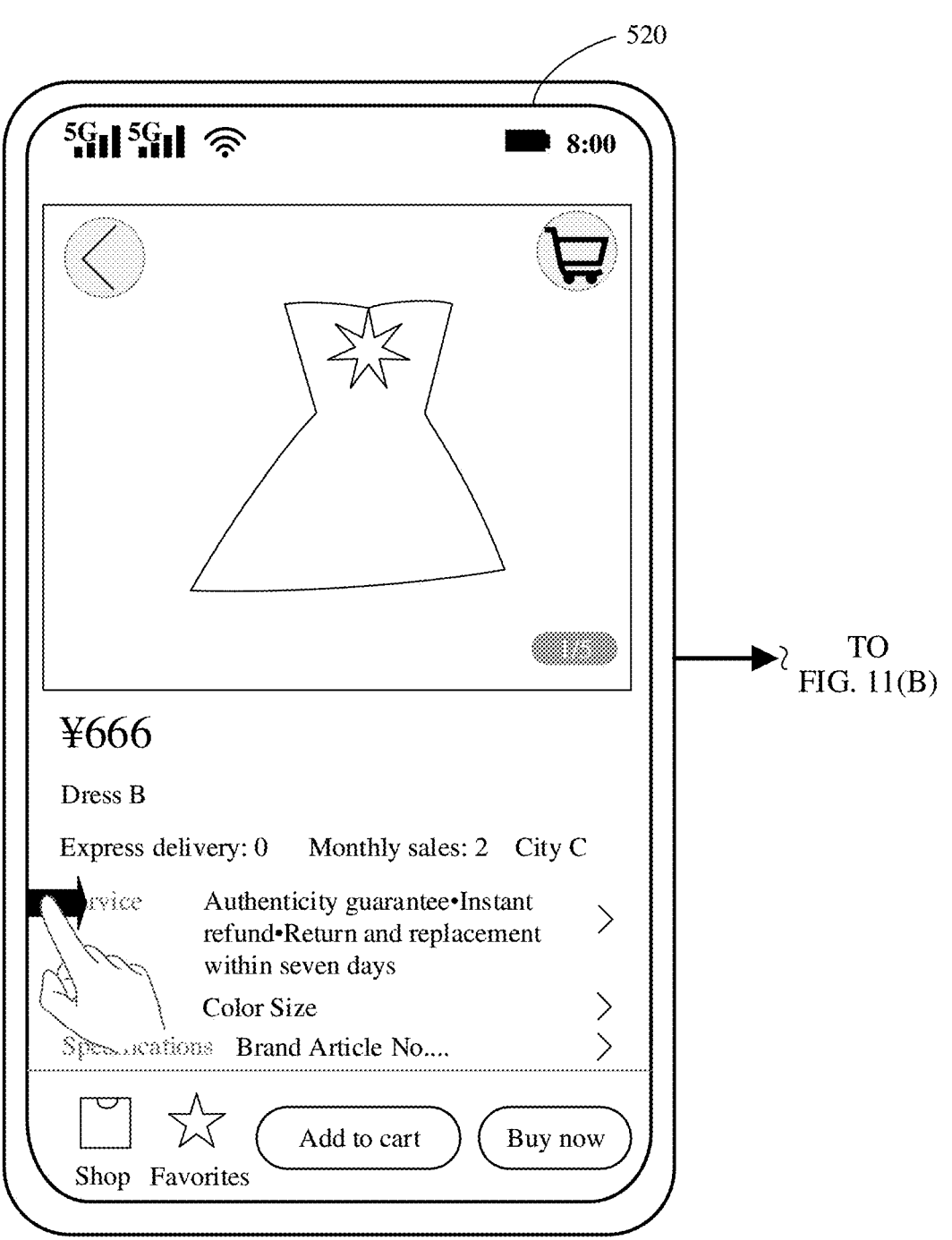
Figures 11A, 11B, 11C:
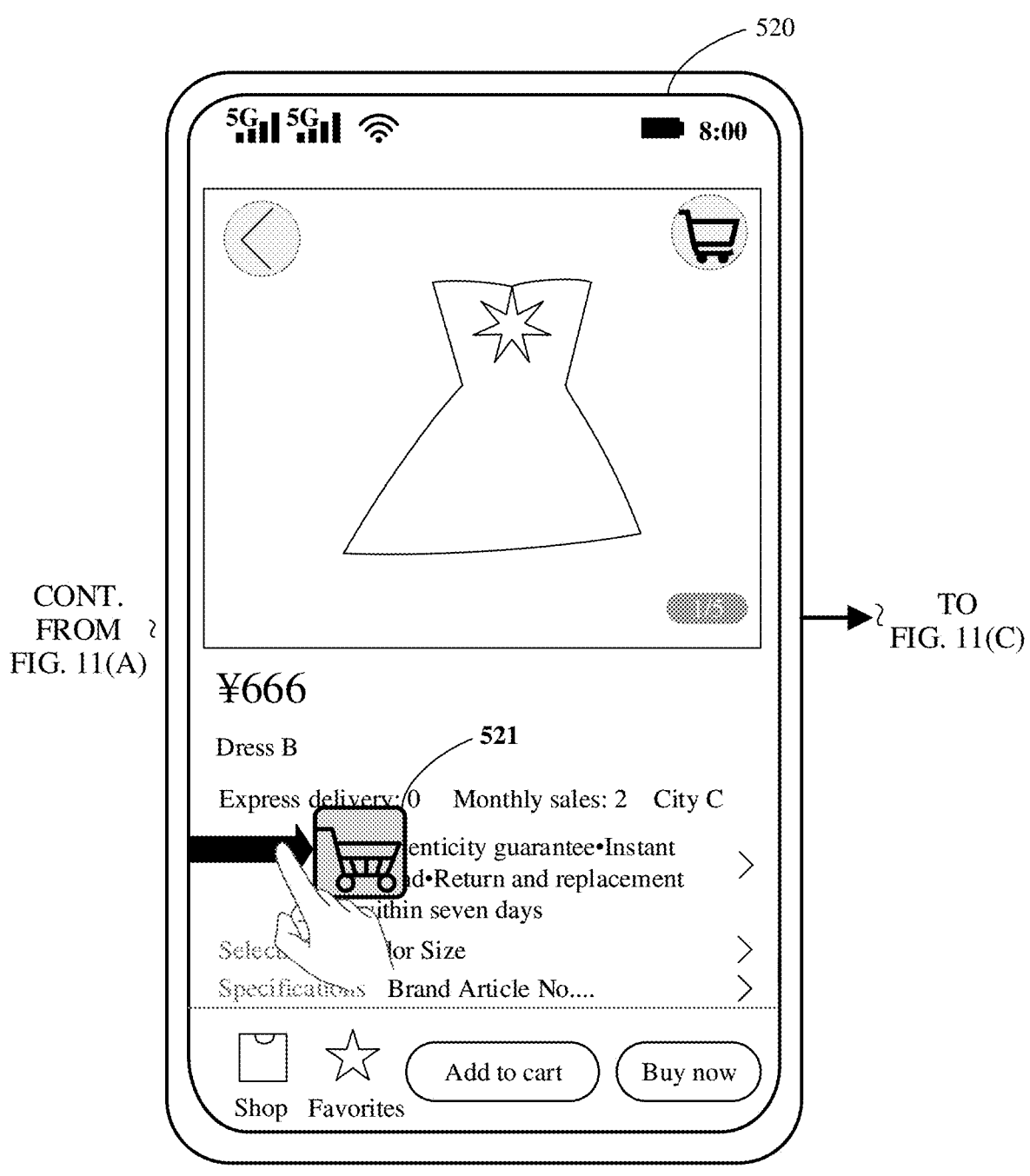
Figures 11B, 11C:
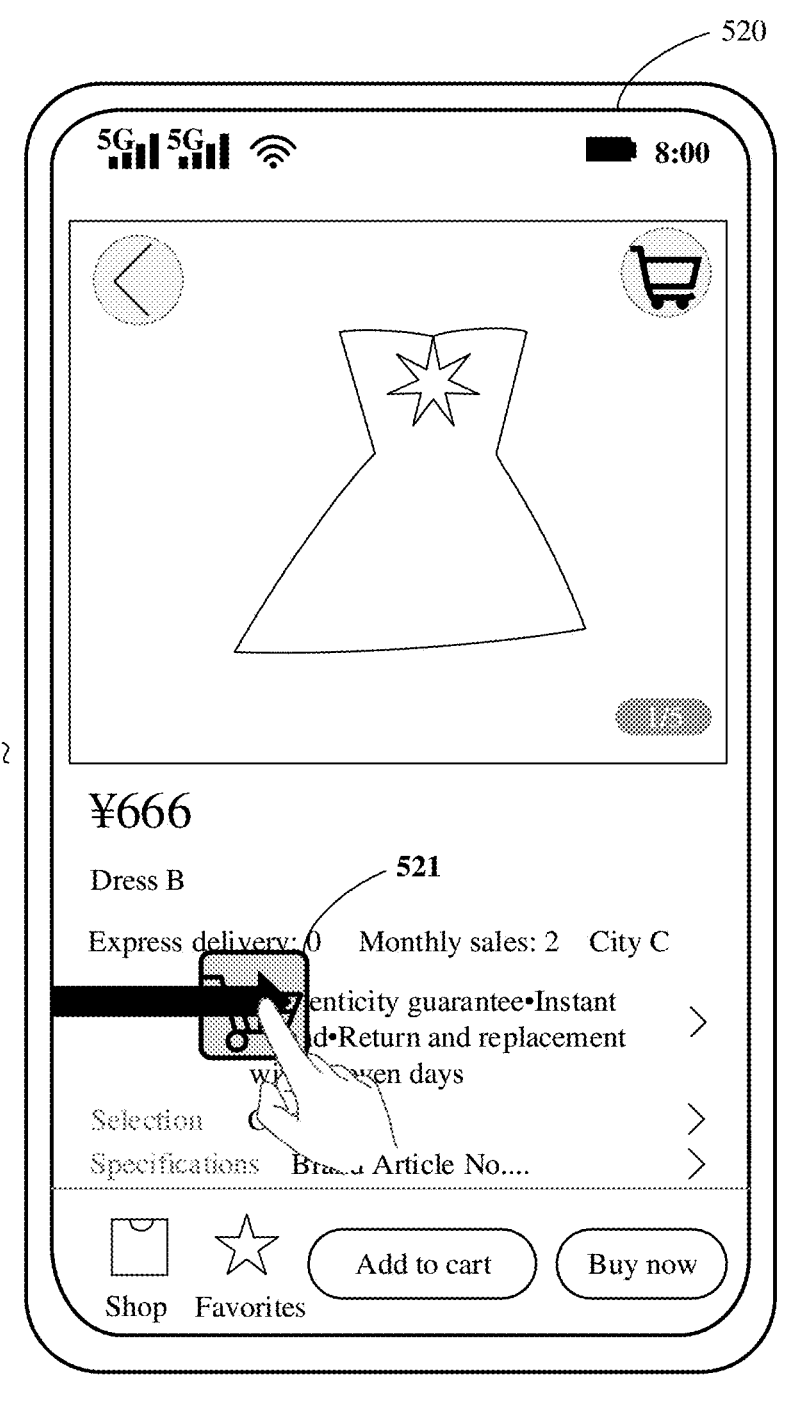

FIG. 11(A) to FIG. 11(C) are another example of schematic diagrams of return operations.

As shown in FIG. 11(A), when displaying the user interface 520, the electronic device may receive a sliding operation that is for a return area 2 and whose sliding distance is a first distance. In this case, the user interface 520 remains unchanged. The electronic device may continue to receive the sliding operation that is for the return area 2, but in this case, the sliding distance is changed to a second distance, and the second distance is longer than the first distance. In response to the sliding operation, the electronic device may display second prompt information 521 on the user interface

520, specifically as shown in FIG. 11(B). The electronic device may continue to receive the sliding operation that is for the return area 2, but in this case, the sliding distance is changed to a third distance, and the third distance is longer than the second distance, that is, the electronic device may receive a quick return operation, specifically as shown in FIG. 11(C). In response to the quick return operation, the electronic device may directly return to display the main interface of the shopping application, that is, the user interface 300 shown in FIG. 8(F).

In some embodiments, the user may perform a specific operation (which may be referred to as adding the user interface to favorites) on the user interface in a process of viewing the user interface. The favorite user interface is returned to for displaying in response to a quick return operation. A specific example is shown in FIG. 12.

Figure 12:
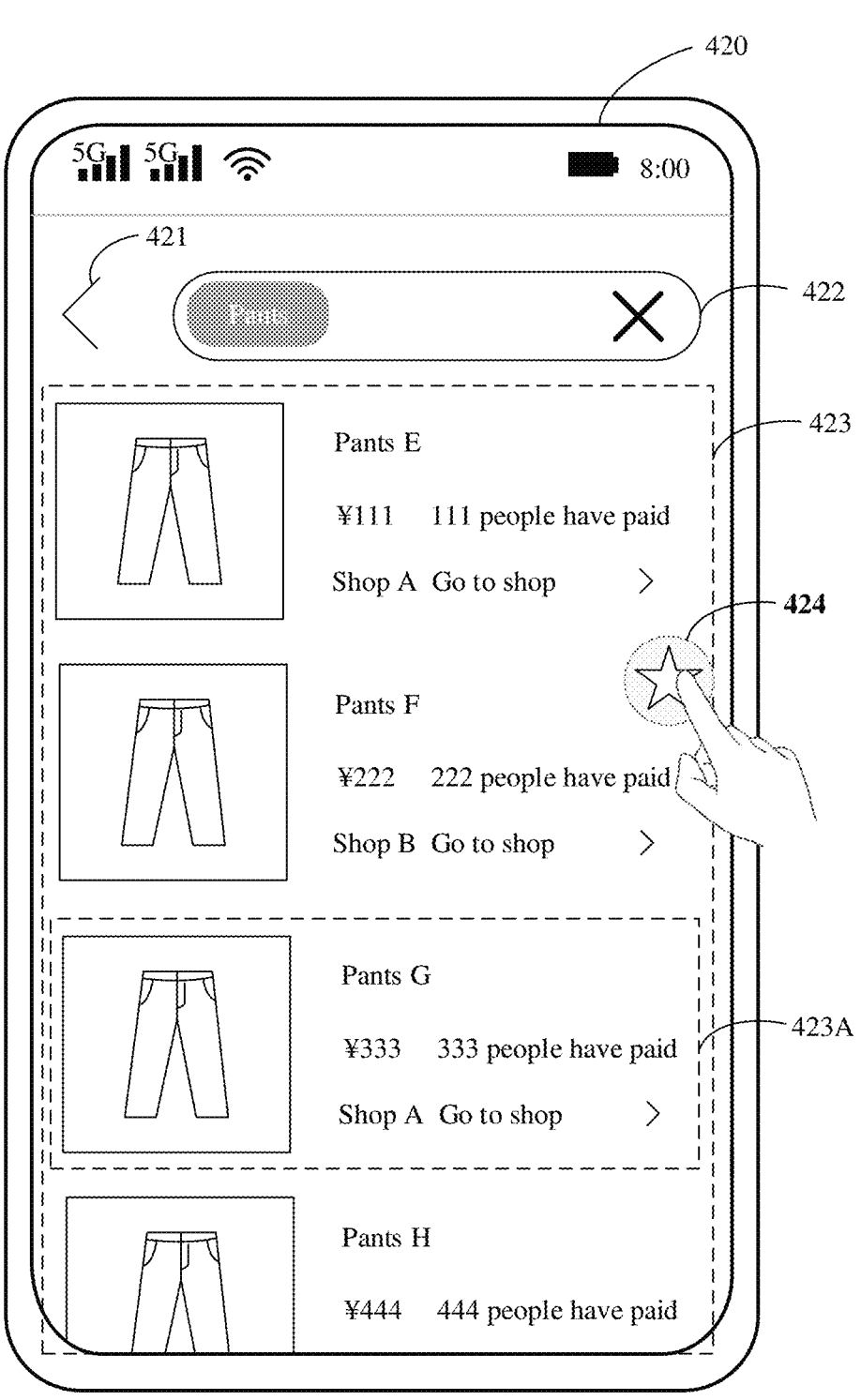

FIG. 12 is an example of a schematic diagram of a specific operation.

As shown in FIG. 12, the user interface 420 displayed by the electronic device may further include a newly added favorites option 424. In response to a user operation (for example, a touch operation) that is for the favorites option 424, the electronic device may determine that the currently displayed user interface 420 is a user interface returned to for displaying in response to a quick return operation. It may be understood that the electronic device may display the favorites option 424 on user interfaces of all or some installed applications, or the electronic device may display the favorites option 424 on all or some user interfaces of one application.

This is not limited. Alternatively, a user interface may be added to favorites by using an existing control in the application. For example, on the user interface 510 shown in FIG. 8(B), the electronic device may determine, in response to a user operation (for example, a touch operation) that is for a shopping option "favorites", that the currently displayed user interface 510 is a return interface.

In this application, any user interface displayed by the electronic device may be added to favorites.

In some embodiments, a quantity of user interfaces that can be added to favorites may be less than or equal to a preset maximum quantity. Optionally, the electronic device may determine that a first quantity of user interfaces recently added to favorites by the user are user interfaces returned to for displaying in correspondence with a first quantity of types of quick return operations, where the first quantity is equal to a maximum quantity. For example, assuming that the user sequentially adds user interfaces A, B, and C to favorites in a process of using application A, and assuming that the maximum quantity is two, the electronic device may determine that the user interfaces B and C are user interfaces returned to for displaying in correspondence with two types of quick return operations.

Without being limited to the foregoing listed add-to-favorites operations, during specific implementation, the user may further add a user interface to favorites by using a gesture operation like a fist gesture. A specific implementation of the add-to-favorites operation is not limited in this application.

Without being limited to the foregoing listed cases, during specific implementation, the electronic device may alternatively preset a return interface. For example, the preset return interface is a first displayed user interface (for example, the main interface of the application) of the current application. Alternatively, the electronic device may determine a return interface according to a preset rule. For example, the electronic device records duration of viewing a user interface, and a user interface whose viewing duration is greater than or equal to the preset viewing duration is a user interface returned to for displaying in correspondence with a quick return operation.

Some embodiments may include a plurality of types of quick return operations, and different user interfaces are returned to for displaying in correspondence with different types of quick return operations. The different types of quick return operations are, for example, without limitation, for different areas, on different controls, or in different manners. Specific examples are shown in FIG. 13 to FIG. 16(B).

The following embodiment is described by using an example in which two types of quick return operations are included: a first quick return operation and a second quick return operation.

Figure 13:
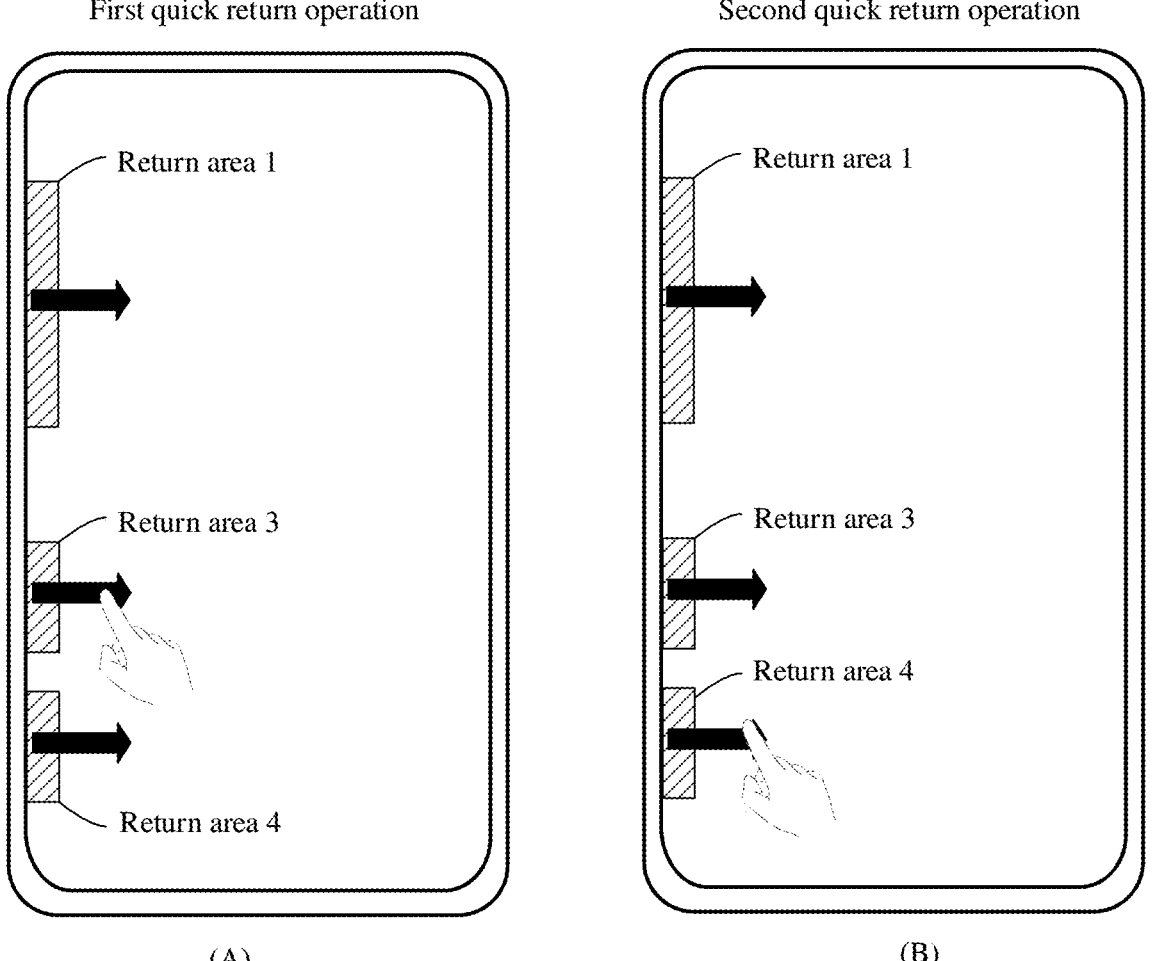

FIG. 13 is another example of schematic diagrams of return operations.

As shown in FIG. 13, two types of quick return operations may be included: the first quick return operation and the second quick return operation, and the two types of operations may be for different areas. As shown in (A) in FIG. 13, an area which the first quick return operation is for may be a return area 3. As shown in (B) in FIG. 13, an area which the second quick return operation is for may be a return area 4. An area which a common return operation is for may be a return area 1. The return area 1 is located on an upper side of the return area 3 and the return area 4, and the return area 3 is located on an upper side of the return area 4. This is not limited. During specific implementation, alternatively, the return area 3 may be located on a lower left side of the screen, and the return area 4 is located on a lower right side of the screen. A specific location of the area which the return operation is for is not limited in this application.

Figure 14:
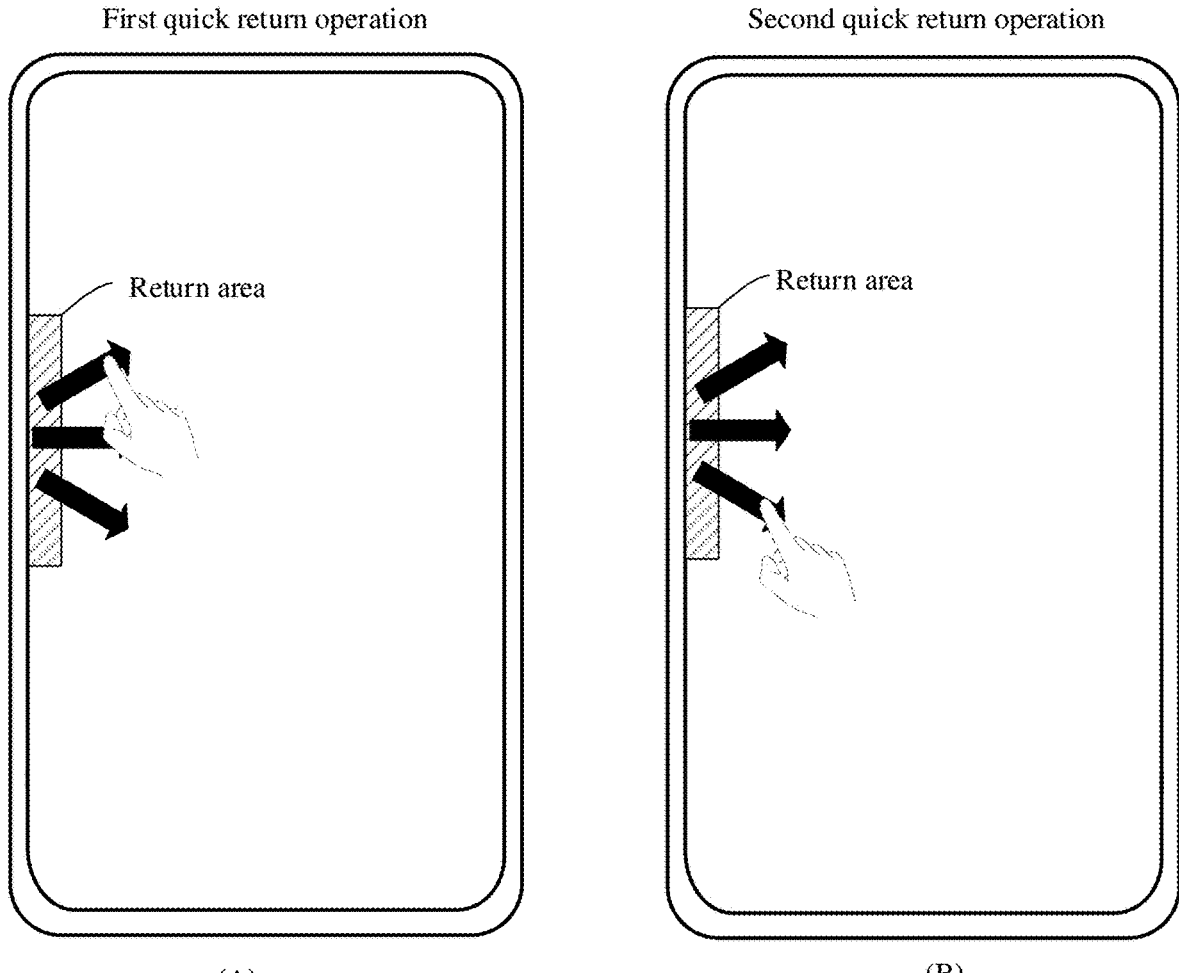

FIG. 14 is another example of schematic diagrams of return operations.

As shown in FIG. 14, two types of quick return operations may be included: a first quick return operation and a second quick return operation. A common return operation, the first quick return operation, and the second quick return operation may be for a same area (all for a return area), but may have different operation manners. As shown in (A) in FIG. 14, the first quick return operation may be an operation of sliding inward from the left edge of the screen with a sliding direction being diagonally upward. As shown in (B) in FIG. 14, the second quick return operation may be an operation of sliding inward from the left edge of the screen with a sliding direction being diagonally downward. However, the common return operation may be an operation of sliding inward horizontally from the left edge of the screen.

Figure 15A:
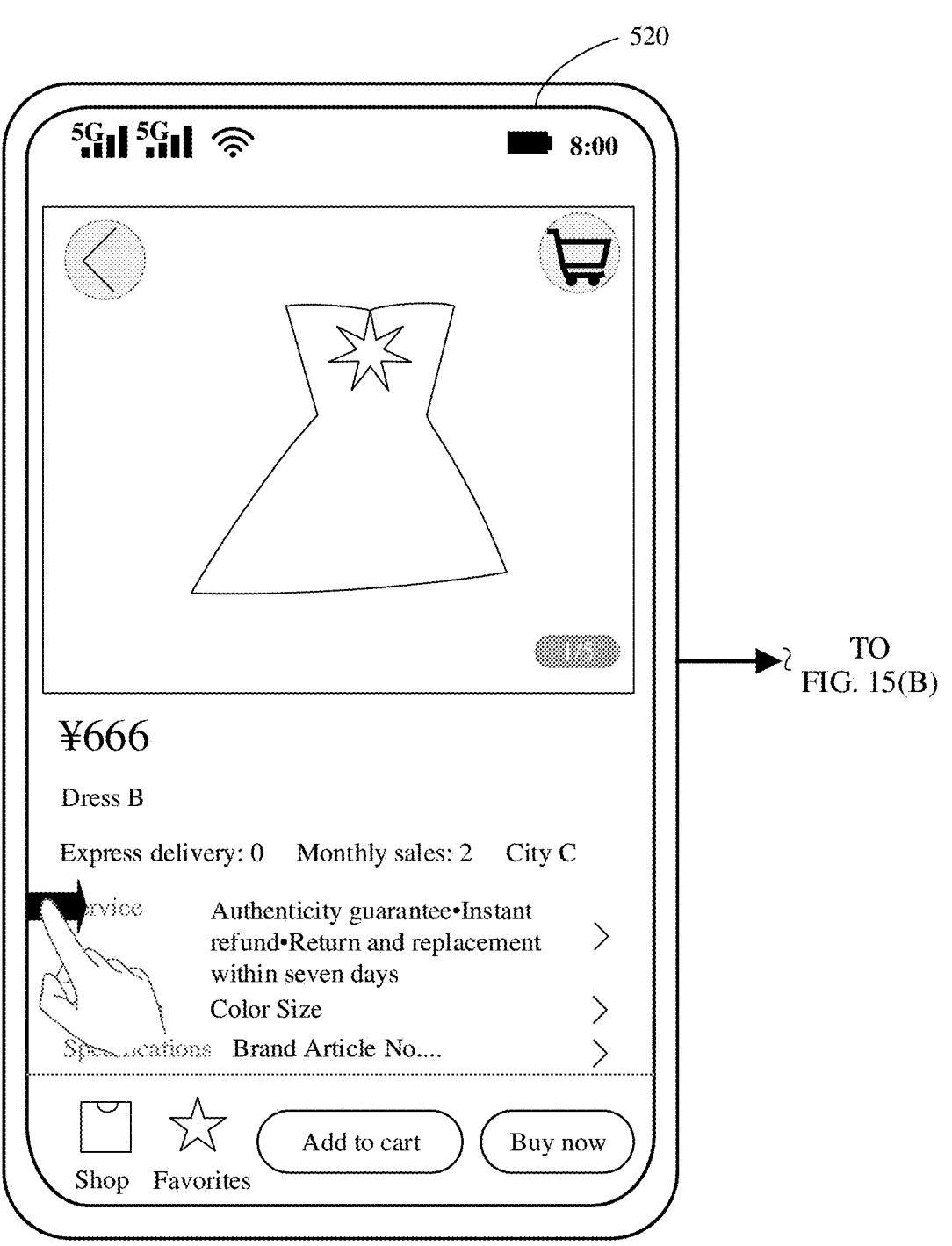
Figure 15B:
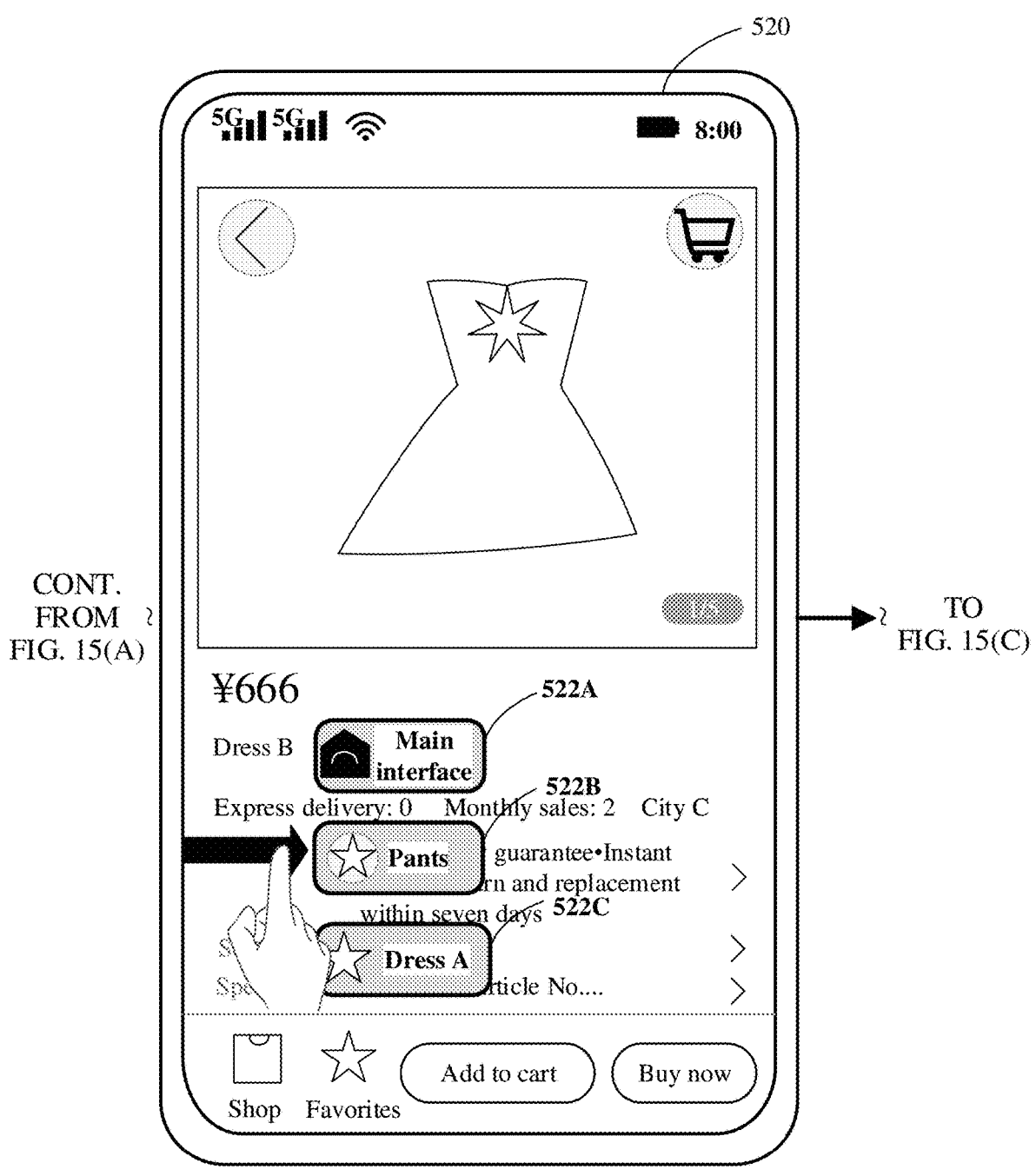
Figures 15B, 15C:
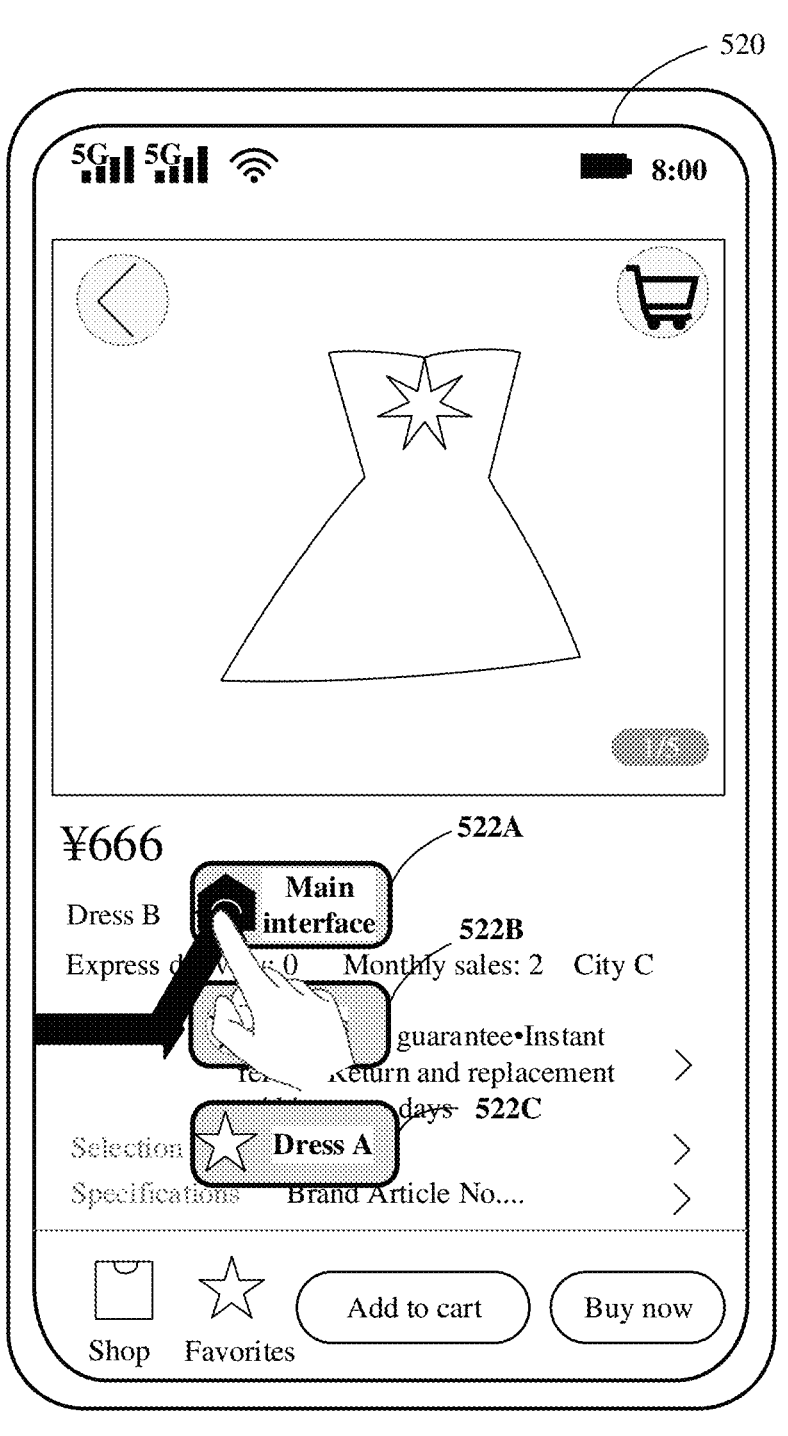

FIG. 15(A) to FIG. 15(C) are another example of schematic diagrams of return operations.

As shown in FIG. 15(A), when displaying the user interface 520, the electronic device may receive a sliding operation that is for a return area 2 and whose sliding distance is a first distance. In this case, the user interface 520 remains unchanged. The electronic device may continue to receive the sliding operation that is for the return area 2, but in this case, the sliding distance is changed to a second distance, and the second distance is longer than the first distance. In response to the sliding operation, the electronic device may display third prompt information 522A, fourth prompt information 522B, and fifth prompt information 522C on the user interface 520, specifically as shown in FIG. 15(B). The three pieces of prompt information may correspond to three types of quick return operations, and may include icons and texts corresponding to return interfaces. A return interface indicated by the third prompt information

522A is the main interface of the shopping application, that is, the user interface 300. A return interface indicated by the fourth prompt information 522B is the user interface 420 added to favorites by using the newly added favorites option 424 in FIG. 12. A return interface indicated by the fifth prompt information 522C is the user interface 510 added to favorites by using an existing favorites option 511 of the shopping application.

As shown in FIG. 15(C), the electronic device may continue to receive the sliding operation. In this case, a sliding direction of the sliding operation is changed from horizontal to diagonally upward, and the sliding operation is for the third prompt information 522A, that is, the electronic device may receive a first quick return operation, and directly return to display the user interface 300 in response to the first quick return operation. This is not limited. The electronic device may further receive a sliding operation on the fourth prompt information 522B or the fifth prompt information 522C, to return to a corresponding return interface.

Figure 16A:
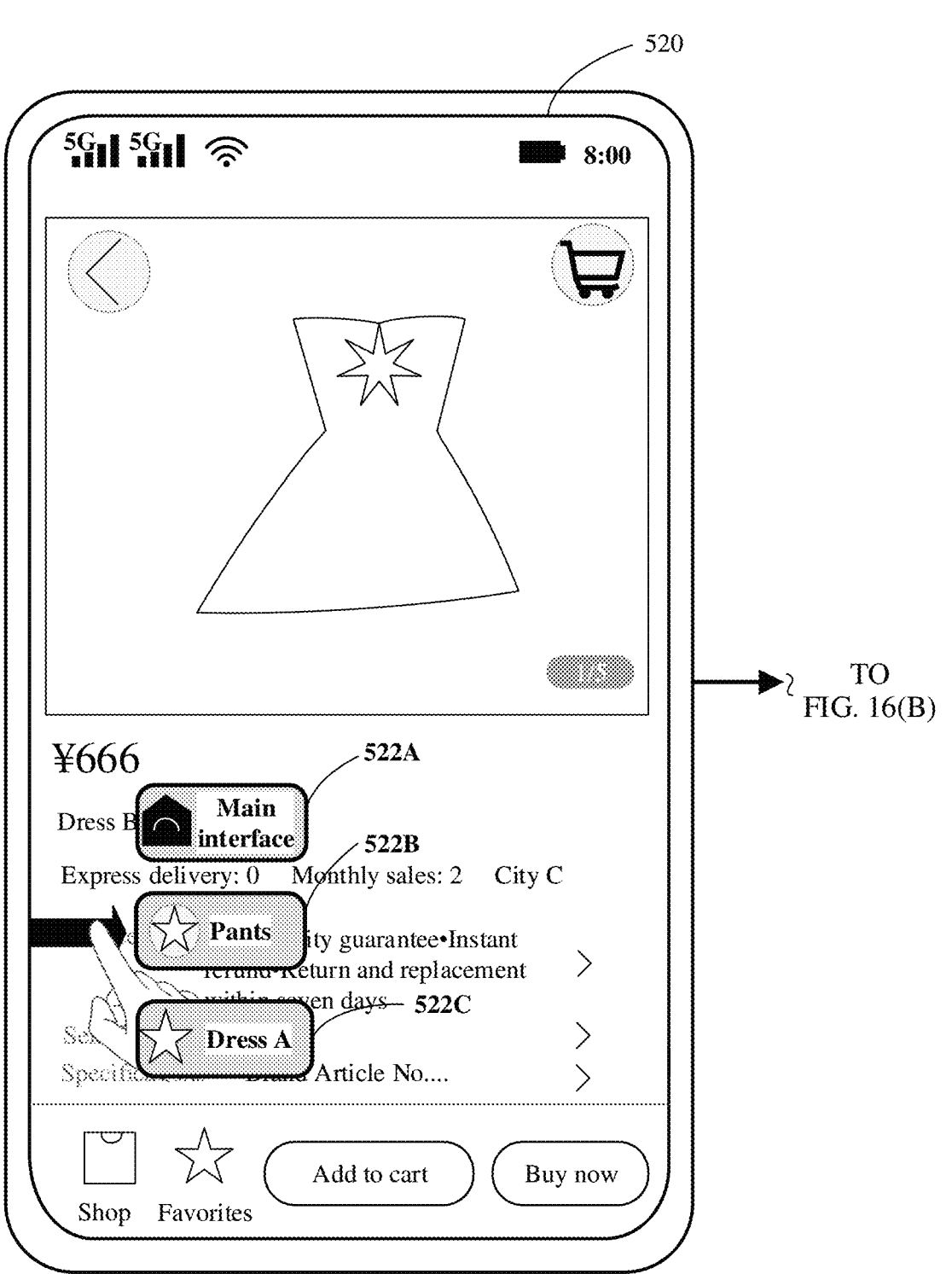
Figure 16B:
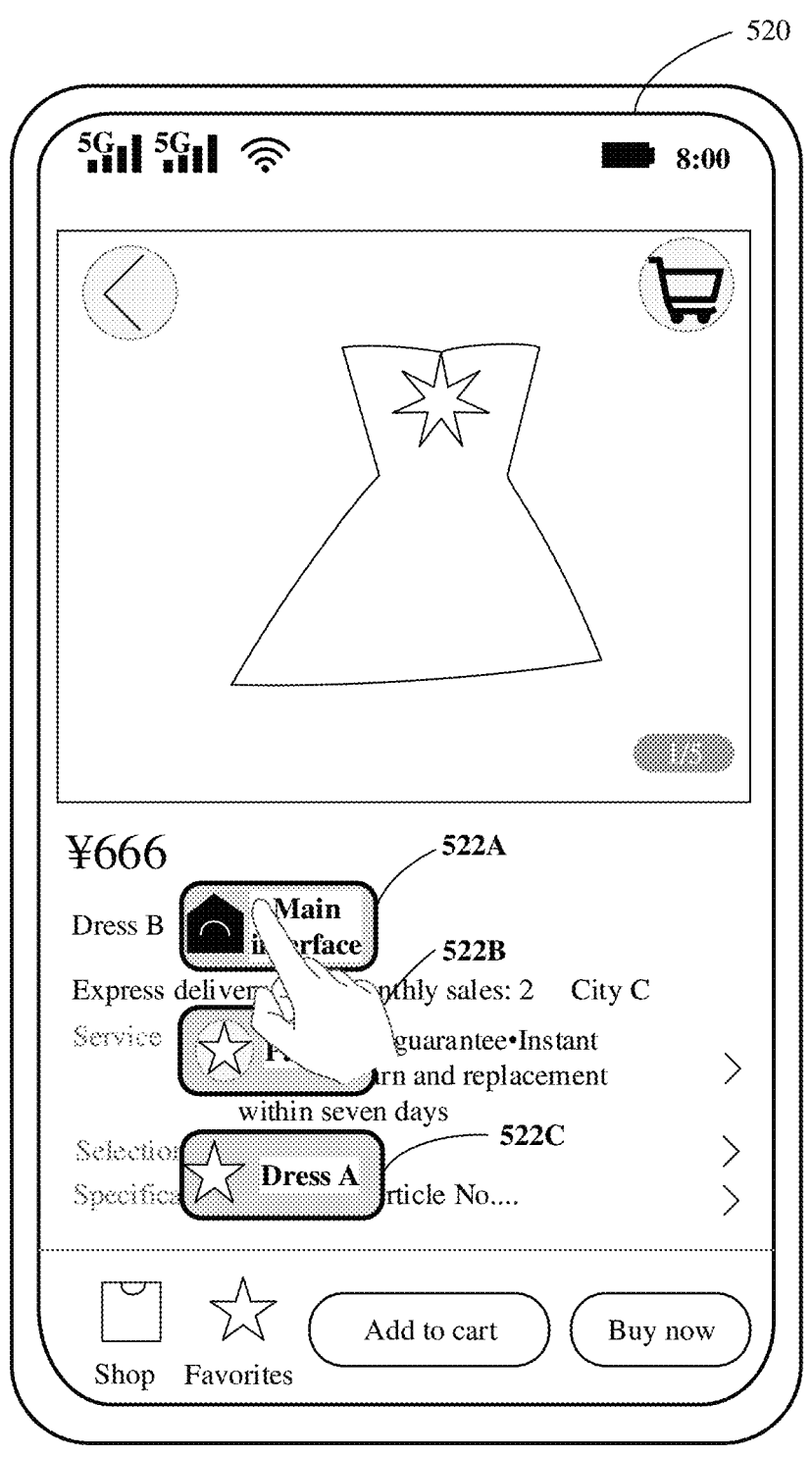

FIG. 16(A) and FIG. 16(B) are another example of schematic diagrams of return operations.

As shown in FIG. 16(A), when displaying the user interface 520, the electronic device may display third prompt information 522A, fourth prompt information 522B, and fifth prompt information 522C on the user interface 520 in response to a sliding operation that is for a return area 2. Detailed descriptions are consistent with those of the prompt information in FIG. 15(A) to FIG. 15(C). The electronic device may receive a user operation that is for any piece of prompt information, that is, may receive a quick return operation, and in response to the quick return operation, directly return to display a return interface corresponding to the prompt information which the quick return operation is for. For example, the electronic device may receive a tap operation that is for the third prompt information 522A, that is, may receive a first quick return operation, and directly return to display the user interface 300 in response to the first quick return operation. For a specific example, refer to FIG. 16(B).

In some embodiments, the electronic device may display a current interface and a previous interface in split screen in response to a user operation. Specific examples are shown in FIG. 17(A) to FIG. 18(C).

Figure 17A:
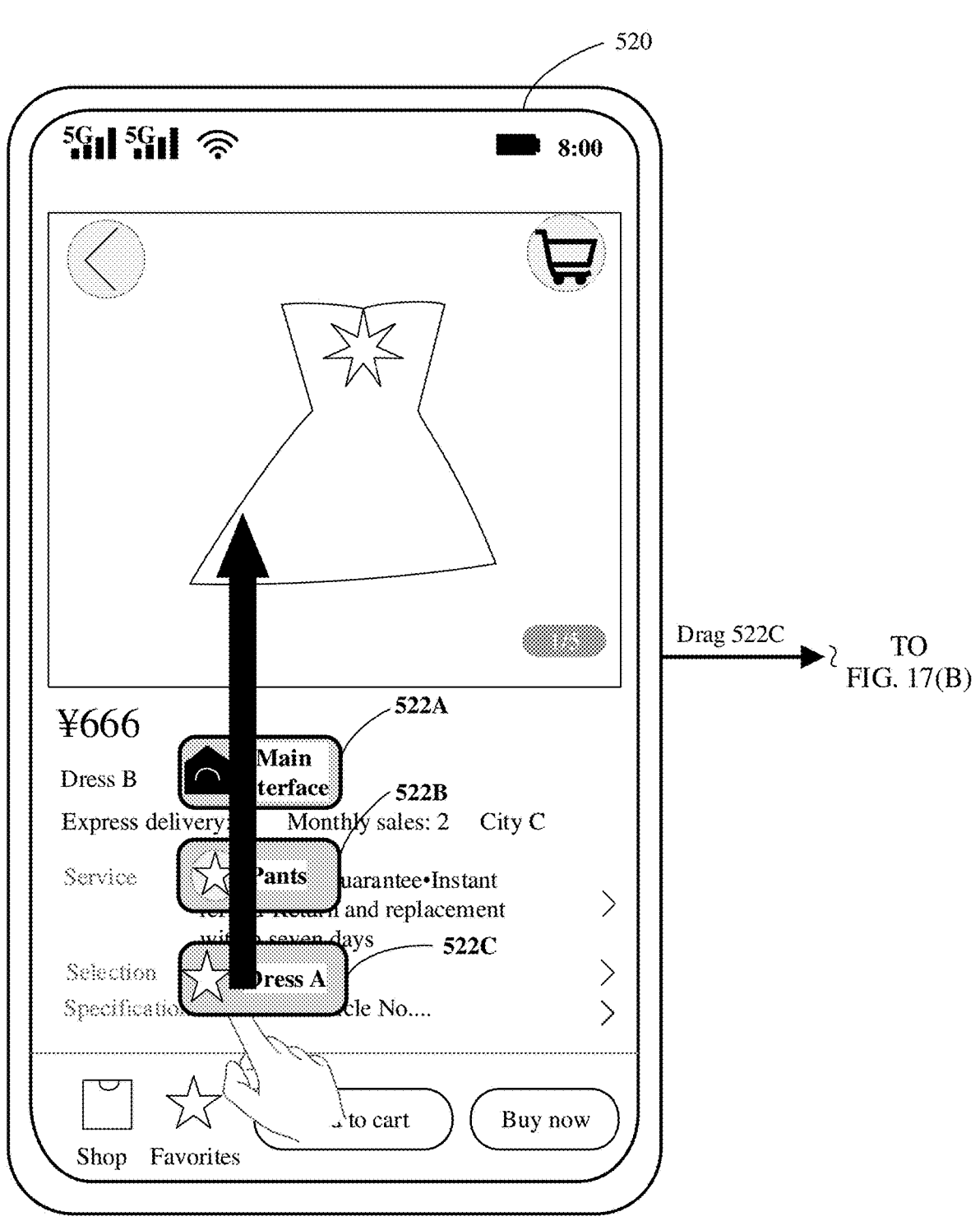
Figure 17B:
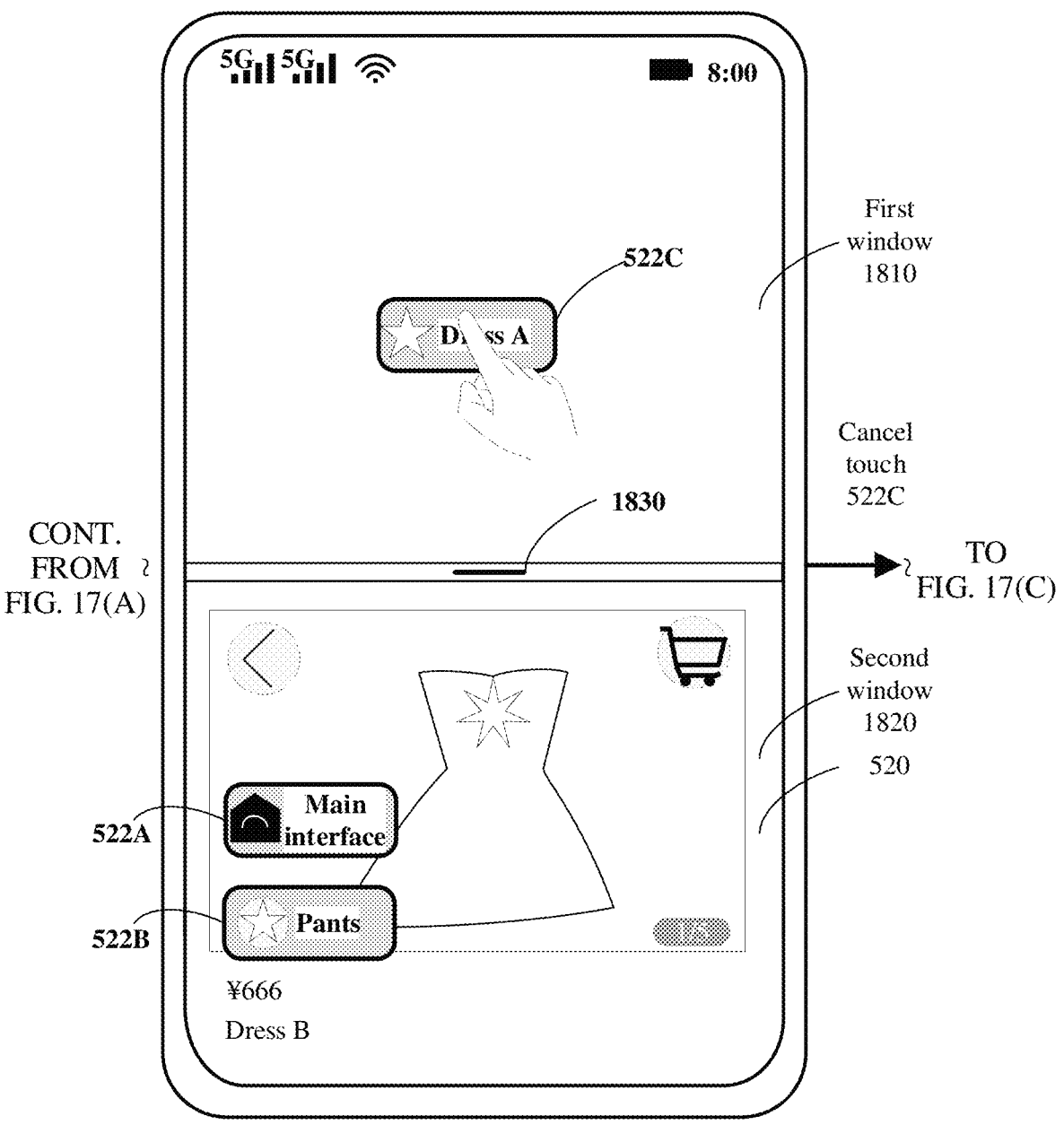
Figure 17C:
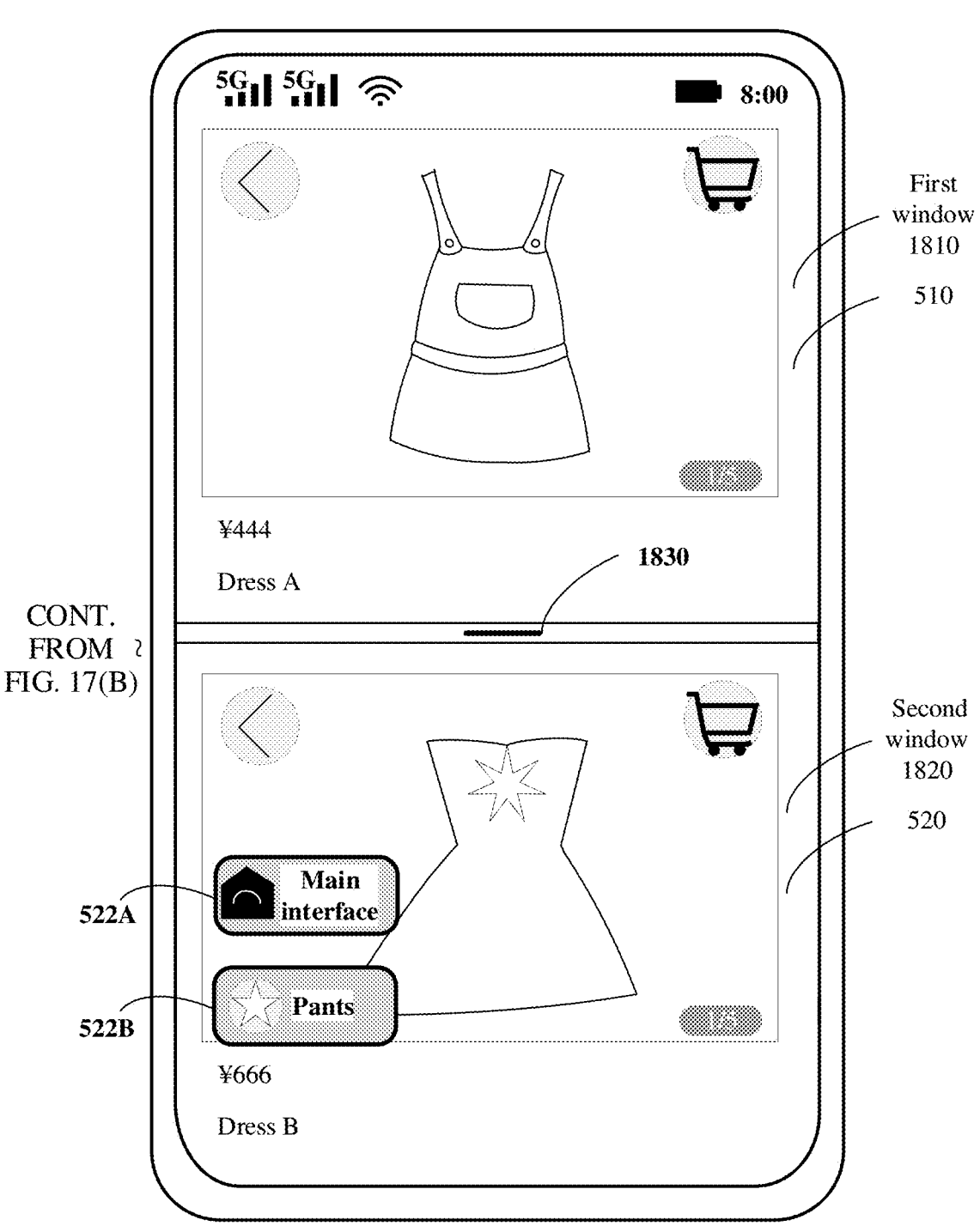

FIG. 17(A) to FIG. 17(C) are an example of schematic diagrams of embodiments of user interfaces displayed in split screen.

As shown in FIG. 17(A), the electronic device may display the user interface 520. The user interface 520 may include third prompt information 522A, fourth prompt information 522B, and fifth prompt information 522C. For a manner of triggering displaying of the prompt information, refer to FIG. 16. For descriptions of the prompt information, refer to FIG. 15(A) to FIG. 15(C). The electronic device may receive a drag operation that is for the fifth prompt information 522C, where the drag operation is used to drag the fifth prompt information 522C to the top of the screen, and in response to the drag operation, the electronic device may display a split screen interface. A specific example is shown in FIG. 17(B).

As shown in FIG. 17(B), the split screen interface displayed by the electronic device may include two windows: an upper first window 1810 and a lower second window 1820, and a moving control 1830 between the two windows. The first window 1810 is used to display the fifth prompt information 522C. The second window 1820 is used to display the user interface 520 (only a part is shown). The moving control 1830 is used to adjust relative sizes of the first window 1810 and the second window 1820. For example, when the moving control 1830 is moved upward, the first window 1810 becomes smaller, and the second window 1820 becomes larger. When detecting that a touch operation (which may also be understood as the foregoing drag operation) that is for the fifth prompt information 522C is canceled, the electronic device may display, in the first window 1810, a return interface corresponding to the fifth prompt information 522C, that is, the user interface 510. For details, refer to FIG. 17(C). In other words, the electronic device detects, in the first window 1810, a quick return operation corresponding to the fifth prompt information 522C, and therefore can directly return to display, in the first window 1810, the return interface corresponding to the fifth prompt information 522C.

In some embodiments, the user may further drag, on the user interface 520 shown in FIG. 17(C), the third prompt information 522A or the fourth prompt information 522B to the first window 1810. In this case, the electronic device may display, in the first window 1810, a return interface corresponding to the dragged prompt information, and display the fifth prompt information 522C in the first window 1810 or the second window 1820.

In some embodiments, the user may further tap the third prompt information 522A or the fourth prompt information 522B on the user interface 520 shown in FIG. 17(C), and the electronic device may display, in the second window 1820, a return interface corresponding to the tapped prompt information.

In some embodiments, the electronic device may receive a quick return operation that is for the second window 1820, for example, receive a touch operation that is for the third prompt information 522A, and in response to the touch operation, return to display a return interface corresponding to the third prompt information 522A, or receive a touch operation that is for the fourth prompt information 522B, and in response to the touch operation, return to display a return interface corresponding to the fourth prompt information 522B.

Figure 18A:
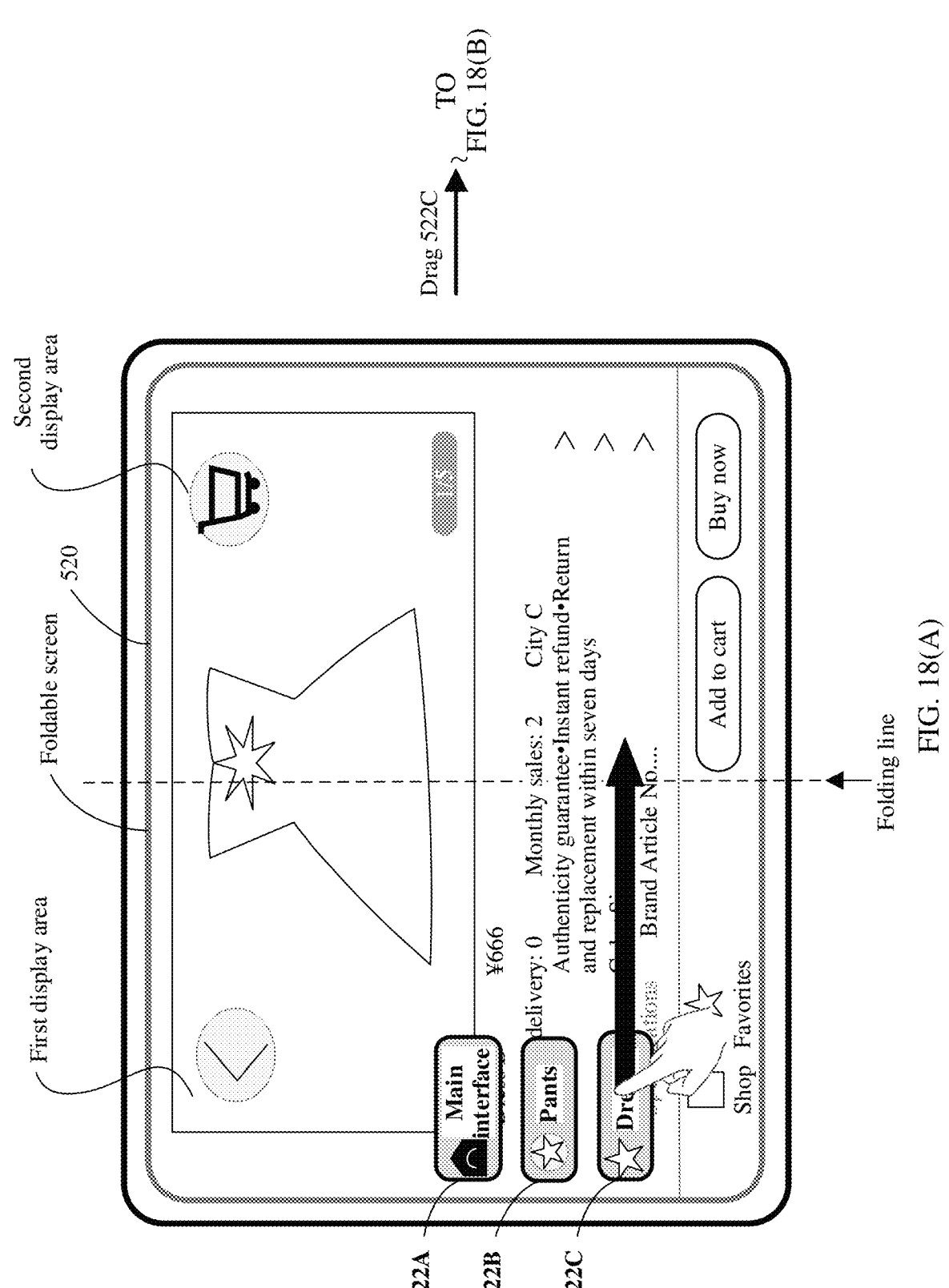
Figure 18C:
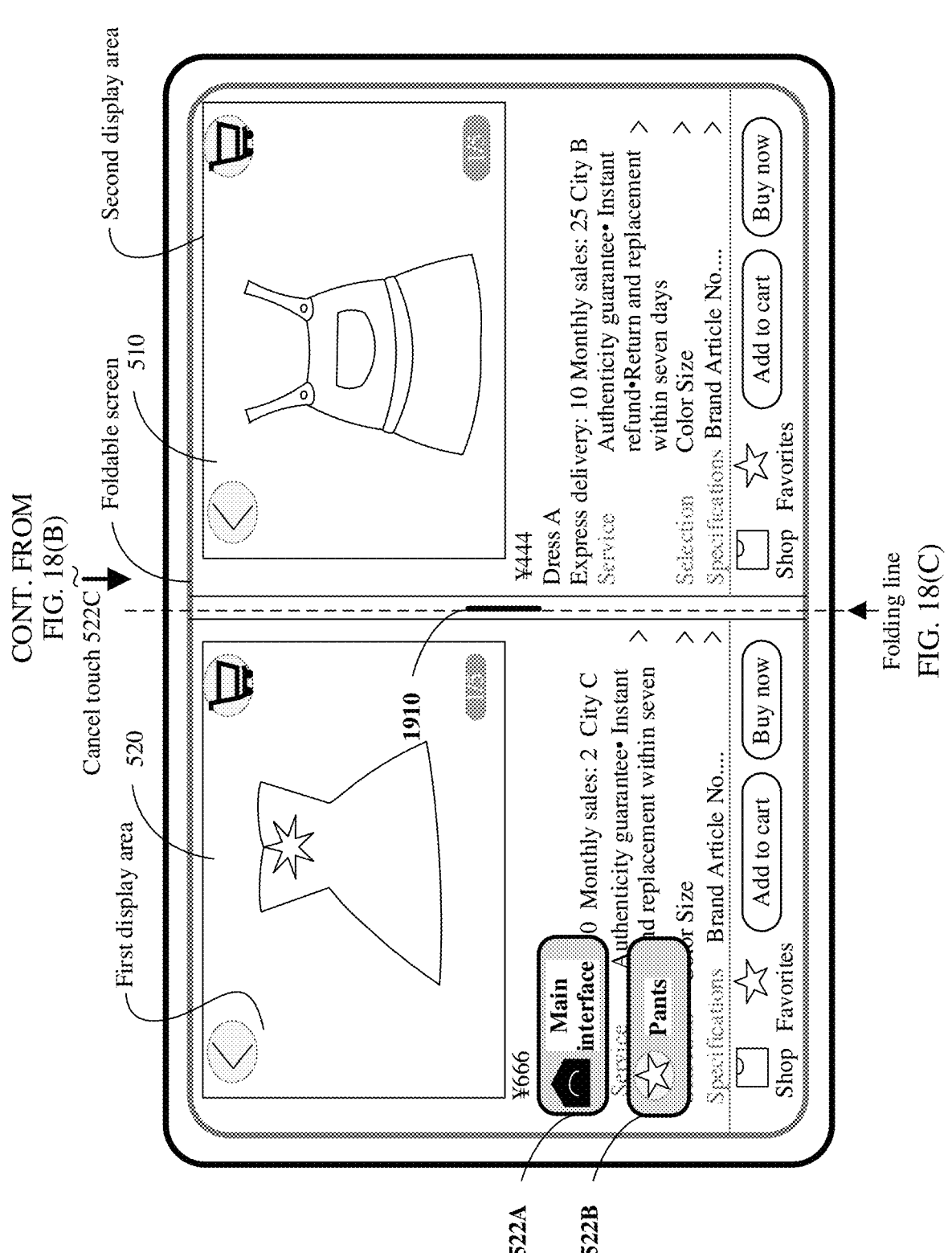

FIG. 18(A) to FIG. 18(C) are another example of schematic diagrams of embodiments of user interfaces displayed in split screen. FIG. 18(A) to FIG. 18(C) are described by using an example in which the electronic device is provided with a foldable display (referred to as a foldable screen).

As shown in FIG. 18(A) to FIG. 18(C), the foldable screen may be a flexible foldable screen, and may include a first display area and a second display area on two sides of a folding line. The foldable screen may be folded along the folding line. For example, the foldable screen may be in an unfolded state or a folded state. When a folding angle of the foldable screen is 180 degrees, the foldable screen is in an unfolded state. When a folding angle of the foldable screen is greater than or equal to 0 degrees and less than 180 degrees, the foldable screen is in a folded state. This is not limited. The foldable screen may further include another physical state and a corresponding angle. A specific physical state and a corresponding angle are not limited in this application. FIG. 18(A) to FIG. 18(C) are described by using an example in which the folding angle of the foldable screen is 180 degrees.

As shown in FIG. 18(A), the electronic device may display, on the foldable screen, the user interface 520 shown in FIG. 17(A), where the third prompt information 522A, the fourth prompt information 522B, and the fifth prompt information 522C are all located in the first display area. A process from FIG. 18(A) to FIG. 18(C) is similar to a process from FIG. 17(A) to FIG. 17(C), except that a drag direction of a drag operation that is for the fifth prompt information 522C is different. In FIG. 18(A) to FIG. 18(C), the drag operation is used to drag the fifth prompt information 522C from the first display area to the second display area. Display windows in split screen are also different. In FIG. 18(A) to FIG. 18(C), a display window used to display the original user interface 520 is the first display area, and a display window used to display the fifth prompt information 522C and a corresponding return interface is the second display area. In FIG. 18(A) to FIG. 18(C), a moving control 1910 is located on the folding line, but a specific function thereof is consistent with that of the moving control 1830 shown in FIG. 17(A) to FIG. 17(C). For a specific process, refer to the descriptions of FIG. 17(A) to FIG. 17(C). Details are not described again.

In some embodiments, the electronic device may receive a quick return operation that is for the first display area, for example, receive a touch operation that is for the third prompt information 522A, and in response to the touch operation, return to display a return interface corresponding to the third prompt information 522A, or receive a touch operation that is for the fourth prompt information 522B, and in response to the touch operation, return to display a return interface corresponding to the fourth prompt information 522B.

FIG. 17(A) to FIG. 18(C) are described by using an example in which an interface that the user wants to return to is the return interface corresponding to the fifth prompt information 522C. During specific implementation, the interface that the user wants to return to may alternatively be the return interface corresponding to the third prompt information 522A or the fourth prompt information 522B. A specific process is similar to the processes in FIG. 17(A) to FIG. 18(C), and details are not described again.

Without being limited to the examples listed in FIG. 18(A) to FIG. 18(C), during specific implementation, the foldable screen may alternatively be split into upper and lower screens. A specific split screen display manner is not limited in this application. Alternatively, the foldable screen may be a display formed by splicing a rigid screen and a flexible screen by using a connection component like a chain. A display may be disposed on both sides of the electronic device. A specific structure of the display is not limited in this application.

In some embodiments, in a process of using an application, the user may switch from a user interface of the current application to a user interface of another application. A specific example is shown in FIG. 19(A) to FIG. 19(F).

FIG. 19(A) to FIG. 19(F) are another example of schematic diagrams of user interfaces in interface switching.

Figure 19A:
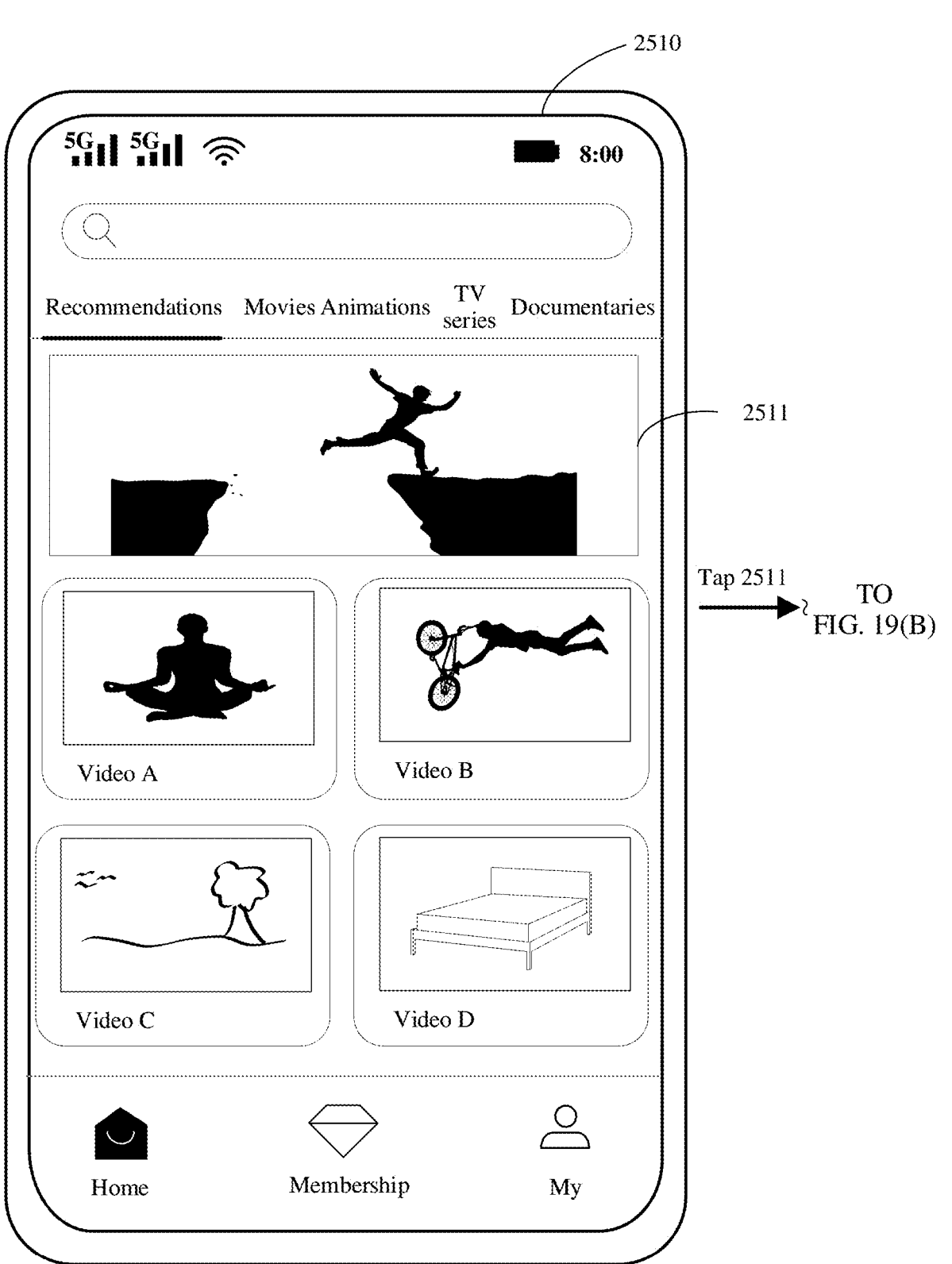

As shown in FIG. 19(A), the electronic device may display a user interface 2510. In some embodiments, the user interface 2510 may be a main interface of the video application, displayed by the electronic device in response to a user operation (for example, a touch operation) that is for an icon of the video application. Optionally, the icon of the video application is an icon on the desktop of the electronic device, for example, the video application 220A on the user interface 200 shown in FIG. 3. The user interface 2510 may include, for example, a search bar, a recommended video 2511, a recommended video list, and page options. The recommended video list may include, for example, names and cover pictures of a plurality of videos.

Figures 19A, 19B, 19C:
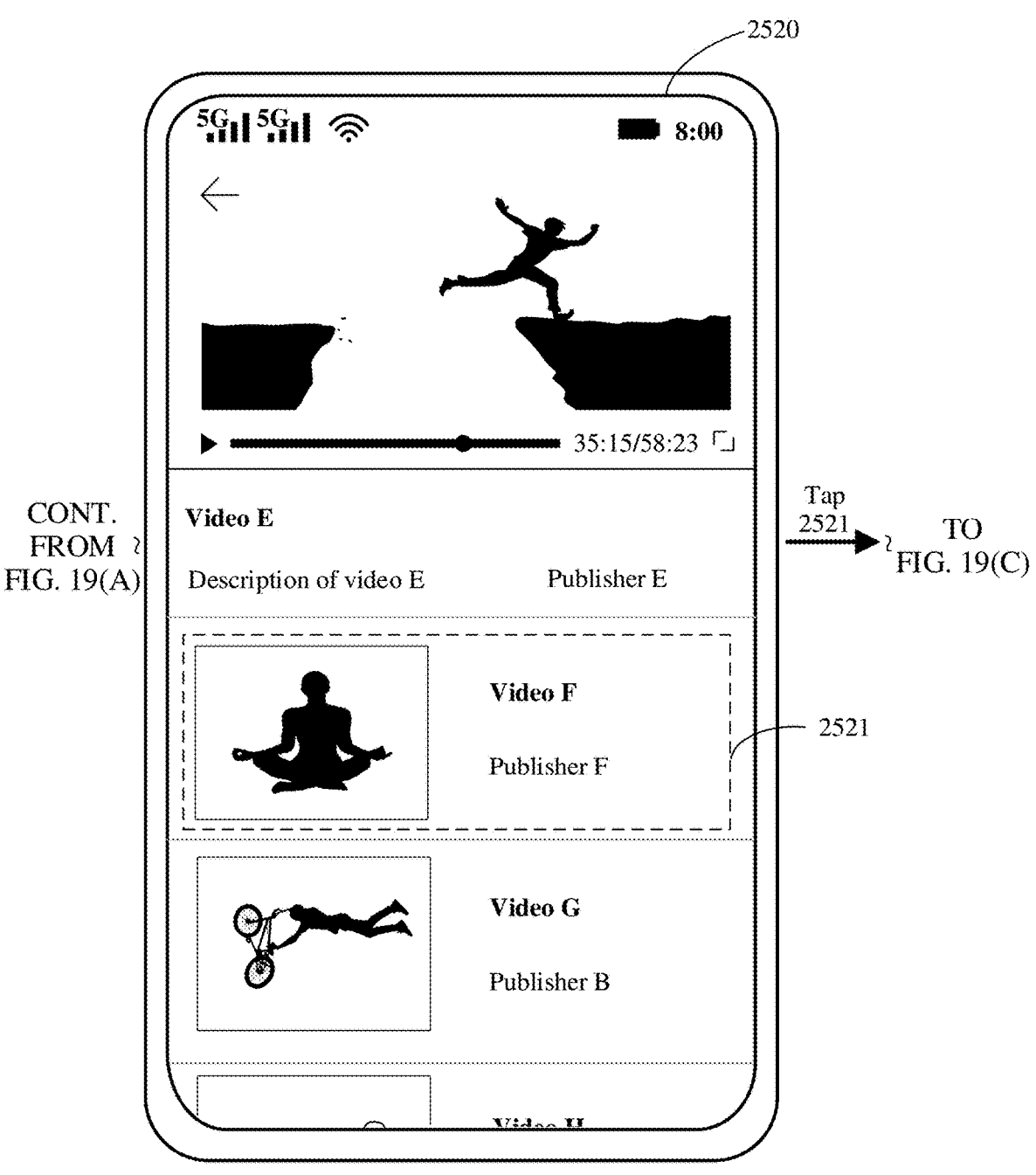

In some embodiments, assuming that the user wants to view "video E" corresponding to the recommended video 2511, the electronic device may receive a user operation (for example, a touch operation) that is for the recommended video 2511, and display, in response to the user operation, content of "video E" corresponding to the recommended video 2511, for example, a user interface 2520 shown in FIG. 19(B).

As shown in FIG. 19(B), the user interface 2520 may include video content of "video E" and detailed information (such as a name, a description, and a publisher). The user interface 2520 may further include information related to "video E", for example, information about another video recommended based on "video E". For example, a video option 2521 includes a name, a publisher, a cover picture, and the like of "video F".

In some embodiments, assuming that the user wants to view "video F" corresponding to the video option 2521, the electronic device may receive a user operation (for example, a touch operation) that is for the video option 2521, and display, in response to the user operation, content of "video F" corresponding to the video option 2521, for example, a user interface 2530 shown in FIG. 19 (C).

As shown in FIG. 19(C), the user interface 2530 may include video content of "video F" and detailed information (such as a name, a description, and a publisher). The user interface 2530 may further include information related to "video F", for example, information (such as a name, a publisher, and a cover picture) about another video recommended based on "video F", for example, a shopping option 2531 for "video F". The shopping option 2531 may include an icon and a description (including a text "Tap to buy the video") of the shopping application.

Figures 19B, 19C, 19D:
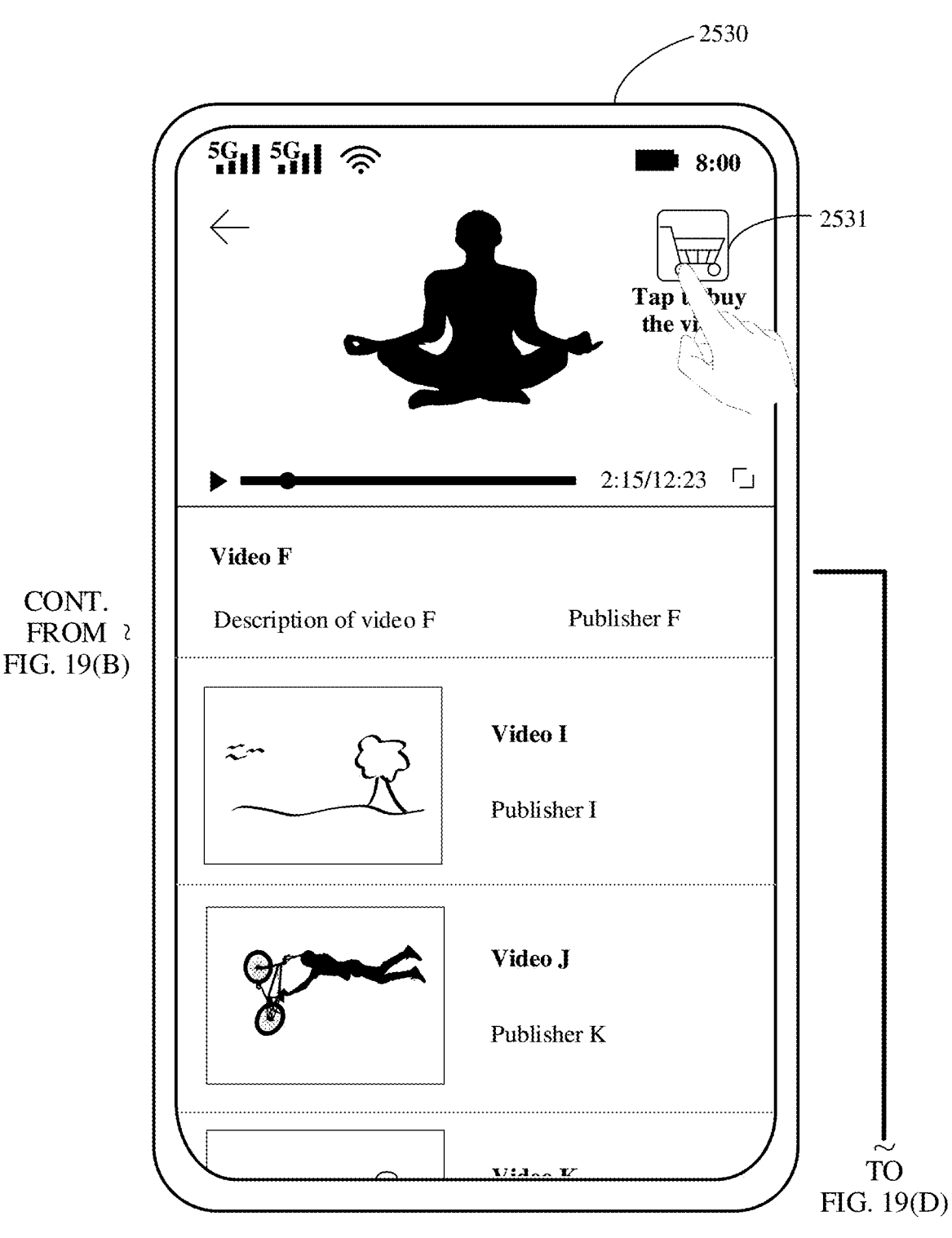
Figure 19D:
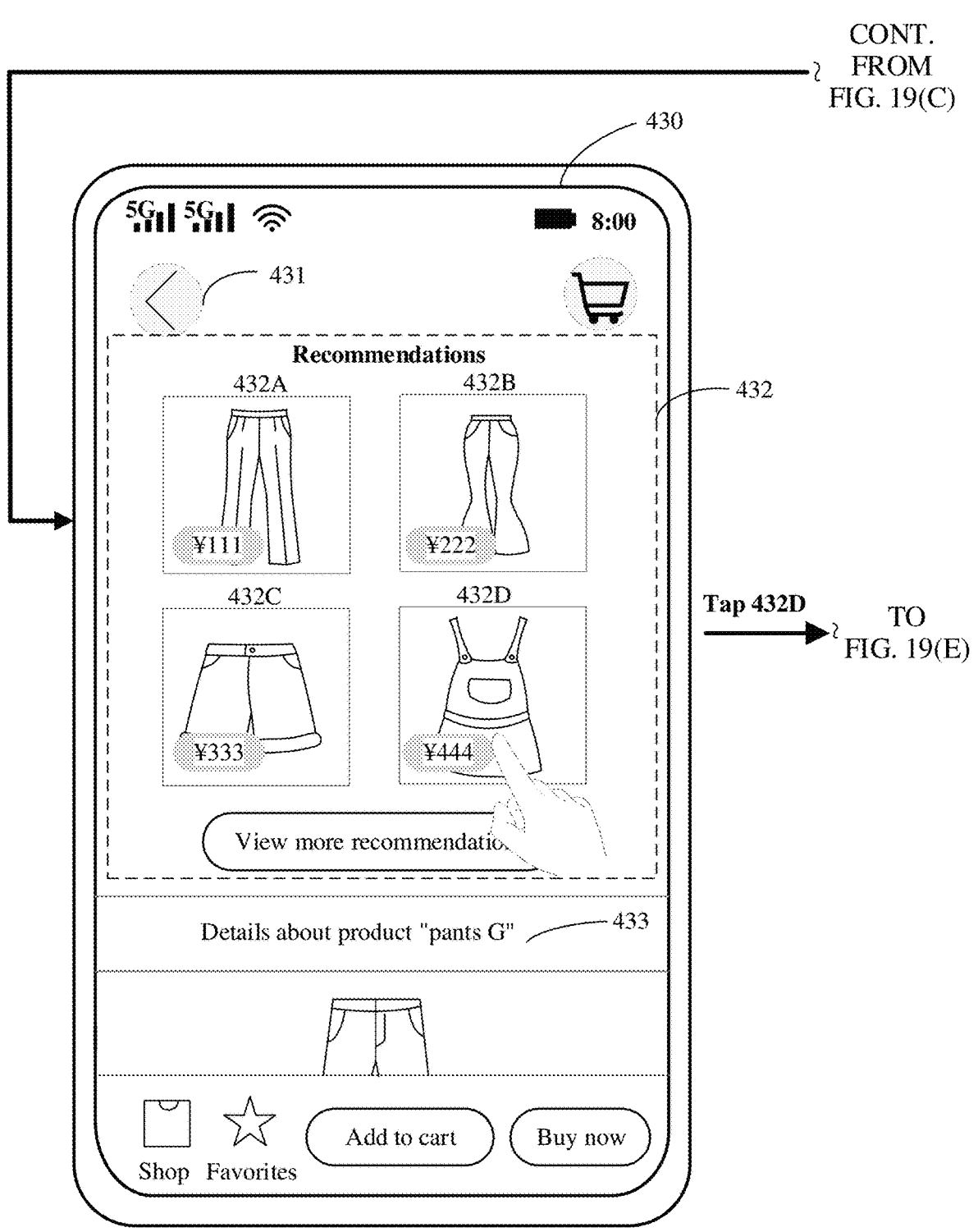
Figures 19D, 19E, 19F:
Figures 19E, 19F:
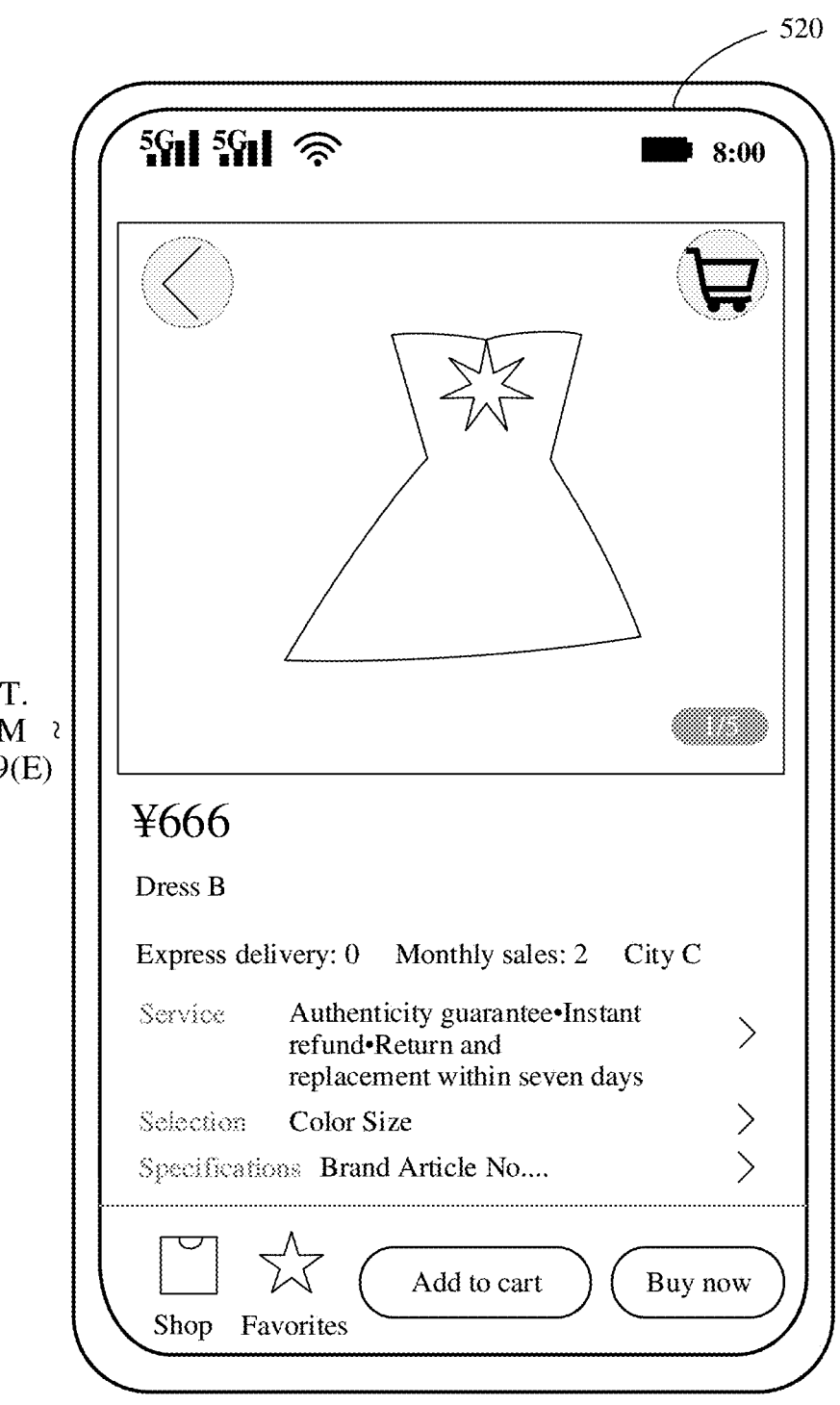

In some embodiments, the electronic device may receive a user operation (for example, a touch operation) that is for the shopping option 2531, and display, in response to the user operation, a user interface of the shopping application associated with "video F", for example, detailed information about a product "pants G" that appears in video content, for example, the user interface 430 shown in FIG. 19(D), that is, the user interface 430 shown in FIG. 4(D). The electronic device may continue to switch from the user interface 430 shown in FIG. 19(D) to the user interface 510 shown in FIG. 19(E) and the user interface 520 shown in FIG. 19(F). This process is consistent with the switching process of switching from the user interface 430 shown in FIG. 4(D) to the user interface 510 shown in FIG. 4(E) and the user interface 520 shown in FIG. 4(F), and details are not described again.

In some embodiments, the electronic device may separately return to display user interfaces of different applications in response to different types of received quick return operations. For example, in response to a received first quick return operation, the electronic device may directly return to display a first displayed user interface of the shopping application, that is, the user interface 430 shown in FIG. 19(D), and in response to a received second quick return operation, the electronic device may directly return to display the main interface of the video application, that is, the user interface 2510 shown in FIG. 19(A). For a specific example, refer to FIG. 20(A) to FIG. 20(C).

Figures 20A, 20B:
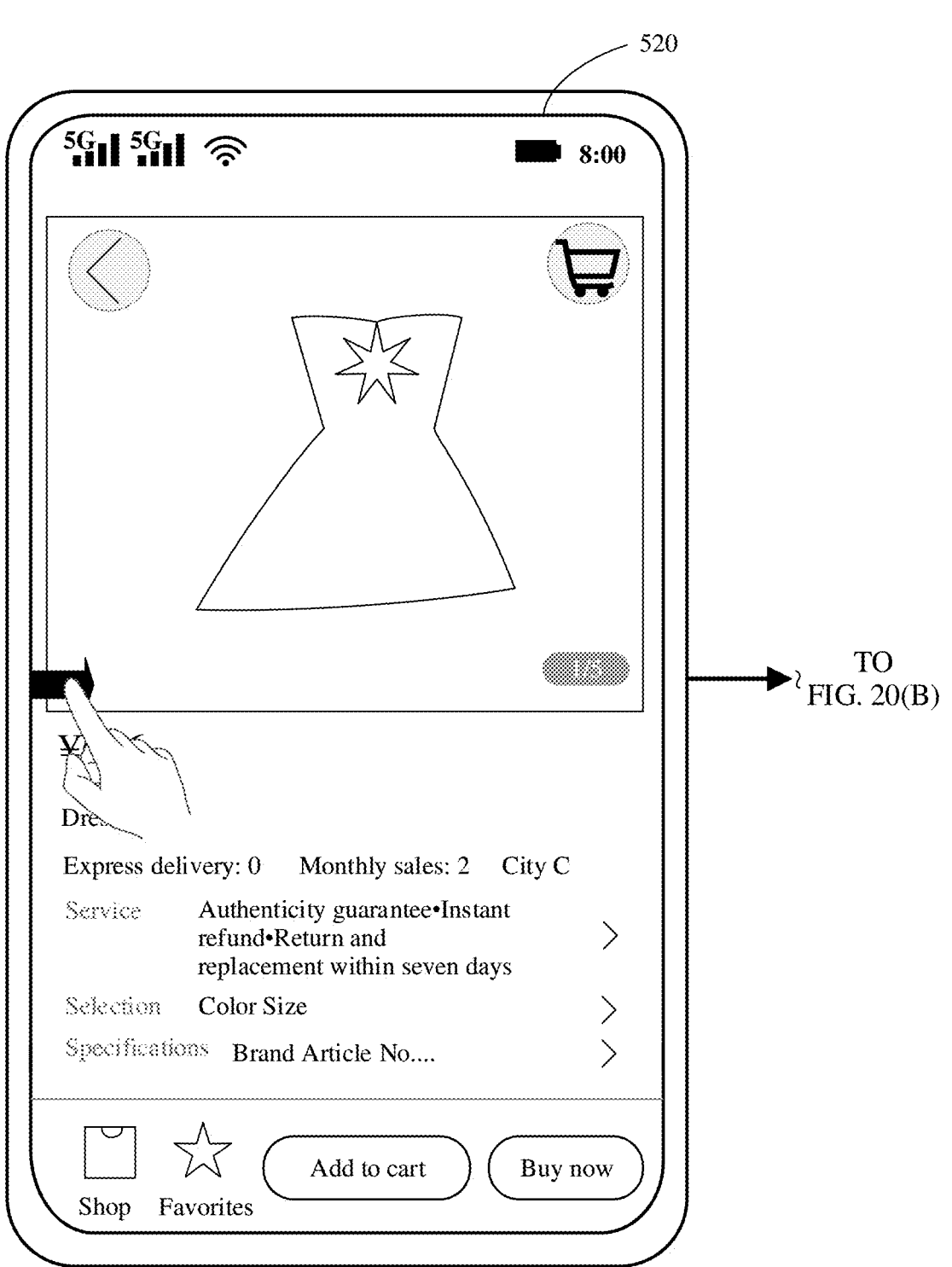
Figure 20B:
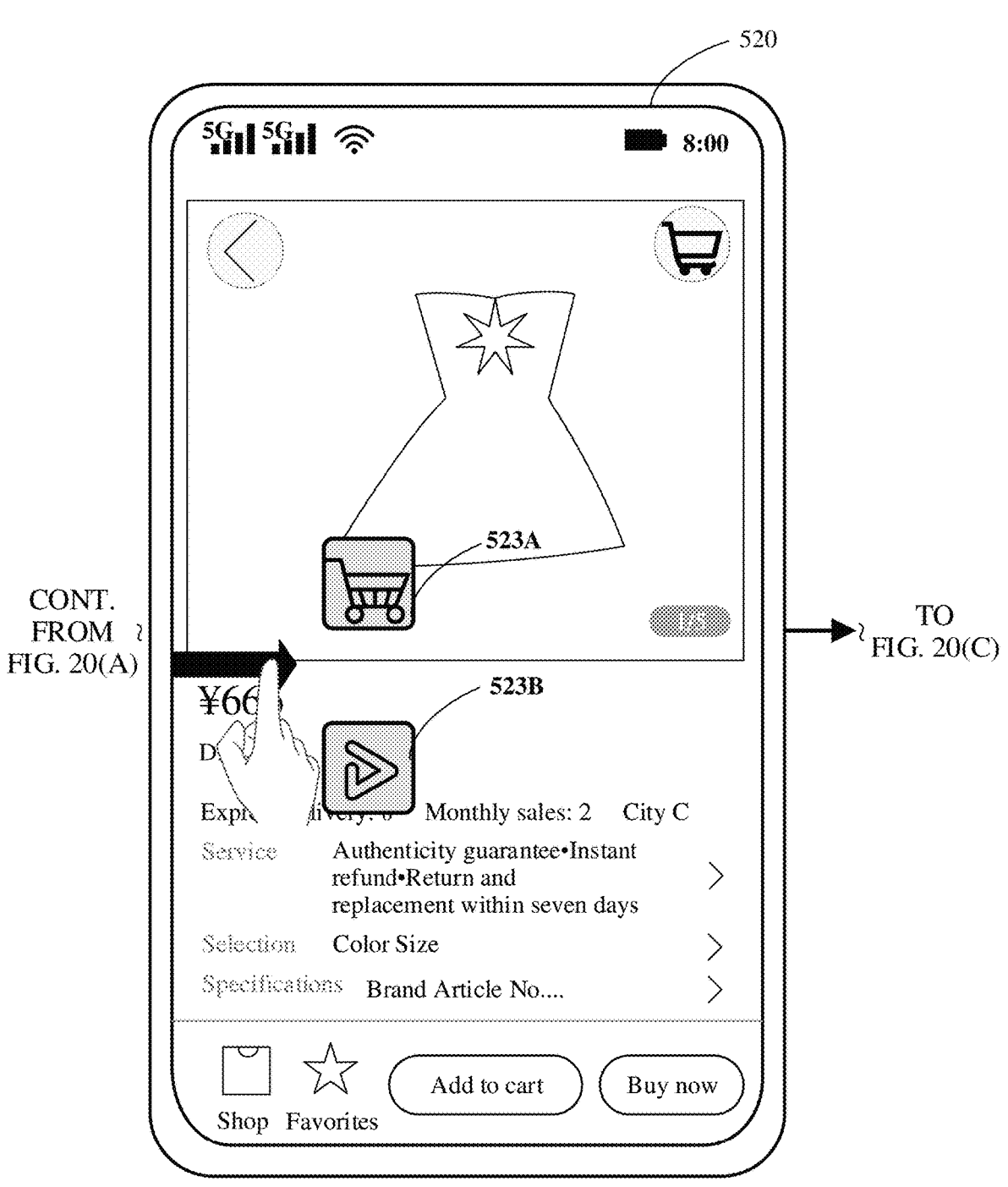

FIG. 20(A) and FIG. 20(B) are another example of schematic diagrams of return operations.

Figure 20C:
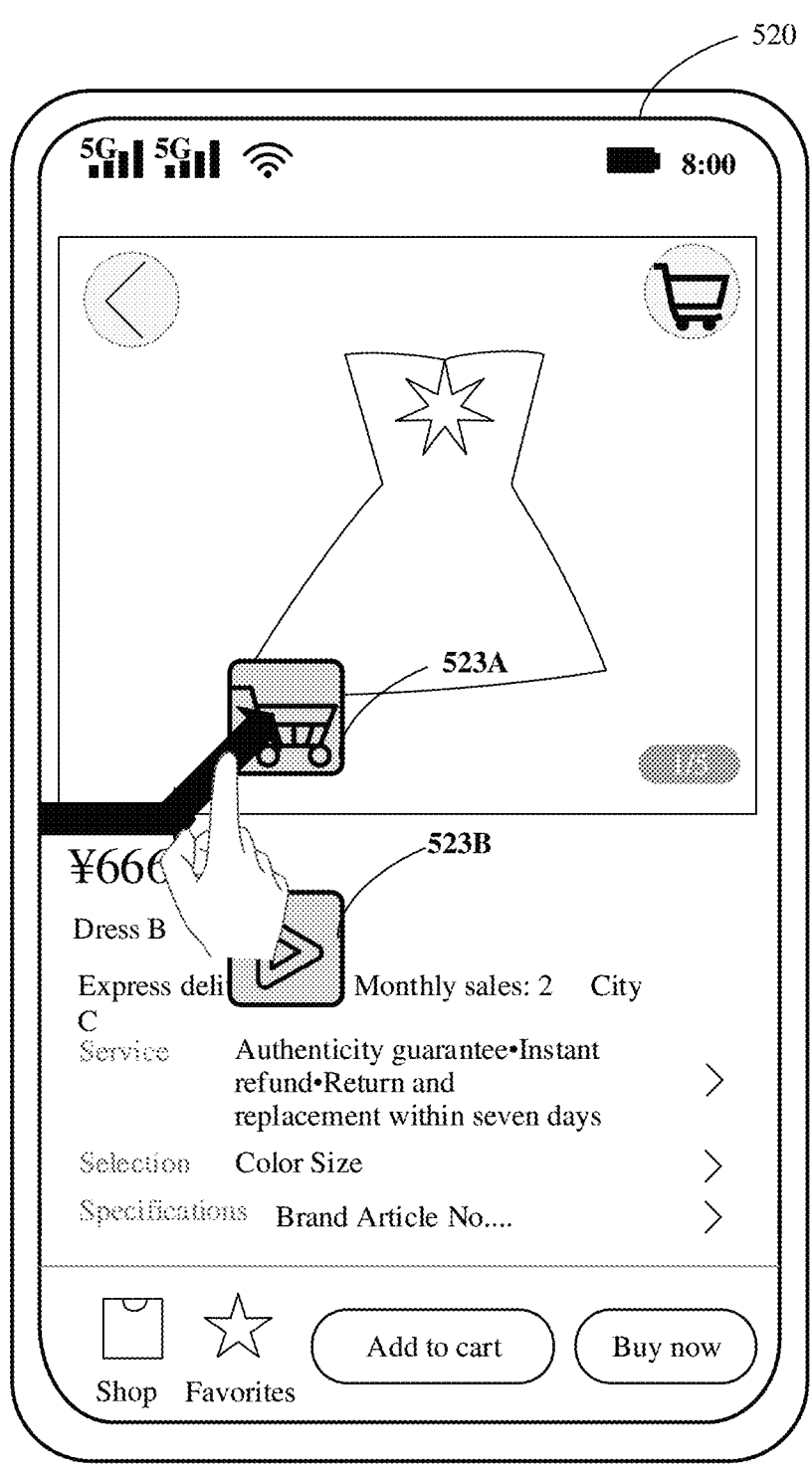

As shown in FIG. 20(A), when displaying the user interface 520, the electronic device may receive a sliding operation that is for a return area 2 and whose sliding distance is a first distance. In this case, the user interface 520 remains unchanged. The electronic device may continue to receive the sliding operation that is for the return area 2, but in this case, the sliding distance is changed to a second distance, and the second distance is longer than the first distance. In response to the sliding operation, the electronic device may display sixth prompt information 523A and seventh prompt information 523B on the user interface 520, specifically as shown in FIG. 20(B). The two pieces of prompt information may be located near a finger touch location of the user, for example, on a right side of the touch location. The two pieces of prompt information may correspond to two types of return operations used to return to user interfaces of different applications. The two pieces of prompt information may include icons of applications whose interfaces are returned to. The sixth prompt information 523A includes the icon of the shopping application. The seventh prompt information 523B includes the icon of the video application. The electronic device may receive a touch operation that is for the sixth prompt information 523A, specifically as shown in FIG. 20(C). A touch operation that is for the seventh prompt information 523B is similar. In response to the touch operation that is for the sixth prompt information 523A, the electronic device may return to display the first displayed user interface of the shopping application, that is, the user interface 430 shown in FIG. 19(D). In response to the touch operation that is for the seventh prompt information 523B, the electronic device may return to display the main interface of the video application, that is, the user interface 2510 shown in FIG. 19(A).

Other examples are similar to the foregoing embodiments for quickly returning to an interface of one application as shown in FIG. 6(A) to FIG. 18(C). The examples are not described one by one.

In some embodiments, the foregoing prompt information may be obtained based on analysis of the return interface, for example, an identifier name of the return interface (for example, on the user interface 430 shown in FIG. 6(C), the first prompt information 434 is "return to a main interface", and the corresponding return interface is the main interface of the shopping application), for example, obtained through semantic analysis of the return interface (for example, when the return interface is the user interface 520 shown in FIG. 6(A), the prompt information may include a product name "dress B"), or for example, obtained by analyzing a return interface image (for example, when the return interface is the user interface 520 or 530 shown in FIG. 6, the prompt information may include a product picture). In some other embodiments, the foregoing prompt information may alternatively be an icon determined by the electronic device based on an application type of the return interface, for example, an application icon determined from an application icon library (as shown in FIG. 10(A) to FIG. 11(C), the second prompt information 521 is the icon of the shopping application, and the corresponding return interface is the main interface of the shopping application). A specific representation of the prompt information is not limited in this application.

Without being limited to the foregoing example, the electronic device may alternatively display prompt information in response to a received trigger operation. The trigger operation is, for example, an operation of sliding inward horizontally from a right edge of the screen, or an operation of long sliding inward from the left edge of the screen. A specific manner of triggering displaying of the prompt information is not limited in this application.

Without being limited to the foregoing example, the quick return operation may alternatively be a long sliding operation with a long sliding distance. A specific type of the quick return operation is not limited in this application.

Without being limited to the foregoing example, in the embodiment shown in FIG. 4(A) to FIG. 4(F), the electronic device may further switch to display more user interfaces. For example, there are also a plurality of user interfaces between FIG. 4(A) and FIG. 4(D), and there are also a plurality of user interfaces between FIG. 4(D) and FIG. 4(F). Therefore, in the embodiment shown in FIG. 5(A) to FIG. 5(F), to return to the user interface 300 shown in FIG. 5(F), the user needs to perform more return operations, and more user interfaces are returned to for displaying. In the embodiments shown in FIG. 6(A) to FIG. 6(F) and FIG. 8(A) to FIG. 8(F), the electronic device may return to more user interfaces in response to a quick return operation. The embodiment shown in FIG. 19(A) to FIG. 19(F) is similar. A quantity of user interfaces displayed during switching and a quantity of returned user interfaces are not limited in this application.

In some embodiments, a function of returning to a plurality of interfaces (quick return function for short) by the electronic device in response to one return operation may be in an enabled state or a disabled state by default. In some other embodiments, the electronic device may alternatively enable or disable a quick return function in response to a user operation. Specific examples are shown in FIG. 21 to FIG. 25.

Figure 21:
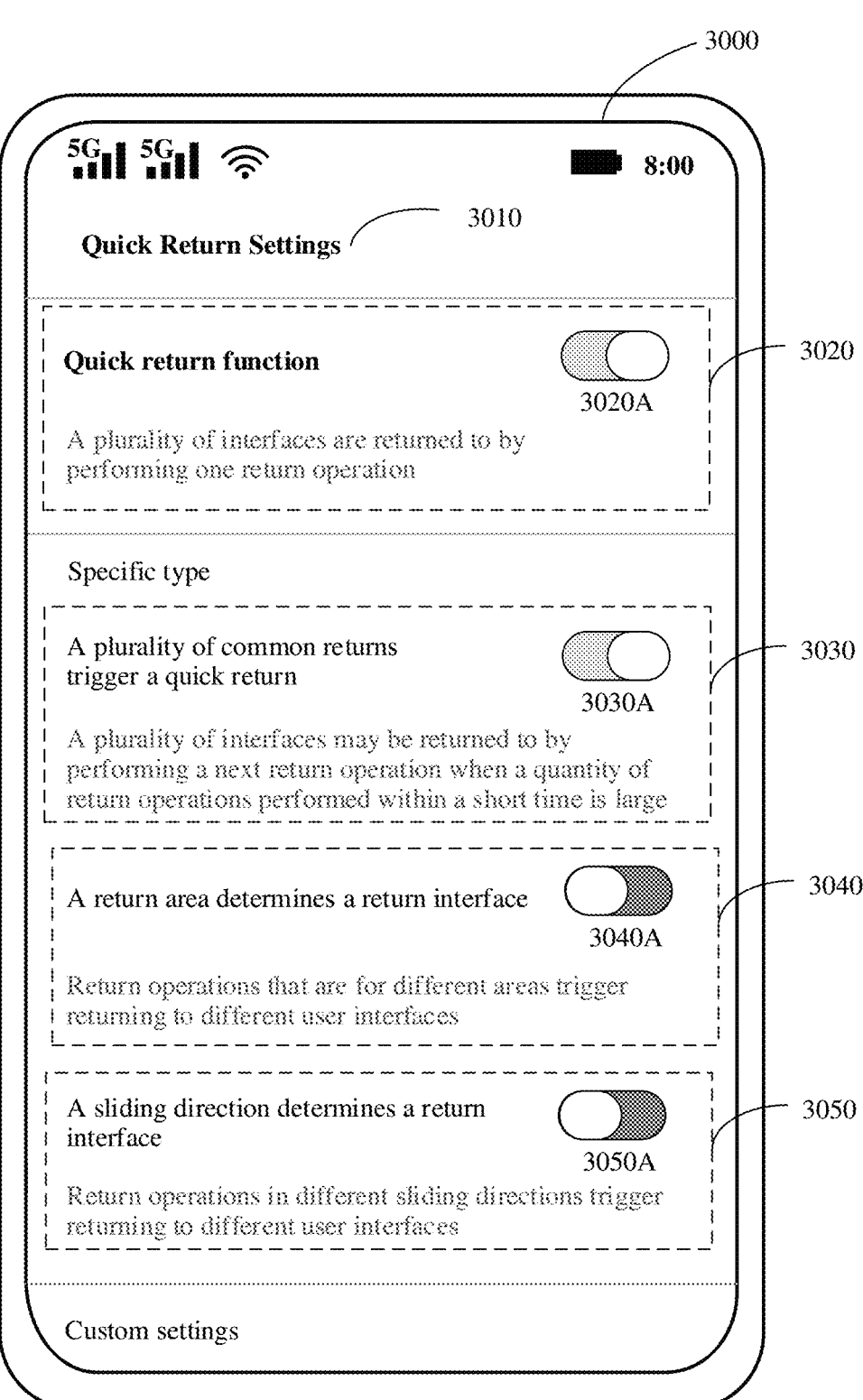

FIG. 21 is another example of a schematic diagram of a user interface.

As shown in FIG. 21, the electronic device may display a user interface 3000. The user interface 3000 may include a page heading 3010 (that is, "Quick Return Settings"), a general function option 3020, a first function option 3030, a second function option 3040, and a third function option 3050.

The general function option 3020 may include a corresponding function name (that is, "quick return function"), function description (that is, "a plurality of interfaces are returned to by performing one return operation"), and an on/off control 3020A. The on/off control 3020A is used to enable or disable the quick return function. The electronic device may receive a user operation (for example, a touch operation) that is for the on/off control 3020A, and enable or disable the quick return function in response to the user operation.

Some embodiments may include N types of quick return functions, for example, functions corresponding to the first function option 3030, the second function option 3040, and the third function option 3050. M of the N types of quick return functions may take effect simultaneously, or only one of the N types of quick return functions may take effect, where M and N are positive integers, and N is greater than or equal to M.

The first function option 3030 may include a corresponding function name (that is, "a plurality of common returns trigger a quick return"), a function description (that is, "a plurality of interfaces may be returned to by performing a next return operation when a quantity of return operations performed within a short time is large"), and an on/off control 3030A. The second function option 3040 may include a corresponding function name (that is, "a return area determines a return interface"), a function description (that is, "return operations that are for different areas trigger returning to different user interfaces"), and an on/off control 3040A. The third function option 3050 may include a corresponding function name (that is, "a sliding direction determines a return interface"), a function description (that is, "return operations in different sliding directions trigger returning to different user interfaces"), and an on/off control 3050A. The electronic device may receive a user operation (for example, a touch operation) that is for an on/off control in any one of the three function options, and enable or disable a corresponding quick return function in response to the user operation. After a function corresponding to the first function option 3030 is enabled, for an example of the quick return operation, refer to FIG. 6(A) to FIG. 6(F).

In some embodiments, after a function corresponding to the second function option 3040 is enabled, the electronic device may display a detailed description of the function. For details, refer to an embodiment shown in FIG. 22.

Figure 22:
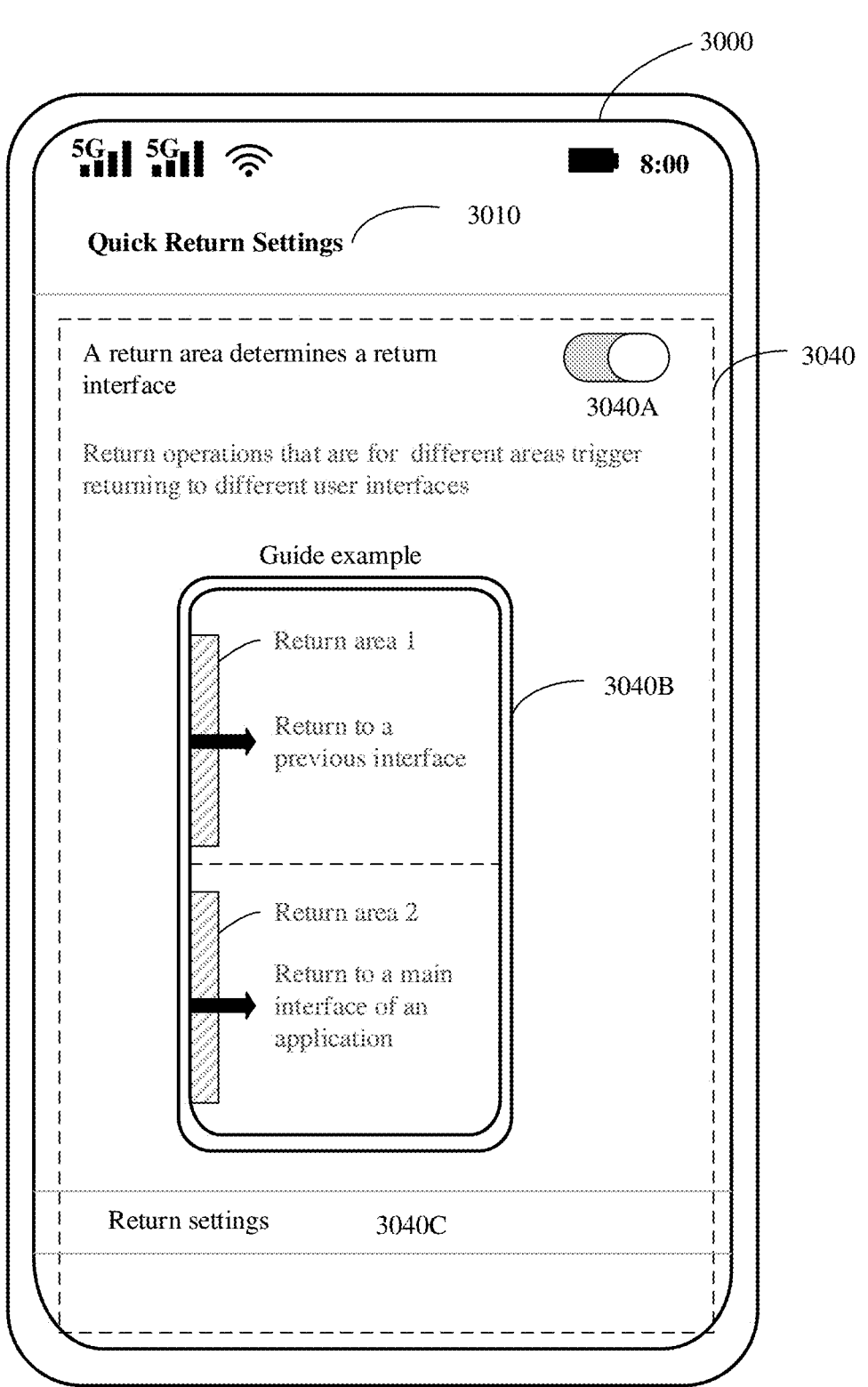

As shown in FIG. 22, when the on/off control 3040A of the second function option 3040 is in an on state, the second function option 3040 may further include a guide example 3040B and a return settings 3040C. After the function corresponding to the second function option 3040 is enabled, for an example of the quick return operation, refer to FIG. 7, FIG. 8(A) to FIG. 8(F), and FIG. 13. The guiding example 3040B is similar to that in FIG. 7. The return settings 3040C may be used to set sizes of different return areas, and return interfaces corresponding to different return areas.

In some embodiments, after a function corresponding to the third function option 3050 is enabled, the electronic device may display a detailed description of the function. For details, refer to an embodiment shown in FIG. 23.

Figure 23:
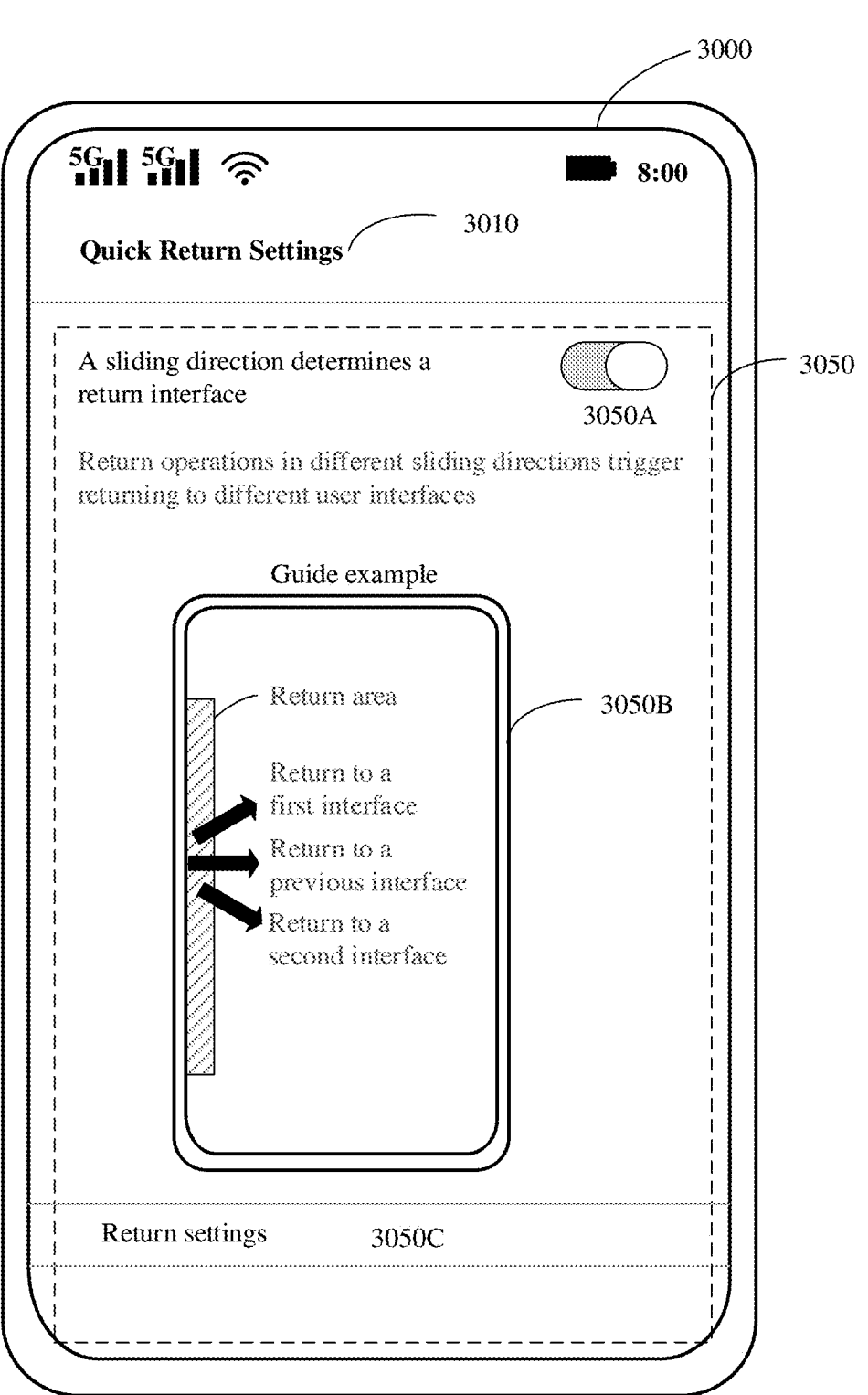

As shown in FIG. 23, when the on/off control 3050A of the third function option 3050 is in an on state, the third function option 3050 may further include a guide example 3050B and return settings 3050C. After the function corresponding to the third function option 3050 is enabled, for an example of the quick return operation, refer to FIG. 9, FIG. 14 to FIG. 16(B), and FIG. 20(A) to FIG. 20(C). The guide example 3050B is similar to that in FIG. 14. The return settings 3050C may be used to set a size of a return area, and returned user interfaces corresponding to different sliding directions.

In some embodiments, the electronic device may display a user interface of the return settings in response to a user operation (for example, a touch operation) that is for the return settings 3040C shown in FIG. 22. For a specific example, refer to FIG. 24.

Figure 24:
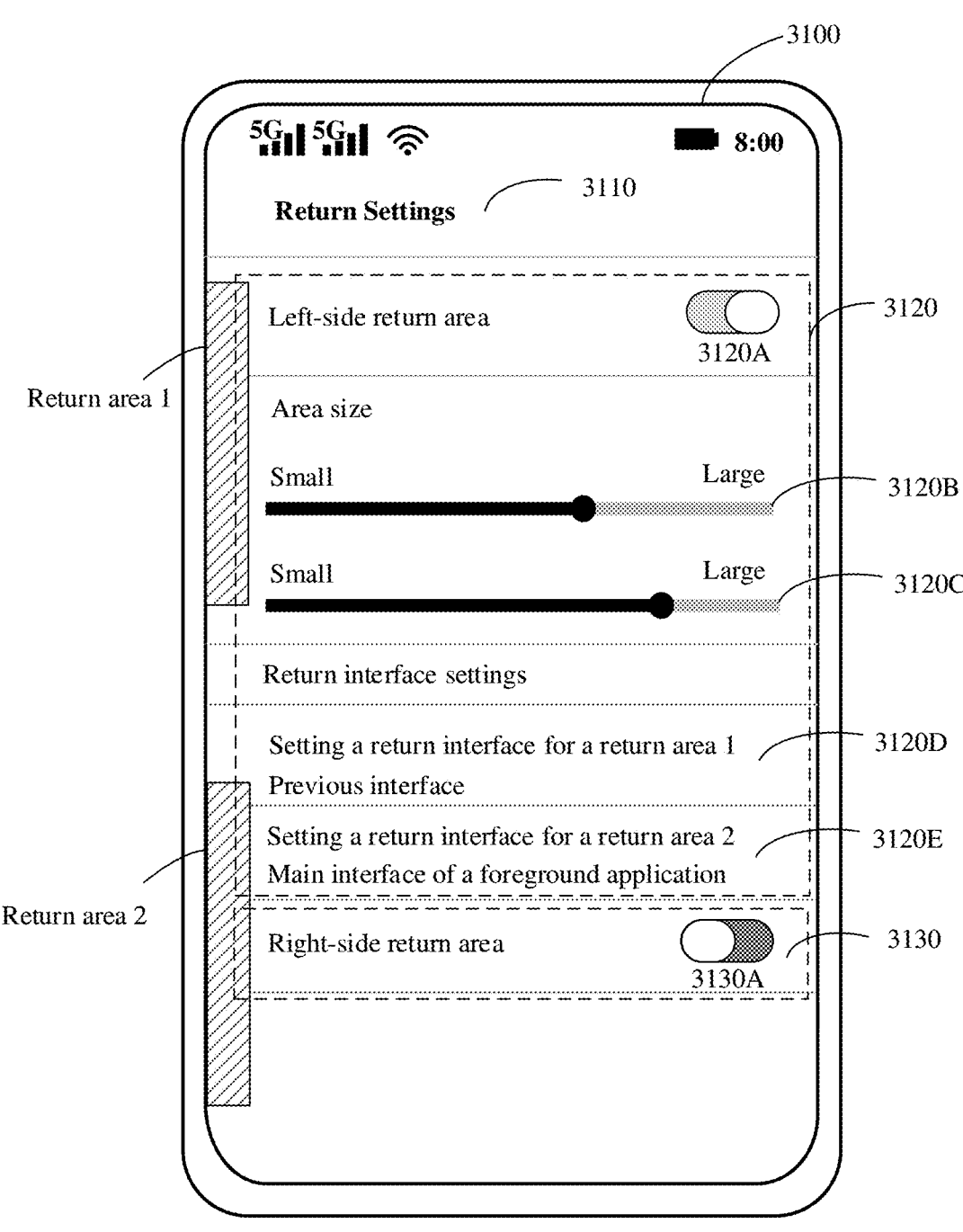

FIG. 24 is another example of a schematic diagram of a user interface.

As shown in FIG. 24, a user interface 3100 may include a page heading 3110 (that is, "Return Settings"), a left-side return area setting 3120, and a right-side return area setting 3130.

The left-side return area setting 3120 may include an on/off control 3120A, and the on/off control 3120A may be used to enable or disable a return area at the left edge of the screen. When the on/off control 3120A on the user interface 3100 is in an on state, the left edge of the screen shows a return area 1 and a return area 2, and the left-side return area setting 3120 further includes an area size setting and return interface settings. The area size setting may include a horizontal size setting bar 3120B and a vertical size setting bar 3120C. The horizontal size setting bar 3120B may be used to adjust horizontal widths of the return area 1 and the return area 2. The vertical size setting bar 3120C may be used to adjust vertical widths of the return area 1 and the return area 2. The return interface settings may include a setting option 3120D of a return interface corresponding to the return area 1 and a setting option 3120E of a return interface corresponding to the return area 2.

An on/off control 3130A included in the right-side return area setting 3130 may be used to enable or disable a return area at the right edge of the screen. A specific setting is similar to that of the left-side return area setting 3120, and details are not described again.

The return settings 3050C shown in FIG. 23 are similar to the return settings shown in FIG. 24, and details are not described again.

In some embodiments, in response to a user operation, the electronic device may further enable another function like manually adding a return interface to favorites. For a specific example, refer to FIG. 25.

Figure 25:
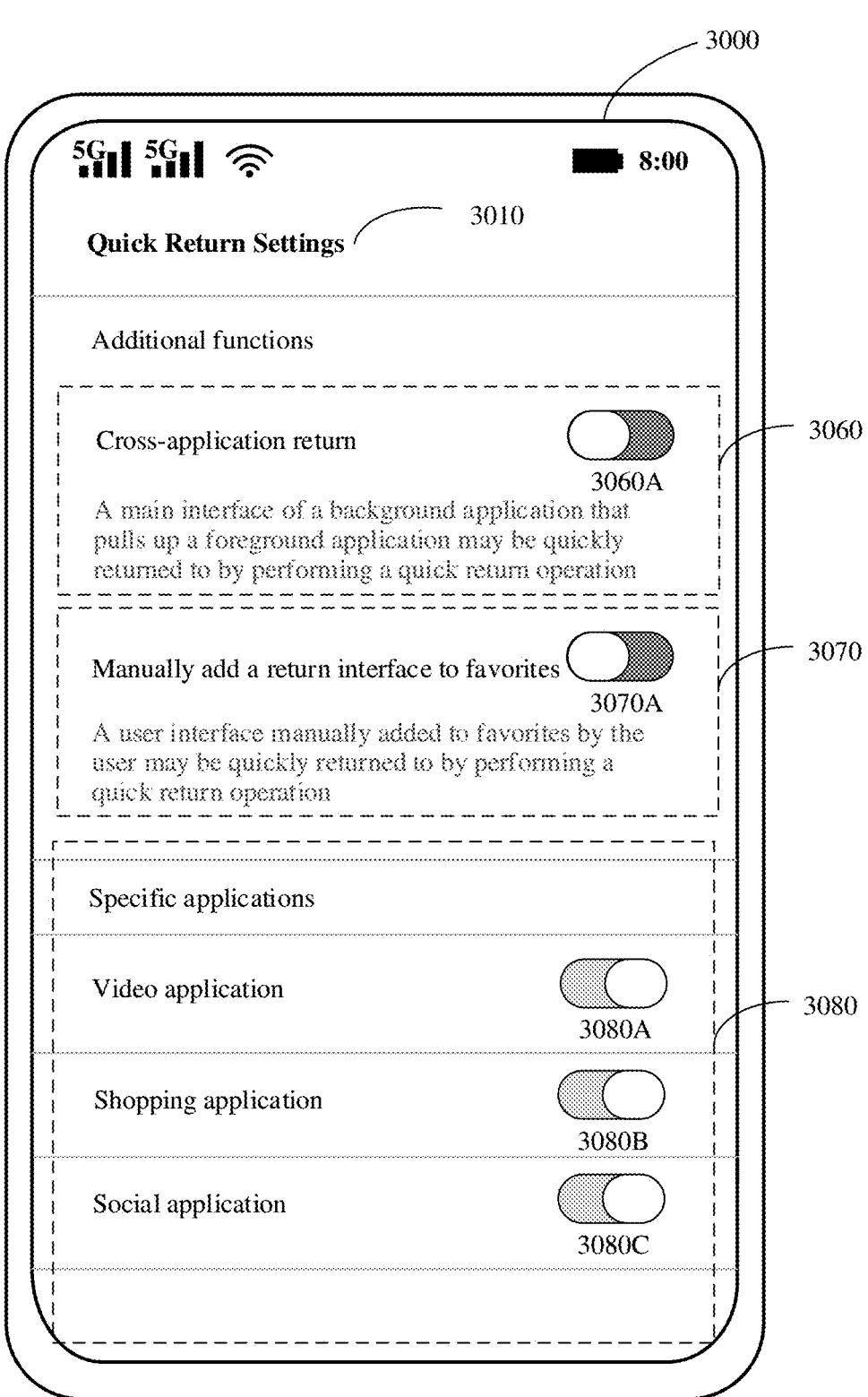

FIG. 25 is another example of a schematic diagram of a user interface.

As shown in FIG. 25, the user interface 3000 may be a user interface displayed by the electronic device in response to a sliding operation (for example, an operation of sliding from the bottom up) that is for the user interface 3000 shown in FIG. 21. The user interface 3000 may further include a fourth function option 3060, a fifth function option 3070, and application options 3080.

The fourth function option 3060 may include a corresponding function name (that is, "cross-application return"), a function description (that is, "a main interface of a background application that pulls up a foreground application may be quickly returned to by performing a quick return operation"), and an on/off control 3060A. The foreground application is an application visible to and interactive with the user. The background application is an application non-interactive with the user. The fifth function option 3070 may include a corresponding function name (that is, "manually add a return interface to favorites"), a function description (that is, "a user interface manually added to favorites by the user may be quickly returned to by performing a quick return operation"), and an on/off control 3070A. The electronic device may receive a user operation (for example, a touch operation) that is for an on/off control in either of the two function options, and enable or disable a corresponding quick return function in response to the user operation. After a function corresponding to the fourth function option 3060 is enabled, for an example of the quick return operation, refer to FIG. 20(A) to FIG. 20(C). After a function corresponding to the fifth function option 3070 is enabled, for examples of an add-to-favorites operation and the quick return operation, refer to FIG. 12 and FIG. 15(A) to FIG. 16(B).

The application options 3080 may include on/off controls of quick return functions of a plurality of applications, for example, a function switch 3080A of the video application, an on/off control 3080B of the shopping application, and an on/off control 3080C of the social application. An on/off control of any application is used by the user to enable or disable a quick return function for the application. In some embodiments, applications in the application options 3080 may be set by the electronic device by default. For example, the shopping application and the video application shown in FIG. 3 to FIG. 20(C) are applications for which quick return functions can be enabled. In a process of using the shopping application and the video application, the user may start from user interface A, and skip a plurality of user interfaces midway to reach another user interface B. In addition, when returning to the user interface, the user needs to perform a plurality of common return operations to return to user interface A, or a user interface displayed between user interface A and user interface B. However, for an application for which a quick return function usually cannot be enabled, for example, a gallery application, usually, the user switches from user interface C (for example, a picture list) to another user interface D (for example, an interface of picture A), then returns to user interface C, and then switches from user interface C to another user interface E (for example, an interface of picture B). For another user interface to which the user switches from user interface C, the user usually needs to perform only a few return operations to return to user interface C.

Without being limited to the foregoing example, the user may further set different sliding distances to correspondingly return to different user interfaces, whether to display prompt information, a specific form of the prompt information, and the like. A quick return function that can be set by the user is not limited in this application.

Without being limited to the foregoing example, the electronic device may further enable quick return functions of some applications (for example, the shopping application and the video application) by default, or the electronic device may enable quick return functions of all applications by default. Applications for which quick return functions are enabled are not limited in this application.

Without being limited to the foregoing listed user operations, during specific implementation, the common return operation and the quick return operation may alternatively differ in sliding distances, and different types of quick return operations may alternatively differ in sliding distances. A specific form of the user operation is not limited in this application.

Based on the embodiments shown in FIG. 1, FIG. 2A and FIG. 2B, and FIG. 3 to FIG. 25, the following describes a quick interface return method provided in this application.

Figure 26:
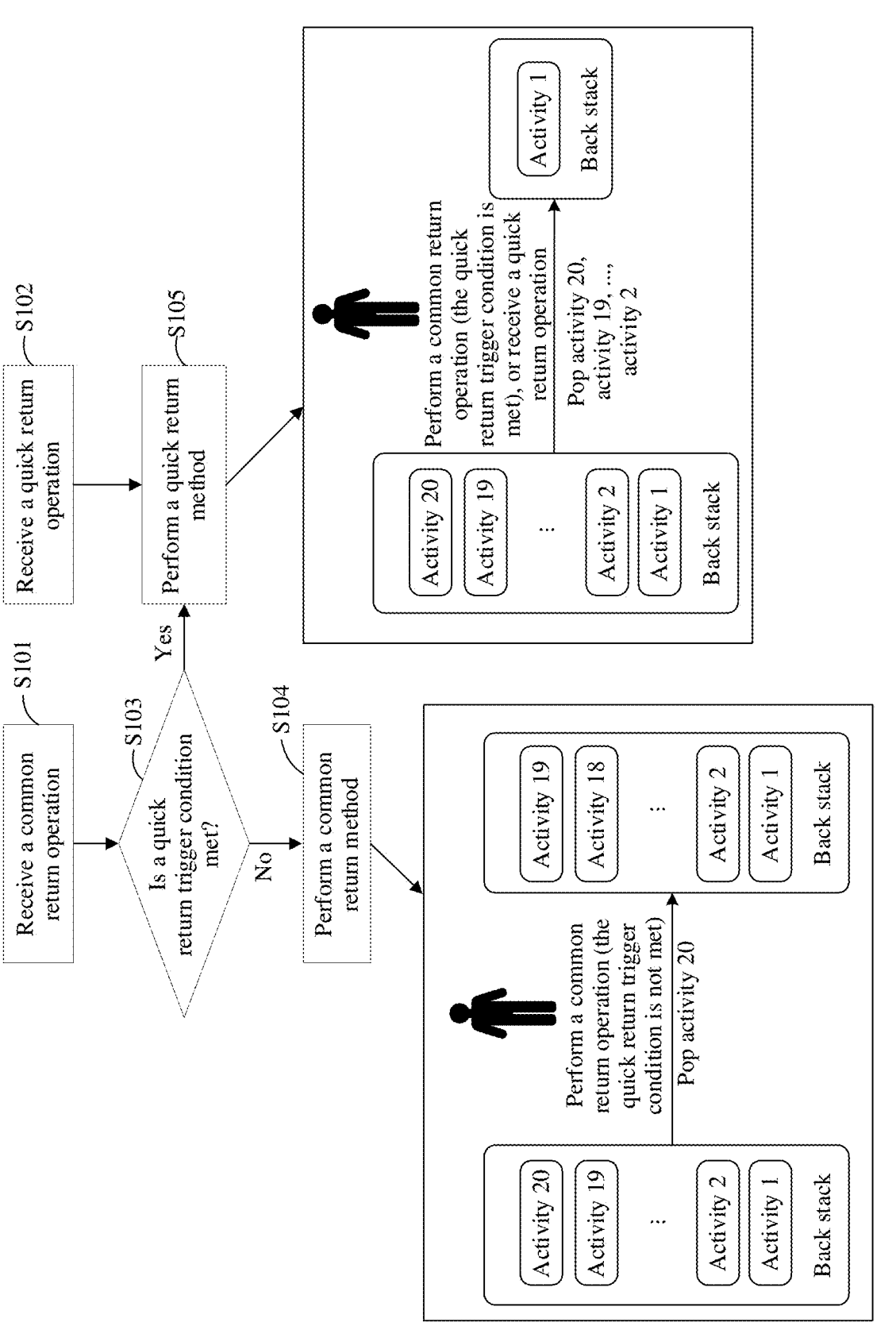
FIG. 26 is a schematic flowchart of a quick interface return method according to an embodiment of this application.

FIG. 26 shows a quick interface return method provided in an embodiment of this application. The method may be applied to the electronic device 100 shown in FIG. 2A. The method may be applied to the electronic device 100 shown in FIG. 2B. The method may include but is not limited to the following steps.

S101. The electronic device receives a common return operation.

S102. The electronic device receives a quick return operation.

Specifically, the common return operation and the quick return operation may meet, without limitation, at least one of the following: The operations are for different areas, for different controls, or in different manners (for example, operation directions are different or touch distances are different). For specific examples, refer to the common return operation and the quick return operation in FIG. 3 to FIG. 25. In some embodiments, after receiving the common return operation (that is, S101), the electronic device may skip to S103. In some other embodiments, after receiving the quick return operation (that is, S102), the electronic device may skip to S105.

S103. The electronic device determines whether a quick return trigger condition is met.

In some embodiments, the electronic device may determine whether a period in which a first preset quantity of common return operations are received is less than or equal to first preset duration; and if yes, determine that the quick return trigger condition is met; otherwise, determine that the quick return trigger condition is not met. In some other embodiments, the electronic device may determine whether a quantity of common return operations received within first preset duration is greater than or equal to a first preset quantity; and if yes, determine that the quick return trigger condition is met; otherwise, determine that the quick return trigger condition is not met.

In some embodiments, when determining that the quick return trigger condition is not met, the electronic device may skip to S104. In some other embodiments, when determining that the quick return trigger condition is met, the electronic device may skip to S105.

For example, assuming that the electronic device receives K common return operations before performing S101, where K is a positive integer, a receiving time of an earliest received common return operation among the K common return operations is a first time, and a time at which the electronic device performs S101 is a second time. The quick return trigger condition may include but is not limited to the following: A difference between the first time and the second time is less than or equal to the first preset duration, and/or (K+1) is less than or equal to the first preset quantity.

S104. The electronic device performs a common return method.

Specifically, when determining that the common return operation is received and that the quick return trigger condition is not met, the electronic device may return to an interface previous to a current interface (that is, perform the common return method). For a specific example, refer to FIG. 5(A) to FIG. 5(F).

S105. The electronic device performs a quick return method.

Specifically, when determining that the common return operation is received and that the quick return trigger condition is met, or that the quick return operation is received, the electronic device may return to a plurality of user interfaces, and directly return to display a preset return interface. For a specific example, refer to FIG. 6(A) to FIG. 18(C). The preset return interface may be any user interface displayed by the electronic device before the current interface, except the previous interface. An example of the preset return interface is a first displayed application interface, for example, a main interface of an application. In some embodiments, the preset return interface and the current interface may be user interfaces of a same application. In some other embodiments, the preset return interface and the current interface are user interfaces of different applications.

In some embodiments, there may be a plurality of preset return interfaces. Some embodiments may include a plurality of types of quick return operations, and different user interfaces are returned to in correspondence with different types of quick return operations. The different types of quick return operations are, for example, without limitation, for different areas, for different controls, or in different manners (for example, operation directions are different or touch distances are different). In some embodiments, different user interfaces returned to in correspondence with different types of quick return operations may belong to a same application. For a specific example, refer to FIG. 6(A) to FIG. 18(C). In some other embodiments, different user interfaces returned to in correspondence with different types of quick return operations may belong to different applications. For a specific example, refer to FIG. 19(A) to FIG. 20(C).

In a possible implementation, a software system of the electronic device may be an Android system. It may be understood that a user interface displayed by the electronic device corresponds to an activity, and the activity is managed by using a task. The task may also be referred to as a back stack (back stack). Therefore, displaying a user interface may be understood as pushing an activity corresponding to the user interface into the task (that is, entering the stack). Performing the return operation to return to the interface previous to the current interface may be understood as popping a top activity (also referred to as a stack top activity) of the task (that is, popping). For a specific example, refer to FIG. 1. Therefore, using the quick return method shown in FIG. 26 to return to the preset return interface may be understood as using the quick return method to pop, from the stack, a plurality of activities above the activity corresponding to the preset return interface, so that the activity corresponding to the preset return interface is set as a top activity of the task.

In some embodiments, it is assumed that the electronic device runs a first activity stack. When the electronic device displays a second interface of a first application, a second activity associated with the second interface (which may also be referred to as a second activity corresponding to the second interface) is pushed into (or may be referred to as entering) the first activity stack. Then when the electronic device displays a first interface of the first application, a first activity associated with the first interface is pushed into the first activity stack. For example, in the process shown in FIG. 4(A) to FIG. 4(F), in response to each user operation (used to display or skip to an interface next to the currently displayed interface), the electronic device sequentially displays the user interface 300, the user interface 410, the user interface 420, the user interface 430, the user interface 510, and the user interface 520, that is, activities corresponding to the user interface 300, the user interface 410, the user interface 420, the user interface 430, the user interface 510, and the user interface 520 are pushed into the first activity stack. For example, if the user interface 520 is the first interface (that is, the currently displayed interface), a stack top activity of the first activity stack is a first activity associated with the user interface 520. For example, if the user interface 300 is the second interface, a bottom activity (which may also be referred to as a stack bottom activity) of the first activity stack is a second activity associated with the user interface 300. This is not limited. Any one of the user interface 410, the user interface 420, and the user interface 430 may also be the second interface. The second activity associated with the second interface may be understood as an in-stack activity (that is, an activity other than the stack bottom activity and the stack top activity). However, it may be understood that the second activity is not an activity associated with the user interface 510 (that is, the interface previous to the currently displayed interface).

In some embodiments, when displaying the first interface of the first application, and determining that the common return operation is received and that the quick return trigger condition is not met, the electronic device may return to an interface previous to the first interface. In other words, the electronic device may pop the stack top activity of the first activity stack. For example, in the process shown in FIG. 5(A) to FIG. 5(F), when displaying the user interface 520, the electronic device may sequentially return to display the user interface 510, the user interface 430, the user interface 420, the user interface 410, and the user interface 300 in response to each return operation, that is, sequentially pop stack top activities of the first activity stack until the stack top activity is the activity associated with the user interface 300. For example, the electronic device may perform the common return method shown in S104. In the embodiment shown in FIG. 26, the back stack includes more activities, for example, 20 activities, which are activity 1, activity 2, . . . , activity 19, and activity 20 sequentially from bottom to top (that is, based on an entry sequence, that is, based on a displaying sequence). When determining that the common return operation is received and that the quick return trigger condition is not met, the electronic device may pop the stack top activity of the back stack, that is, activity 20. In the foregoing case, it may be understood that one common return operation pops one activity from the stack.

In some embodiments, when displaying the first interface of the first application, the electronic device receives a first user operation, and pops at least two activities of the first activity stack in response to the first user operation. Specifically, when the electronic device displays the first interface of the first application, the stack top activity of the first activity stack is the first activity. In response to the first user operation, the electronic device pops at least two activities that enter the first activity stack after the second activity, and displays the second interface.

In some embodiments, the first user operation is a common return operation, and when receiving the first user operation, the electronic device determines that the quick return trigger condition is met. For example, the user interfaces shown in FIG. 5(A) to FIG. 5(F) are used as examples for description. The user interface 520 is the first interface, and the user interface 300 is the second interface. When the electronic device displays the user interface 520 shown in FIG. 5(A), the electronic device continuously pops, within one second in response to two common return operations performed within one second, activities associated with the user interface 520 and the user interface 510 shown in FIG. 5(B), and pops, in response to a common return operation received again within a next second (it is determined that the quick return trigger condition is met, which may also be understood as meeting a first preset condition), a plurality of activities that enter the stack after the second activity associated with the user interface 300, that is, a plurality of activities associated with the user interface 430, the user interface 420, and the user interface 410 are popped. It may be understood that three activities are popped by performing one return operation (actually a third received common return operation).

In some other embodiments, the first user operation is a quick return operation. For example, in the process shown in FIG. 6(A) to FIG. 6(F), the user interface 520 is the first interface, the user interface 300 is the second interface, and the electronic device continuously pops, within one second in response to two common return operations performed within one second, activities associated with the user interface 510 and the user interface 520 (it is determined that a second quantity of second user operations meet a second preset condition). In addition, the first prompt information 434 is displayed when the user interface 430 is displayed (when the second preset condition is met, a displayed first control is, for example, the first prompt information 434). In response to a user operation (that is, a quick return operation) that is for the first prompt information 434, the electronic device may pop a plurality of activities that enter the stack after the second activity associated with the user interface 300, that is, pop a plurality of activities associated with the user interface 430, the user interface 420, and the user interface 410. It may be understood that three activities are popped by performing one quick return operation. For example, in the process shown in FIG. 8(A) to FIG. 8(F), in response to a sliding operation (that is, a quick return operation) that is for area 2, the electronic device pops a plurality of activities that enter the stack after the second activity associated with the user interface 300, that is, pops a plurality of activities associated with the user interface 520, the user interface 410, the user interface 430, the user interface 420, and the user interface 410. It may be understood that five activities are popped by performing one quick return operation. For other examples of first user operations, refer to FIG. 10(A) to FIG. 11(C) and FIG. 13 to FIG. 16(B).

For example, the electronic device may perform the quick return method shown in S105. In the embodiment shown in FIG. 26, the back stack includes more activities, for example, 20 activities, and the activities are activity 1, activity 2, . . . , activity 19, and activity 20 sequentially from bottom to top (that is, based on an entry sequence, that is, based on a displaying sequence). The first activity is a stack top activity: activity 20. The second activity is a stack bottom activity: activity 20. When the electronic device determines that the common return operation is received and that the quick return trigger condition is met, or that the quick return operation is received, the electronic device may pop activities (that is, activity 2, . . . , activity 20) that enter the back stack after activity 20 (that is, above activity 20).

In some embodiments, the electronic device may preset a stack top activity (that is, the second activity) of the first activity stack after the quick return method is performed. For example, a stack bottom activity of the first activity stack before the quick return method is performed is preset as the second activity.

In some other embodiments, the electronic device may determine, based on a type of an activity, a stack top activity (that is, the second activity) of the first activity stack after the quick return method is performed. Assuming that a name of an activity includes a name of an application (package name for short) and a specific name (activity mark for short), package names of activities of a same application are the same, but activity marks thereof are different, and different types of activities correspond to different marks. In some embodiments, the electronic device may record an activity associated with a user interface receiving a specific operation. For example, in the embodiment shown in FIG. 12, the electronic device may record, in response to a user operation that is for the favorites option 424 (for example, the fourth control is the favorites option 424), an activity associated with the user interface 420. In some embodiments, the recorded activity may be the stack top activity of the first activity stack after the quick return method is performed. For example, the electronic device may record an activity associated with a main interface of an application, and record an activity associated with a user interface receiving a specific operation. The electronic device may determine, based on a type of a quick return operation, an activity corresponding to a return interface. Specifically, in response to a first quick return operation, the electronic device may pop an activity above the activity associated with the main interface of the application in the first activity stack, that is, return to the main interface of the application. In response to a second quick return operation, the electronic device may pop, from the first activity stack, an activity above the activity associated with the user interface receiving the specific operation, that is, return to the user interface receiving the specific operation.

In some other embodiments, it is assumed that the electronic device runs a first activity stack. When the electronic device displays a third interface of a second application, a third activity associated with the third interface is pushed into the first activity stack. Then when the electronic device displays a second interface of a first application, a second activity associated with the second interface is pushed into the first activity stack. Then when the electronic device displays a first interface of the first application, a first activity associated with the first interface is pushed into the first activity stack. For example, in the process shown in FIG. 19(A) to FIG. 19(F), in response to each user operation (used to display or switch to an interface next to the currently displayed interface), the electronic device sequentially displays the user interface 2510 of the video application, the user interface 2520 of the video application, the user interface 2530 of the video application, the user interface 430 of the shopping application, the user interface 510 of the shopping application, and the user interface 520 of the shopping application, that is, the user interface 2510, the user interface 2520, the user interface 2530, the user interface 430, the user interface 510, and the user interface 520 are pushed into the first activity stack. The user interface 520 of the shopping application is, for example, the first interface (that is, the currently displayed interface) of the first application. In this case, a stack top activity of the first activity stack is a first activity associated with the user interface 520. The user interface 430 of the shopping application is, for example, the second interface of the first application. The user interface 2510 of the video application is, for example, the third interface of the second application.

In some embodiments, when displaying the first interface of the first application, the electronic device receives a first user operation. In response to the first user operation, the electronic device may pop at least two activities of the first activity stack, and display the second interface of the first application; or in response to the first user operation, the electronic device may pop at least two activities of the first activity stack, and display the third interface of the second application.

In some embodiments, the first user operation is a common return operation, and when receiving the first user operation, the electronic device determines that the quick return trigger condition is met. In some other embodiments, the first user operation is a quick return operation. A specific example is similar to the example in which the first activity stack includes the first activity and the second activity.

In some embodiments, before the second interface is displayed and b, types of received first user operations are different. For example, areas which the operations are for, controls which the operations are for, operation directions, sliding distances, and the like are different. For example, the operations are the first quick return operation and the second quick return operation shown in FIG. 13 and FIG. 14. For example, in the process shown in FIG. 20(A) to FIG. 20(C), the user interface 520 of the shopping application is the first interface of the first application, the user interface 430 of the shopping application is the second interface of the first application, and the user interface 2510 of the video application is the third interface of the second application. When displaying the user interface 520 shown in FIG. 20(B), the electronic device may display the sixth prompt information 523A and the seventh prompt information 523B (on the displayed first interface, the included second control is, for example, the sixth prompt information 523A, and the included third control is, for example, the seventh prompt information 523B). The sixth prompt information 523A is the icon of the shopping application and is used to indicate the shopping application. The seventh prompt information 523B is the icon of the video application and is used to indicate the video application. In response to a touch operation that is for the sixth prompt information 523A, the electronic device may return to display the first displayed user interface of the shopping application, that is, the user interface 430 (that is, the second interface). In other words, the electronic device may pop a plurality of activities that enter the stack after the second activity associated with the user interface 430, that is, pop two activities associated with the user interface 520 and the user interface 510. It may be understood that two activities are popped by performing one quick return operation. In response to a touch operation that is for the seventh prompt information 523B, the electronic device may return to display the first displayed user interface of the video application, that is, the main interface of the video application, that is, the user interface 2510 (that is, the third interface). In other words, the electronic device may pop a plurality of activities that enter the stack after the activity associated with the user interface 2510, that is, pop a plurality of activities associated with the user interface 520, the user interface 510, the user interface 430, the user interface 2530, and the user interface 2520. It may be understood that five activities are popped by performing one quick return operation.

In some embodiments, the electronic device may determine, based on an application corresponding to an activity, a stack top activity (that is, the second activity or the third activity) of the first activity stack after the quick return method is performed. Assuming that a name of an activity includes a name of an application (package name for short) and a specific name (activity mark for short), package names of activities of a same application are the same. In some embodiments, the electronic device may identify whether a package name of an activity in the first activity stack changes. Optionally, the electronic device may record a first activity after the package name changes. Optionally, the electronic device may also record a first activity that enters the stack before the package name changes. Optionally, the recorded activity may be a stack top activity of the first activity stack after the quick return method is performed. For example, in the embodiment shown in FIG. 19(A) to FIG. 19(F), when displaying the user interface 2530 of the video application, the electronic device may display the user interface 430 of the shopping application in response to a user operation that is for the shopping option 2531. In this case, a package name of the stack top activity of the first activity stack changes from a package name of the video application to a package name of the shopping application. In this case, the electronic device may record the first activity after the package name changes, that is, the second activity associated with the user interface 430, or may record the first activity that enters the stack before the package name changes, that is, the third activity associated with the user interface 2510 (that is, a stack bottom activity of the first activity stack). The electronic device may determine, based on a type of a quick return operation, an activity corresponding to a return interface. Specifically, in response to a first quick return operation, the electronic device may pop an activity above the second activity in the first activity stack, that is, return to the user interface 430 of the shopping application. In response to a second quick return operation, the electronic device may pop an activity above the third activity in the first activity stack, that is, return to the user interface 2510 of the video application.

In some embodiments, the electronic device may record a time at which each activity in the first activity stack is popped and a quantity of popped activities, to determine, based on recorded information when it is determined that a common return operation is received, whether the quick return trigger condition is met. A specific example is as follows (in the description of the following example, it is assumed that an activity corresponding to a preset return interface is activity 1).

Example 1: It is assumed that the electronic device receives K common return operations, where K is a positive integer. The electronic device may pop a top activity of the first activity stack in response to each return operation, and it may be understood that S101, S103, and S104 are performed for K times. The electronic device may record a time at which an activity is popped each time. It is assumed that the recorded popping time is [t1, t2, . . . , t(K)]. Then assuming that the electronic device receives a $(K+1)^{th}$ common return operation at a time $t(K+1)$, the electronic device may determine whether $(t(K+1)-t(K))$ is less than or equal to the first preset duration. If the electronic device determines that $(t(K+1)-t(K))$ is less than or equal to the first preset duration, the electronic device determines that the quick return trigger condition is met. Therefore, in response to the $(K+1)^{th}$ common return operation, the electronic device may pop a plurality of activities above activity 1 corresponding to the preset return interface in the first activity stack. In some embodiments, it may be understood that S101 and S103 are performed for a $(K+1)^{th}$ time, and that S105 is performed once.

Example 2: It is assumed that the electronic device receives K common return operations, where K is a positive integer. The electronic device may pop a top activity of the first activity stack in response to each return operation, and it may be understood that S101, S103, and S104 are performed for K times. The electronic device may record a time at which an activity is popped each time. It is assumed that the recorded popping time is [t1, t2, . . . , t(K)]. Then the electronic device may receive a $(K+1)^{th}$ common return operation, pop a top activity of the first activity stack in response to the $(K+1)^{th}$ common return operation, and record a popping time $t(K+1)$. If the electronic device determines that $(t(K+1)-t(K))$ is less than or equal to the first preset duration, the electronic device determines that the quick return trigger condition is met. Therefore, in response to the $(K+1)^{th}$ common return operation, the electronic device may pop a plurality of activities above activity 1 corresponding to the preset return interface in the first activity stack. In some embodiments, it may be understood that S101 and S103 are performed for a $(K+1)^{th}$ time, and that S105 is performed once.

This is not limited. In some other examples, when determining that the quick return trigger condition is met, the electronic device may alternatively display prompt information (for example, the first control). The prompt information is used by the user to determine whether to perform a quick return operation. When the user determines to perform the quick return operation, the electronic device may perform S102 and S103.

In some embodiments, before S101 and/or S102, the method may further include: determining that a quantity of activities in the first activity stack is greater than or equal to a preset quantity threshold. It may be understood that the quick return method shown in this application may be applied to a back stack in which a quantity of activities is greater than or equal to the preset quantity threshold.

In some embodiments, before S101 and/or S102, the method may further include: determining that an application of a user interface associated with an activity in the first activity stack is an application for which a quick return function can be enabled (preset application for short); optionally, determining that an application of a user interface associated with any activity in the first activity stack is a preset application; or optionally, determining that an application of a user interface associated with a stack top activity of the first activity stack after the quick return method is performed is a preset application. Optionally, assuming that a name of an activity includes a name of an application (package name for short) and a specific name (activity mark for short), package names of activities of a same application are the same, but activity marks are different. In this case, when determining a preset application, the electronic device may determine whether a package name of an activity is a package name of the preset application. It may be understood that the quick return method shown in this application may be applied to preset applications on the electronic device. Optionally, the preset applications may be some or all applications on the electronic device.

Any step included in the method in FIG. 26 is an optional step. For example, only S102 and S105 are included, or only S101 and S104 are included, or S102 is not included. This is not limited. Alternatively, S101 and S103 may be included. In addition, the method may further include: when determining that the electronic device meets the quick return trigger condition, that is, when a determining result in S103 is yes, the electronic device may display prompt information. Alternatively, before S101 and/or S102, the method may further include: the electronic device displays the prompt information. The prompt information indicates a quick return operation. For examples of the prompt information, refer to FIG. 6(A) to FIG. 6(F), FIG. 10(A) to FIG. 11(C), FIG. 15(A) to FIG. 18(C), and FIG. 20(A) to FIG. 20(C).

It may be understood that, for examples of the method shown in FIG. 26, refer to the embodiments shown in FIG. 3 to FIG. 25.

In this application, if the user wants to return to the preset return interface, the user can return to the preset return interface by performing only a few common return operations or performing one quick return operation. For a specific example, refer to FIG. 27 and FIG. 28.

The following embodiment is described by using an example in which a back stack includes 20 activities and an activity corresponding to a preset return interface is activity 1 at the bottom of the back stack.

Figure 27:
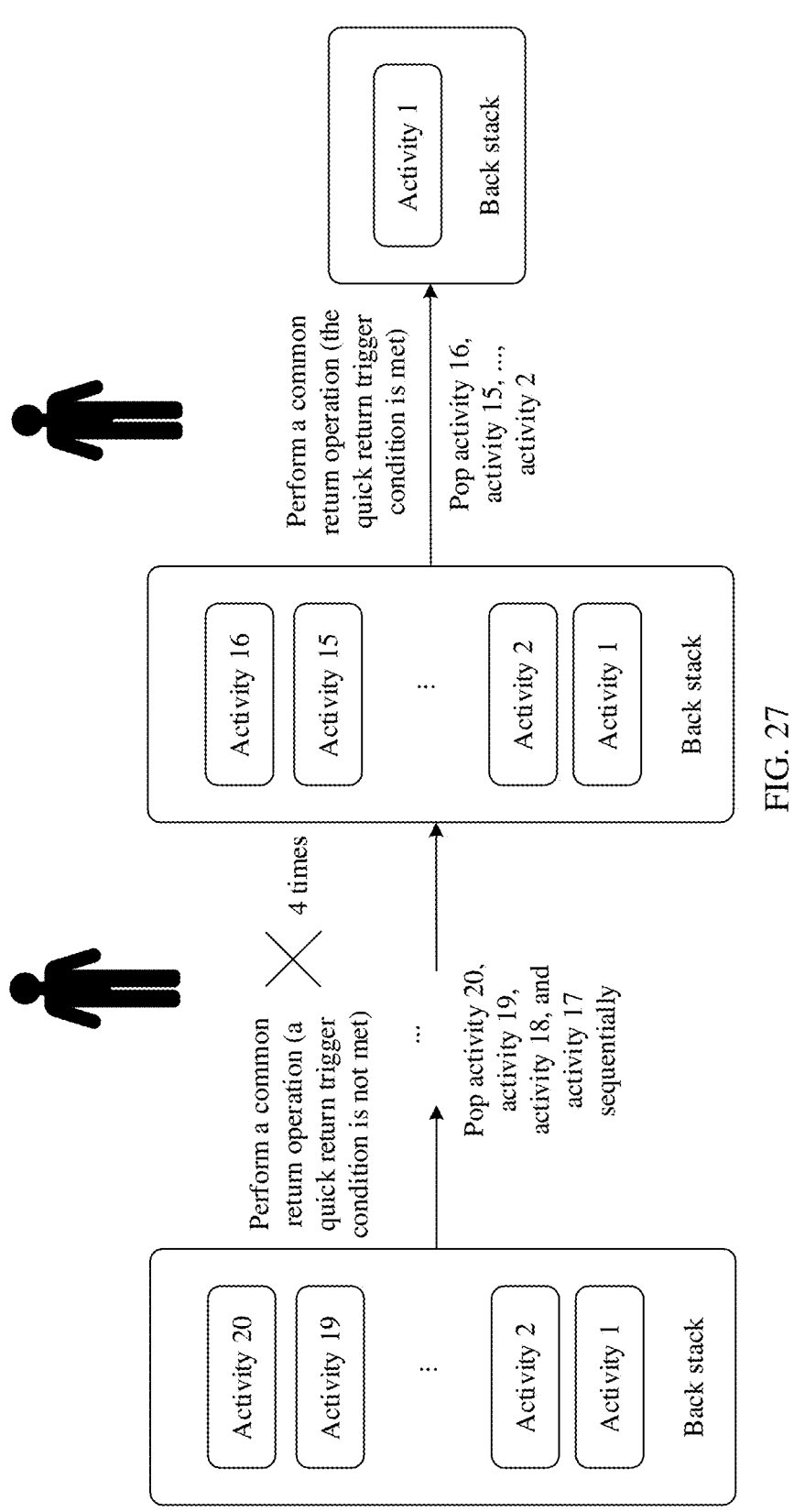
FIG. 27 and FIG. 28 are schematic diagrams for popping some activities according to embodiments of this application.

FIG. 27 is an example of a schematic diagram for popping activities.

As shown in FIG. 27, it is assumed that a quick return trigger condition is that duration of a period in which five common return operations are received is less than or equal to three seconds. When a back stack includes 20 activities, an electronic device may sequentially receive four common return operations of a user within two seconds, and in response to each common return operation, pop a top activity of the back stack, that is, return from a currently displayed interface to a previous interface. In this case, the top activity of the back stack is activity 16, and the electronic device may receive a fifth common return operation of the user within one second. The electronic device determines that a difference between a receiving time of a fourth common return operation and a receiving time of the fifth common return operation is less than or equal to one second, that is, determines that the quick return trigger condition is met. In response to the fifth common return operation, the electronic device may pop a plurality of activities above activity 1 corresponding to the preset return interface in the back stack. The plurality of activities above activity 1 are 15 activities: activity 2, activity 3, . . . , activity 15, and activity 16. In this case, a top activity of the back stack is activity 1, and the electronic device may display the preset return interface. To reach a user interface that can be returned to for displaying only after 19 common return operations are performed, the user needs to perform only five common return operations. The operations are simple.

In some embodiments, in response to one quick return operation, the electronic device may sequentially pop, according to a first-in-last-out principle, the plurality of activities above the activity corresponding to the preset return interface in the back stack. This solution may be referred to as a first popping solution. In some other embodiments, in response to one quick return operation, the electronic device may first pop a plurality of activities between the activity corresponding to the preset return interface and the top activity in the back stack, and then pop the top activity. This popping solution may be referred to as a second popping solution. For a specific example, refer to FIG. 28.

Figure 28:
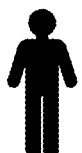
Figure 28:
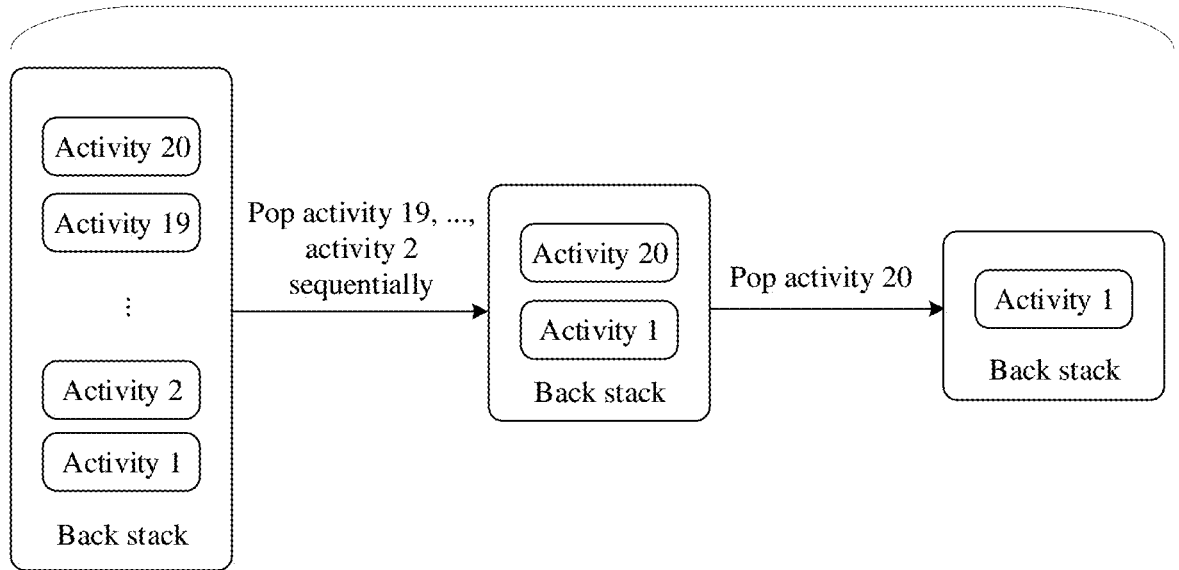

FIG. 28 is another example of a schematic diagram for popping activities.

As shown in FIG. 28, when a back stack includes 20 activities, an electronic device may pop, in response to a quick return operation of a user, 18 activities between activity 1 corresponding to a preset return interface and a top activity (that is, activity 20) in the back stack. In some embodiments, according to a first-in-last-out principle, the electronic device sequentially pops the 18 activities: activity 19, activity 18, . . . , activity 3, and activity 2. In this process, the top activity of the back stack remains activity 20, that is, a user interface displayed by the electronic device remains a user interface corresponding to activity 20. Then the electronic device may continue to pop activity 20. In this case, a top activity of the back stack is activity 1, and the electronic device may display the preset return interface.

Without being limited to the example shown in FIG. 28, during specific implementation, the 18 activities, that is, activity 19, activity 18, . . . , activity 3, and activity 2, may be popped sequentially according to a last-in first-out principle, or may be popped in any sequence. This is not limited in this application.

Without being limited to the example shown in FIG. 28, during specific implementation, the electronic device may alternatively pop, in response to a common return operation of the user (and it is determined that a quick return trigger condition is met), a plurality of activities between the activity corresponding to the preset return interface and the top activity in the back stack. For example, in FIG. 27, when the top activity of the back stack is activity 16, the electronic device may pop, in response to a fifth common return operation of the user, 14 activities between activity 1 corresponding to the preset return interface and a top activity (that is, activity 16) in the back stack, and then pop activity 16.

In some embodiments, in an Android system, when the user enters, quits, or returns to an application (which may also be understood as accessing, quitting, or returning to a user interface), an activity corresponding to the user interface undergoes different states in a lifecycle, and the Android system invokes a series of methods in the lifecycle. It may be understood that each activity has a lifecycle. For a specific example, refer to FIG. 29.

Figure 29:
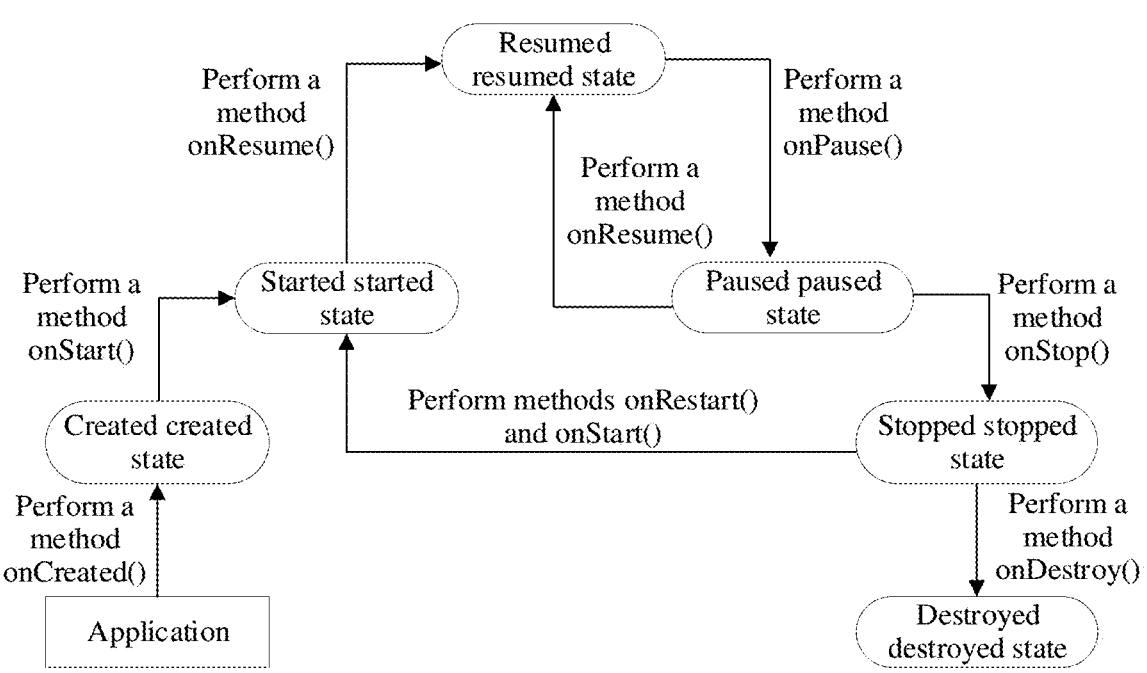
FIG. 29 is an example of a schematic diagram of a lifecycle of an activity.

FIG. 29 is an example of a schematic diagram of a lifecycle of an activity.

As shown in FIG. 29, an entire process of the lifecycle may be understood as starting with a creation method onCreate (and ending with a destruction method onDestroy( ). The user can see the activity, and it may be understood that the user can see a user interface corresponding to the activity from the start method onStart( ) to the stop method onStop( ). The user can interact with the activity, and it may be understood that the user can interact with the user interface corresponding to the activity from a resumption method onResume( ) to a pause method onPause( ). In addition, the lifecycle may further include a restart method onRestart( ). In other words, the lifecycle may include seven methods. An example is described as follows:

Creation method onCreate( ): This method is invoked to create the activity, usually to perform some initialization settings.

Start method onStart( ): This method is invoked before the activity is ready for displaying on a screen. After this method is invoked, the activity is in a visible state.

Resumption method onResume( ): This method is invoked when the activity starts to interact with the user after a focus is obtained.

Pause method onPause( ): This method is invoked when the current activity is partially covered by another activity or the screen is locked.

Stop method onStop( ): This method is invoked when the activity is invisible to the user.

Destruction method onDestroy( ): This method is invoked to destroy the activity.

Restart method onRestart( ): This method is invoked to restart the activity from a stopped (Stopped) state.

As shown in FIG. 29, the activity is in different states after different methods are invoked and performed. The lifecycle may include five states. An example is described as follows:

Created (Created) state: The activity is in this state after the method onCreate( ) is performed. The activity in the current state is invisible to the user and non-interactive with the user.

Started (Started) state: The activity is in this state after the method onStart( ) is performed. The activity in the current state is visible to the user but non-interactive with the user. When the activity is in the created state, after the method onStart( ) is performed, the activity is in the started state. When the activity is in the stopped state, after methods onRestart( ) and onStart( ) are sequentially performed, the activity is in the started state.

Resumed (Resumed) state: It may also be referred to as a running (running) state. The activity is in this state after the method onResume( ) is performed. The activity in the current state is visible to the user and interactive with the user. Before the method onResume( ) is performed, the activity may be in the started state or a paused state.

Paused (Paused) state: The activity is in this state after the method onPause( ) is performed. The activity in the current state is visible to the user but non-interactive with the user.

Stopped (Stopped) state: The activity is in this state after the method onStop( ) is performed. The activity in the current state is invisible to the user and non-interactive with the user.

Destroyed (Destroyed) state: The activity is in this state after the method onDestroy( ) is performed. The activity in the current state is invisible to the user and non-interactive with the user.

The following embodiments are described by using an example. In the example, when a lifecycle method is invoked for different activities, an identifier of an activity is carried in the method, and this application is described by using an example in which activity(i) is the identifier of the activity, where i is a positive integer. For example, it is assumed that in FIG. 1, lifecycle methods invoked for activity 1 may be expressed as onCreate(Activity1), onStart (Activity1), onResume(Activity1), onPause(Activity1), onStop(Activity1), onDestroy(Activity1), and onRestart (Activity1).

For example, in FIG. 1, when activity 1 is started for the first time and pushed into the back stack, methods onCreate (Activity1), onStart(Activity1), and onResume (Activity1) may be sequentially invoked for activity 1, and activity 1 may be in the created, started, and resumed states sequentially. In other words, when activity 1 is a top activity of the back stack, the activity is in the resumed state, and is visible to the user and interactive with the user. When activity 2 is started for the first time and pushed into the back stack, methods onPause(Activity1), onCreate(Activity2), onStart (Activity2), onResume(Activity2), and onStop(Activity1) may be sequentially invoked for activity 1 and activity 2. In this case, activity 2 is a top activity of the back stack, is in the resumed state, and is visible to the user and interactive with the user. Activity 1 is in the stopped state, and is invisible to the user and non-interactive with the user. Then when the user performs a return operation and activity 2 is popped, methods onPause(Activity2), onRestart(Activity1), onStart(Activity1), onResume(Activity1), onStop(Activity2), and onDestroy(Activity2) may be sequentially invoked for activity 1 and activity 2. Activity 2 is destroyed, and activity 1 becomes a top activity of the back stack again.

In some embodiments, when the first popping solution is used, the electronic device may sequentially pop, in response to a quick return operation of the user according to the first-in-last-out principle, a plurality of activities above an activity corresponding to a preset return interface in the back stack, that is, activity 20, activity 19, . . . , activity 3, and activity 2 are sequentially popped, so that activity 1 is a top activity, and that activity 1 is visible to the user and interactive with the user. Popping of activity 20 is used as an example. For activity 20 and activity 19, methods onPause (Activity20), onRestart(Activity19), onStart(Activity19), onResume(Activity19), onStop(Activity20), and onDestroy (Activity20) may be invoked sequentially, and this process further needs to be performed for 18 times. Therefore, when the first popping solution is used, the electronic device needs to invoke the foregoing six lifecycle methods for 19 times, so that activity 1 can be a top activity.

In some embodiments, as shown in FIG. 28, when the second popping solution is used, the electronic device may pop, in response to a quick return operation of the user, 18 activities between activity 1 corresponding to the preset return interface and the top activity (that is, activity 20) in the back stack. In some embodiments, the 18 activities, that is, activity 19, activity 18, . . . , activity 3, and activity 2, are sequentially popped according to the first-in-last-out principle. The electronic device may sequentially invoke methods onDestroy(Activity19), onDestroy(Activity18), . . . , onDestroy(Activity3), and onDestroy(Activity2) 18 lifecycle methods in total. In this process, the top activity of the back stack remains activity 20, that is, a user interface displayed by the electronic device remains a user interface corresponding to activity 20. Then the electronic device may continue to pop activity 20, and the electronic device may sequentially invoke methods onPause(Activity20), onRestart(Activity1), onStart(Activity1), onResume(Activity1), onStop(Activity20), and onDestroy(Activity20) for activity 20 and activity 1, 6 lifecycle methods in total. Therefore, when the second popping solution is used, the electronic device needs to invoke a lifecycle method for (18+6) times, so that activity 1 can be a top activity.

It may be understood that (18+6) is far less than (19×6), and that power consumed when the electronic device uses the second popping solution is far less than power consumed when the electronic device uses the first popping solution. For example, power consumption is reduced by 90%. In addition, when the electronic device uses the first popping solution, one quick return operation performed by the user sequentially switches the user interface displayed by the electronic device from the user interface corresponding to activity 20, to the preset return interface corresponding to activity 1. In other words, the electronic device actually displays 20 user interfaces (data such as pictures and videos required by the 20 user interfaces is loaded). However, due to an excessively high switching speed (a switching time is short), problems such as flickering, a blank screen, and frame freezing may occur on a user interface visible to the user. When the electronic device uses the second popping solution, one quick return operation performed by the user directly switches the user interface displayed by the electronic device from the user interface corresponding to activity 20 to the preset return interface corresponding to activity 1. In other words, the electronic device actually displays two user interfaces, performance is smooth, and user experience is better.

For example, in the embodiment shown in FIG. 8, when the electronic device displays the user interface 520, the user interface 520 is associated with a stack top activity of the first activity stack. Assuming that the user interface 300 is associated with a stack bottom activity of the first activity stack, activities included in the first activity stack are sequentially activities associated with the user interface 300, the user interface 410, the user interface 420, the user interface 430, the user interface 510, and the user interface 520 from bottom to top (that is, an entry sequence). In response to a quick return operation of the user, the electronic device may pop a plurality of activities between the stack top activity and the stack bottom activity, that is, perform a method onDestroy (on each of the plurality of activities between the stack top activity and the stack bottom activity, for example, sequentially invoke methods onDestroy (activity associated with the user interface 510), onDestroy (activity associated with the user interface 430), onDestroy (activity associated with the user interface 420), and onDestroy (activity associated with the user interface 410). Then the electronic device may pop the stack top activity, and display the user interface 300, that is, sequentially invoke methods onPause (activity associated with the user interface 520), onRestart (activity associated with the user interface 300), onStart (activity associated with the user interface 300), onResume (activity associated with the user interface 300), onStop (activity associated with the user interface 520), and onDestroy (activity associated with the user interface 520). Examples of other quickly returned user interfaces are similar, and details are not described again.

Without being limited to the foregoing example, alternatively, the electronic device may pop the 18 activities, that is, activity 19, activity 18, . . . , activity 3, and activity 2, sequentially according to the last-in first-out principle. The electronic device may sequentially invoke methods onDestroy(Activity2), onDestroy(Activity3), . . . , onDestroy (Activity18), and onDestroy(Activity19), or may pop the activities in any sequence. This is not limited in this application.

Alternatively, only one activity may be included between the activity corresponding to the preset return interface returned to by using the quick return method and the top activity of the task.

The foregoing embodiments are described by using an example in which the preset return interface returned to by using the quick return method corresponds to activity 1 located at the bottom of the back stack. During specific implementation, the preset return interface returned to by using the quick return method corresponds to any activity in the back stack, for example, activity (2) or activity (5), except the top activity.

An activity (Activity) in this application may be understood as a user interface, for example, a user interface displayed on the entire display, or a user interface displayed in an area other than a status bar on the display. The user interface may be an interface displayed by the electronic device in response to a received user operation. For example, in the embodiment shown in FIG. 4(A) to FIG. 4(F), when the electronic device displays the user interface 300, the electronic device may switch to display the user interface 400 in response to a touch operation that is for summer clothing 320A.

A person of ordinary skill in the art may understand that all or some of the procedures of the methods in the foregoing embodiments may be implemented by a computer program instructing related hardware. The computer program may be stored in a computer-readable storage medium. When the computer program is executed, the procedures in the foregoing method embodiments are performed. The storage medium includes any medium that can store computer program code, like a read-only memory (read-only memory, ROM), a random access memory (random access memory, RAM), a magnetic disk, or an optical disc.

What is claimed is:

1. A quick interface return method, applied to an electronic device, wherein the method comprises:
   displaying, on a display of the electronic device, a first interface, the first interface being associated with a first activity, the first activity being a stack top activity of a first activity stack, and the first activity stack comprising the first activity, a second activity associated with a second interface, and one or more activities between the first activity and the second activity, wherein each of the one or more activities between the first activity and the second activity is associated with an interface other than the first interface or the second interface;
   receiving a first user operation; and
   in response to the first user operation, popping at least two activities of the first activity stack, wherein popping the at least two activities comprises:
      popping each of the one or more activities in the first activity stack between the first activity and the second activity while still displaying the first interface, in which case the stack top activity remains unchanged, and
      after popping each of the one or more activities in the first activity stack between the first activity and the second activity while still displaying the first interface, popping the first activity from the first activity stack, and
      after popping the first activity from the first activity stack, displaying the second interface that is associated with the second activity.

2. The method according to claim 1,
   wherein before receiving the first user operation, the method further comprises:
receiving a first quantity of second user operations, wherein the second user operations are used to return to an interface displayed prior to a currently displayed interface; and
   wherein popping the at least two activities of the first activity stack in response to the first user operation comprises:
      when the first quantity of second user operations and the first user operation meet a first preset condition, popping the at least two activities of the first activity stack in response to the first user operation, wherein the first preset condition is that a difference between a first receiving time and a receiving time of the first user operation is less than or equal to first duration, and the first receiving time is a receiving time of an earliest received second user operation among the first quantity of second user operations.

3. The method according to claim 1, wherein before receiving the first user operation, the method further comprises:
   receiving a second quantity of second user operations, wherein the second user operations are used to return to an interface previous to a currently displayed interface; and
   displaying, on the display, a first control when the second quantity of second user operations meet a second preset condition, wherein the second preset condition is that a difference between a second receiving time and a third receiving time is less than or equal to a second duration, the second receiving time is a receiving time of an earliest received second user operation among the second quantity of second user operations, and the third receiving time is a receiving time of a latest received second user operation among the second quantity of second user operations, wherein receiving the first user operation comprises: receiving the first user operation that is for the first control.

4. The method according to claim 1, wherein receiving the first user operation comprises:
   receiving the first user operation that is for a first area, wherein the first area is different from a second area, the second area is an area which a second user operation is for, and the second user operation is used to return to an interface previous to a currently displayed interface.

5. The method according to claim 1, wherein the first interface is associated with a first application and the second interface is associated with a second application.

6. The method according to claim 5, wherein the first application and the second application are the same application.

7. The method according to claim 5, wherein the first application and the second application are different applications.

8. The method according to claim 1, wherein the one or more activities between the first activity and the second activity comprises a single activity.

9. The method according to claim 1, wherein the one or more activities between the first activity and the second activity comprises two or more activities.

10. An electronic device, comprising:
   a transceiver;
   at least one processor; and
   a memory coupled to the processor and storing a computer program, and the processor invokes the computer program to enable the electronic device to perform operations, the operations comprising:
      displaying a first interface, wherein the first interface is associated with a first activity, the first activity is a stack top activity of a first activity stack, and the first activity stack comprises the first activity, a second activity associated with a second interface, and one or more activities between the first activity and the second activity, wherein each of the one or more activities between the first activity and the second activity is associated with an interface other than the first interface or the second interface;
   receiving a first user operation; and
   in response to the first user operation, popping at least two activities of the first activity stack, wherein popping the at least two activities comprises:
      popping each of the one or more activities in the first activity stack between the first activity and the second activity while still displaying the first interface, in which case the stack top activity remains unchanged, and after popping each of the one or more activities in the first activity stack between the first activity and the second activity while still displaying the first interface, popping the first activity from the first activity stack, and after popping the first activity from the first activity stack, displaying the second interface.

11. The electronic device according to claim 10, wherein before receiving the first user operation, the operations further comprising:

receiving a first quantity of second user operations, wherein the second user operations are used to return to an interface displayed prior to a currently displayed interface; and wherein popping the at least two activities of the first activity stack in response to the first user operation comprises:

when the first quantity of second user operations and the first user operation meet a first preset condition, popping the at least two activities of the first activity stack in response to the first user operation, wherein the first preset condition is that a difference between a first receiving time and a receiving time of the first user operation is less than or equal to first duration, and the first receiving time is a receiving time of an earliest received second user operation among the first quantity of second user operations.

12. The electronic device according to claim 10, wherein before receiving the first user operation, the operations further comprising:

receiving a second quantity of second user operations, wherein the second user operations are used to return to an interface previous to a currently displayed interface; and displaying, on the display, a first control when the second quantity of second user operations meet a second preset condition, wherein the second preset condition is that a difference between a second receiving time and a third receiving time is less than or equal to a second duration, the second receiving time is a receiving time of an earliest received second user operation among the second quantity of second user operations, and the third receiving time is a receiving time of a latest received second user operation among the second quantity of second user operations, wherein receiving the first user operation comprises: receiving the first user operation that is for the first control.

13. The electronic device according to claim 10, wherein receiving the first user operation comprises:

receiving the first user operation that is for a first area, wherein the first area is different from a second area, the second area is an area which a second user operation is for, and the second user operation is used to return to an interface previous to a currently displayed interface.

14. The electronic device according to claim 10, wherein the first interface is associated with a first application and the second interface is associated with a second application.

15. The electronic device according to claim 14, wherein the first application and the second application are the same application.

16. The electronic device according to claim 14 wherein the first application and the second application are different applications.

17. The electronic device according to claim 10, wherein the one or more activities between the first activity and the second activity comprises a single activity.

18. The electronic device according to claim 10, wherein the one or more activities between the first activity and the second activity comprises two or more activities.

19. A non-transitory computer-readable medium storing instructions that, when executed by one or more processors, causes the one or more processors to perform operations, the operations comprising:

displaying, on a display of an electronic device, a first interface, the first interface being associated with a first activity, the first activity being a stack top activity of a first activity stack, and the first activity stack comprising the first activity, a second activity associated with a second interface, and one or more activities between the first activity and the second activity, wherein each of the one or more activities between the first activity and the second activity is associated with an interface other than the first interface or the second interface;

receiving a first user operation; and in response to the first user operation, popping at least two activities of the first activity stack, wherein popping the at least two activities comprises:

popping each of the one or more activities in the first activity stack between the first activity and the second activity while still displaying the first interface, in which case the stack top activity remains unchanged, and after popping each of the one or more activities in the first activity stack between the first activity and the second activity while still displaying the first interface, popping the first activity from the first activity stack, and after popping the first activity from the first activity stack, displaying the second interface that is associated with the second activity.

20. The non-transitory computer-readable medium according to claim 19, wherein the one or more activities between the first activity and the second activity comprises a single activity.

* * * * *